（12） United States Patent
Kamath

(10) Patent No.: US 11,276,133 B2
(45) Date of Patent: Mar. 15, 2022

(54) GENERATING SIGNAL BEARING ART USING STIPPLE, VORONOI AND DELAUNAY METHODS AND READING SAME

(71) Applicant: Digimarc Corporation, Beaverton, OR (US)

(72) Inventor: Ajith M. Kamath, Beaverton, OR (US)

(73) Assignee: Digimarc Corporation, Beaverton, OR (US)

(*) Notice: Subject to any disclaimer, the term of this patent is extended or adjusted under 35 U.S.C. 154(b) by 0 days.

(21) Appl. No.: 16/989,128

(22) Filed: Aug. 10, 2020

(65) Prior Publication Data

US 2021/0049727 A1 Feb. 18, 2021

Related U.S. Application Data

(63) Continuation of application No. 16/435,164, filed on Jun. 7, 2019, now Pat. No. 10,748,232.
(Continued)

(51) Int. Cl.
*G06T 1/00* (2006.01)
*H04N 1/32* (2006.01)

(52) U.S. Cl.
CPC ............ *G06T 1/005* (2013.01); *G06T 1/0028* (2013.01); *H04N 1/3232* (2013.01); *H04N 1/32309* (2013.01); *G06T 2201/0062* (2013.01)

(58) Field of Classification Search
CPC ................. G06T 1/005; G06T 1/0028; G06T 2201/0062; G06T 1/0064; G06T 2201/0202; H04N 1/3232; H04N 1/32309
See application file for complete search history.

(56) References Cited

U.S. PATENT DOCUMENTS 5,636,292 A 6/1997 Rhoads
5,832,119 A 11/1998 Rhoads
(Continued)

FOREIGN PATENT DOCUMENTS

WO 2006048368 5/2006
WO 2011029845 3/2011
(Continued)

OTHER PUBLICATIONS

Chu, et al, Halftone QR codes, ACM Transactions on Graphics, vol. 32, No. 6, Nov 1, 2013, p. 217.
(Continued)

*Primary Examiner* — Christopher Wait
(74) *Attorney, Agent, or Firm* — Digimarc Corporation

(57) ABSTRACT

Optical code signal components are generated and then transformed into signal bearing art that conveys machine readable data. The components of an optical code are optimized to achieve improved signal robustness, reliability, capacity and/or visual quality. An optimization program can determine spatial density, dot distance, dot size and signal component priority to optimize robustness. An optical code generator transforms tiles of an optical code or image embedded with the optical code into signal-bearing art using stipple, Voronoi, Delaunay or other graphic drawing methods so as to retain prioritized components of the optical code. The optical code is merged into a host image, such as imagery, text and graphics of a package or label, or it may be printed by itself, e.g., on an otherwise blank label or carton. A great number of other features and arrangements are also detailed.

24 Claims, 45 Drawing Sheets

Related U.S. Application Data

(60) Provisional application No. 62/682,731, filed on Jun. 8, 2018.

(56) References Cited

U.S. PATENT DOCUMENTS

| | | | |
|---|---|---|---|
| 5,862,260 | A | 1/1999 | Rhoads |
| 6,060,428 | A | 5/2000 | Chang |
| 6,345,104 | B1 | 2/2002 | Rhoads |
| 6,567,534 | B1 | 5/2003 | Rhoads |
| 6,590,996 | B1 | 7/2003 | Reed |
| 6,614,914 | B1 | 9/2003 | Rhoads |
| 6,625,297 | B1 | 9/2003 | Bradley |
| 6,760,464 | B2 | 7/2004 | Brunk |
| 6,987,861 | B2 | 1/2006 | Rhoads |
| 6,993,152 | B2 | 1/2006 | Patterson |
| 7,072,490 | B2 | 7/2006 | Stach |
| 7,340,076 | B2 | 3/2008 | Stach |
| 7,532,741 | B2 | 5/2009 | Stach |
| 7,555,139 | B2 | 6/2009 | Rhoads |
| 7,831,062 | B2 | 11/2010 | Stach |
| 7,856,143 | B2 | 12/2010 | Abe |
| 8,009,893 | B2 | 8/2011 | Rhoads |
| 8,144,368 | B2 | 3/2012 | Rodriguez |
| 8,515,121 | B2 | 8/2013 | Stach |
| 9,635,378 | B2 | 4/2017 | Holub |
| 9,747,656 | B2 | 8/2017 | Stach |
| 10,748,232 | B2 | 8/2020 | Kamath |
| 11,062,108 | B2 | 7/2021 | Bradley |
| 2002/0136429 | A1 | 9/2002 | Stach |
| 2006/0071081 | A1 | 4/2006 | Wang |
| 2009/0018996 | A1 | 1/2009 | Hunt |
| 2009/0129592 | A1 | 5/2009 | Swiegers |
| 2010/0119108 | A1 | 5/2010 | Rhoads |
| 2010/0303349 | A1 | 12/2010 | Bechtel |
| 2011/0110555 | A1 | 5/2011 | Stach |
| 2011/0212717 | A1 | 9/2011 | Rhoads |
| 2011/0214044 | A1 | 9/2011 | Davis |
| 2011/0276663 | A1 | 11/2011 | Rhoads |
| 2012/0133954 | A1 | 5/2012 | Takabayashi |
| 2012/0229467 | A1 | 9/2012 | Czerwinski |
| 2013/0001313 | A1 | 1/2013 | Denniston, Jr. |
| 2015/0262347 | A1 | 9/2015 | Duerksen |
| 2015/0269617 | A1 | 9/2015 | Mikurak |
| 2016/0026853 | A1 | 1/2016 | Wexler |
| 2017/0024840 | A1 | 1/2017 | Holub |
| 2017/0024845 | A1 | 1/2017 | Filler |
| 2017/0193628 | A1 | 7/2017 | Sharma |
| 2018/0068463 | A1 | 3/2018 | Risser |
| 2018/0082407 | A1 | 3/2018 | Rymkowski |
| 2018/0082715 | A1 | 3/2018 | Rymkowski |
| 2018/0150947 | A1 | 5/2018 | Lu |
| 2018/0158224 | A1 | 6/2018 | Bethge |
| 2018/0211157 | A1 | 7/2018 | Liu |
| 2018/0285679 | A1 | 10/2018 | Amitay |
| 2018/0357800 | A1 | 12/2018 | Oxholm |
| 2018/0373999 | A1 | 12/2018 | Xu |
| 2019/0139176 | A1 | 5/2019 | Stach |
| 2019/0213705 | A1 | 7/2019 | Kamath |
| 2019/0289330 | A1 | 9/2019 | Alakuijala |
| 2020/0082249 | A1* | 3/2020 | Hua ............... G06T 11/001 |

FOREIGN PATENT DOCUMENTS

| | | |
|---|---|---|
| WO | 2016153911 | 9/2016 |
| WO | 2018111786 | 6/2018 |
| WO | 2019113471 | 6/2019 |
| WO | 2019165364 | 8/2019 |

OTHER PUBLICATIONS

Davis B, Signal rich art: enabling the vision of ubiquitous computing. In Media Watermarking, Security, and Forensics III Feb. 8, 2011 (vol. 7880, p. 788002). International Society for Optics and Photonics.

Gatys, et al, A Neural Algorithm of Artistic Style. arXiv preprint arXiv:1508.06576, Aug. 26, 2015. 16 pages.

Johnson, et al, Perceptual losses for real-time style transfer and super-resolution, European Conference on Computer Vision, Oct. 8, 2016, pp. 694-711.

Johnson, excerpts from github web site "Fast-neural-style," Nov. 19, 2017. 19 pages.

Lengstrom, excerpts from github web site, "Fast Style Transfer in TensorFlow," Oct. 3, 2017. 24 pages.

Lin, et al, Artistic QR code embellishment. Computer Graphics Forum, Oct. 1, 2013, vol. 32, No. 7, pp. 137-146.

Lin, et al, Efficient QR code beautification with high quality visual content, IEEE Transactions on Multimedia, vol. 17, No. 9, Sep. 2015, pp. 1515-1524.

Liu, et al, Line-based cubism-like image—A new type of art image and its application to lossless data hiding, IEEE Transactions on Information Forensics and Security, vol. 7, No. 5, Oct. 2012, pp. 1448-1458.

Nikulin, Exploring the neural algorithm of artistic style, arXiv preprint arXiv:1602.07188, Feb. 23, 2016. 15 pages.

Photoshop Elements Help—Patterns, Web Archive, Mar. 13, 2014. 2 pages.

Preston, et al, Enabling hand-crafted visual markers at scale, Proceedings of the 2017 ACM Conference on Designing Interactive Systems, Jun. 10, 2017, pp. 1227-1237.

Puyang, et al, Style Transferring Based Data Hiding for Color Images, International Conference on Cloud Computing and Security, Jun. 8, 2018, pp. 440-449.

Raval, excerpts from github web site, Style Transfer Using VGG-16 Model, Mar. 8, 2017. 15 pages.

Rosebrock, excerpts from web page Neural Style Transfer with OpenCV, Aug. 27, 2018. 23 pages.

Simonyan et al, Very Deep Convolutional Networks for Large-Scale Image Recognition, arXiv preprint 1409.1556v6, Apr. 10, 2015. 14 pages.

Ulyanov, et al, Improved texture networks: Maximizing quality and diversity in feed-forward stylization and texture synthesis, Proc. 2017 IEEE Conference on Computer Vision and Pattern Recognition, pp. 6924-6932.

Yang, et al, ARTcode: Preserve art and code in any image, Proc. 2016 ACM International Joint Conference on Pervasive and Ubiquitous Computing, pp. 904-915.

Hayes et al., "Generating Steganographic Images Via Adversarial Training", Proceedings of the 31st annual conference on advances in Neural Information Processing Systems, Mar. 2017, pp. 1951-1960.

Jun-Yan Zhu et al, "Unpaired Image-to-Image Translation Using Cycle-Consistent Adversarial Networks", 2017 IEEE International Conference on Computer Vision (ICCV), (Mar. 30, 2017), doi:10.1109/ICCV.2017.244, ISBN 978-1-5386-1032-9, pp. 2242-2251, XP055573065.

Ke et al., "Kernel Target Alignment for Feature Kernel Selection in Universal Steganographic Detection based on Multiple Kernel SVM", International Symposium on Instrumentation & Measurement, Sensor Network and Automation, Aug. 2012, pp. 222-227.

Invitation to Pay Additional Fees including Communication Relating to the Results of the Partial International Search in PCT/US2018/064516, dated Apr. 5, 2019. 17 pages.

Google Scholar Search Results.

International Search Report and Written Opinion for Application No. PCT/US19/36126, dated Oct. 9, 2019, 12 pages.

A. Secord, "Weighted Voronoi Stippling," Proc. 2nd Ann. Symp. Non-Photorealistic Animation and Rendering (NPAR 2002), ACM Press, 2002, pp. 27-43.

International Preliminary Report on Patentability for PCT/US2019/036126, dated May 22, 2020.

Li Hai-Sheng et al., "Style transfer for QR code", Multimedia Tools and Applications, vol. 79, No. 45-46, Dec. 1, 2020, pp. 33839-33852, XP037308023.

\* cited by examiner e velit esse cillum dolore eu fugiat
adipiscing elit, sed do eiusmod ten
aute irure dolor in reprehenderit in
rum. Lorem ipsum dolor sit amet,
nisi ut aliquip ex ea commodo cons
lpa qui officia deserunt mollit anim
m, quis nostrud exercitation ullam
occaecat cupidatat non proident,
dolore magna aliqua. Ut enim ad m
dolore eu fugiat nulla pariatur. Ex
sed do eiusmod tempor incididunt
in reprehenderit in voluptate velit
m dolor sit amet, consectetur adip
ea commodo consequat. Duis aut
serunt mollit anim id est laborum.
exercitation ullamco laboris nisi ut
atat non proident, sunt in culpa qu
qua. Ut enim ad minim veniam, qui
t nulla pariatur. Excepteur sint occ

FIG. 25

FIG. 30A
FIG. 30B

518

532

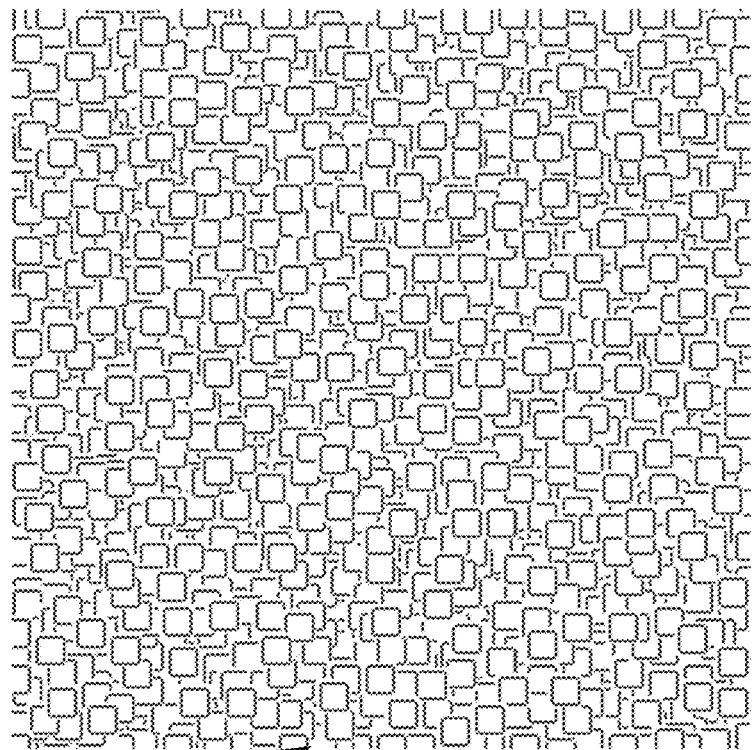
556  FIG. 43
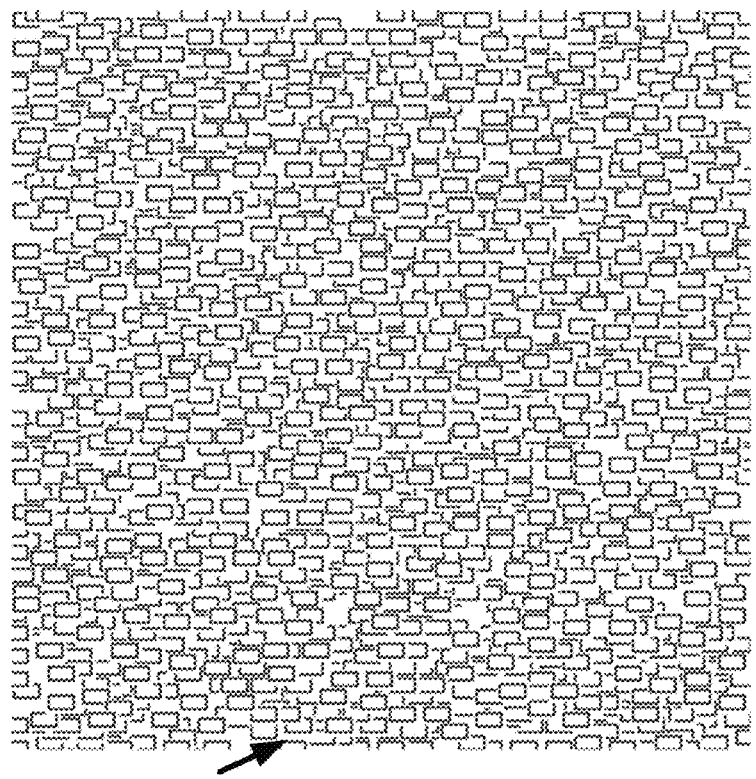
558  FIG. 44

GENERATING SIGNAL BEARING ART USING STIPPLE, VORONOI AND DELAUNAY METHODS AND READING SAME

RELATED APPLICATION DATA

This application is a continuation of U.S. application Ser. No. 16/435,164, filed Jun. 7, 2019 (now U.S. Pat. No. 10,748,232) which claims priority to provisional application 62/682,731, filed Jun. 8, 2018, which are incorporated by reference.

This application is related to U.S. application Ser. No. 16/405,621, filed May 7, 2019, and International Applications PCT/US18/64516, filed Dec. 7, 2018, and PCT/US19/19410, filed Feb. 25, 2019, which are hereby incorporated by reference.

TECHNICAL FIELD

The present technology relates, generally, to image processing to generate machine-readable optical codes for printing (optionally after merging with host image content), complementary robustness measurements for optimizing the optical codes, and optical code readers for reliably and efficiently reading such codes from objects.

In part, this application concerns enhancements and improvements to the sparse signaling technologies detailed in applicant's U.S. Pat. No. 9,635,378 and publication 20170024840, which are incorporated herein by reference.

BACKGROUND AND SUMMARY

Optical codes, such as well-known one and two-dimensional barcodes, are ubiquitous and critical in a wide variety of automatic data capture applications. Indeed, barcodes are so widespread, it is now common to see a variety of barcode types on a single object to carry different types of data, or to improve readability by redundantly encoding the same data on different parts of the object.

This growing use of barcodes poses a number of challenges for package and label designs. First, each barcode must occupy a distinct space to ensure that it can be read reliably. This takes up valuable space that could be used for more important information, such as product information and artistic design elements that enhance the value and attractiveness of the object to users. Second, it creates a potential for confusion and complexity in image processing for image-based scanners, which are rapidly replacing laser scanners. While laser scanners can be directed at particular barcodes, one at a time, image-based scanners capture image frames that may contain part or all of one or more of the optical codes. Third, to reduce the visual impact of these codes, they are often reduced in size and confined to difficult to find locations on the objects. This makes them less reliable, and harder for users and machine vision equipment to locate and read reliably.

Other types of optical codes, such as robust digital watermarks, provide alternatives to conventional barcodes that address these challenges in various ways. Digital watermarks may be hidden within other images on the object, and thus not occupy valuable, dedicated space. They also may be redundantly encoded over the object surface to improve the ease of locating and reliably reading the digital data codes they carry (referred to as the payload, or message). This simplifies the task of imaging the object to obtain image frames from which the digital watermark payload can reliably be decoded.

The watermark technology also improves computational efficiency and reliability of automatic data capture in a variety of usage scenarios. It does so because it facilitates reliable data capture from arbitrary and partial views of the object or label, even if ripped, smudged or crinkled.

While digital watermarks provide these enhancements, there are important applications where there is a need for improved optical data carrying capability that meets aesthetic, robustness, and data capacity requirements.

One challenge is the formation of minimally invasive optical codes for host image areas lacking image content that can mask the optical code or even act as a carrier of it. In these areas, it is possible to generate a subtle tint that carries machine-readable data. Additionally, in some cases, it is possible to select ink colors, or a combination of inks, to reduce visibility of the optical code to humans while retaining reliability for standard visual light scanning. For visual quality reasons, it is generally preferable to generate an optical code at a higher spatial resolution and space the graphical elements (e.g., dots) of the code at a distance from each other so that they are less noticeable.

However, there are often limits to color selection and resolution that preclude these options. Many objects are printed or marked with technology that does not allow for color selection, and that does not reliably mark dots below a minimum dot size. The use of low-resolution thermal printers to print optical codes on small labels, sometimes at high print speeds, is one example. Other examples include commercial printing of small packages that use techniques like dry offset or flexographic printing, which are incapable of rendering with high quality and consistency at high resolution and small dot sizes. Moreover, there are often restrictions based on design and cost constraints of using additional inks. Finally, even if rendering equipment can leverage higher resolution and smaller dot marking, and various color inks, the image capture infrastructure or mode of image capture may be incapable of capturing higher resolution or color information.

Another persistent challenge is the need to reliably read data from increasingly smaller spatial areas. The demand for increasing data capacity is fundamentally at odds with reliable recovery of that data from a limited area.

As detailed in this specification, we have developed several inventive optical code technologies that address these and other challenges for various applications. One inventive technology is a method for generating an optical code that optimizes parameters for visual quality and robustness (reliability) constraints. These parameters include spatial density, dot placement (e.g., spacing to avoid clumping), dot size and priority of optical code components. In the latter case, the priority of code components, such as reference (synchronization) signal and payload components, is optimized to achieve improved robustness and visual quality.

Inventive technologies include methods for converting optical code components into signal rich art. These methods include techniques for drawing line art so as to emphasize prioritized components of the optical code. They also include methods for generating stipple, Voronoi and Delaunay patterns from optical code components.

Additional inventive technologies include optical code insertion and decoding methods. The optical code insertion methods merge the optical codes into host image content, such as a package or label design. Certain embodiments of the insertion method take into account and leverage attributes of a host image to improve visual quality and robustness. Embodiments of the decoding methods efficiently and reliably decode the payload from degraded images captured of marked objects.

These inventive methods are implemented in optical code generators, inserters, optimizers and decoder components. These components are implemented in software modules executed by processors of various kinds, such as those used in thermal label printers, pre-press workstations, mobile devices, and image-based barcode scanners of various kinds. The software instructions may also be converted to logic circuitry, such as application specific integrated circuits, programmable gate arrays, or combinations of them.

Additional inventive features will become apparent in the follow detailed description and accompanying drawings.

BRIEF DESCRIPTION OF THE DRAWINGS

FIG. 25 is yet another example in which tiles of the optical code have been merged with text.

FIGS. 30A and 30B show excerpts of an image rendered with sparse signals of different bump sizes.

FIGS. 43-44 illustrate additional examples of optical code signal tiles generated from coordinates of maxima in a dense optical code signal tile.

DETAILED DESCRIPTION

This specification details embodiments of the technology with reference to flow diagrams and narrative descriptions. The diagrams and descriptions are implemented with processing modules that are most commonly realized by software instructions for configuring programmable hardware devices. In some embodiments, such software instructions are converted to firmware for integration into printers and scanners, or converted into digital logic circuitry.

Figure 1:
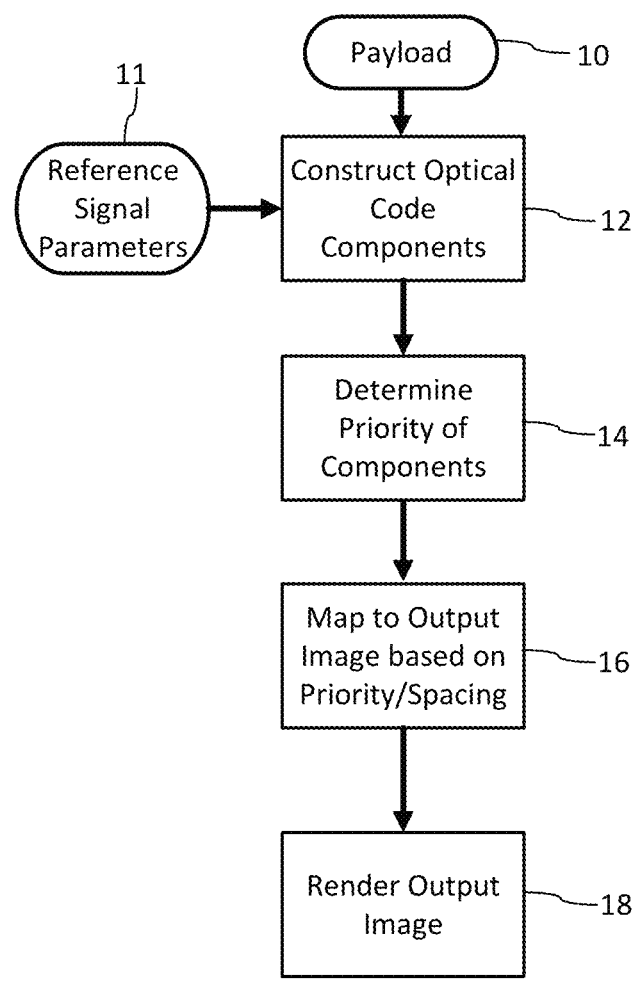
FIG. 1 is a diagram of a method of generating an optical code with variable spatial density to adapt for visual quality and reliability constraints.

FIG. 1 is a diagram of a method of generating an optical code with variable spatial density to adapt the code for visual quality and reliability constraints. An objective is to generate an optical code for insertion into an image or other carrier such that the parameters of the optical code are optimized. These parameters include robustness and visual quality. The method achieves improved robustness by determining a priority of optical message components that attains or surpasses robustness metrics while also providing desired spatial density and spacing of optical code elements. The density and spacing (to avoid dot clumping) constraints enable the method to optimize the optical code reliability while satisfying visual quality constraints.

The method begins with inputs of a variable payload sequence 10 and reference (registration) signal parameters 11. From these inputs, the method constructs components of the optical code (12). These components are comprised of payload and reference signal components. As detailed further below, these components are not necessarily distinct, yet need to be optimized to provide the robustness, signal capacity and visual quality per unit area in which they are applied to rendered output. This rendered output is an object marked with the optical code, such as by printing an image carrying the code ("output image"), including marking the output image onto a substrate by other means such as etching, engraving, burning (including thermal printing), embossing (e.g., via a mold or embossing plate), etc.

The method determines the priority to be applied to the components (14). This priority is derived by determining the parameters of the optical code that optimize robustness within constraints, such as dot size, spatial density and spacing of elements (e.g., dots or holes).

With the priorities, the method proceeds to map the optical code into an output image within the visual quality constraints (16). The output image is then rendered to a physical form, such as a paper or plastic substrate of a packaging or label material (18).

Figure 2:
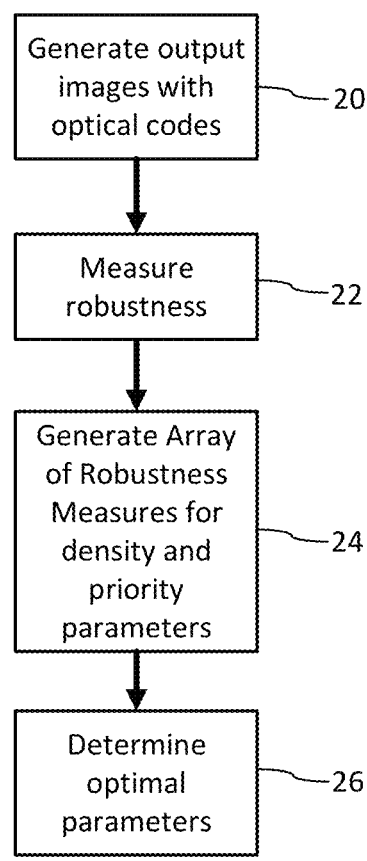
FIG. 2 is a diagram of a method for optimizing parameters of an optical code.

FIG. 2 is a diagram of a method for optimizing parameters of an optical code. This method optimizes the dot density, dot spacing and relative priority of optical code components. To optimize the optical code for a particular application, the method operates on a set of test images that are representative of the types of images of that application. For example, for optical codes used on labels, such as those typically printed by thermal printers for adhering to fresh food items (bakery items, meats and deli items, prepared foods, etc.), the test images are a set of label images. These label images are comprised of visual elements such as text, graphics, and conventional 1 or 2 dimensional barcodes. The test images are comprised of a mix of text, graphics and conventional, visible barcodes that are expected to be found on most of the label images in normal use.

Likewise, for packaging, the test images are a set of images that conform to a product manufacturer's style guides and are comprised of text in particular fonts, sizes and spacing, images, logos, color schema (including inks and spot colors), substrate types, including metal, plastic and paper based packaging materials, and preferred print technologies (offset, dry offset, digital offset, ink jet, thermal, flexographic, and gravure). In this case, the test images may be a set of training images of a particular package design, which simulate various forms of degradation incurred in the image due to rendering, use and scanning.

For each of the test images, the method generates an output image with an inserted optical code (20). The optical code is constructed from the payload and reference signal components using techniques detailed further below. The output of constructing a code for a test image is the test image bearing an array of optical code elements at spatial locations. For ease of description, we refer to these elements as "dots," and the particular geometric structure of a dot may take various shapes. The form of the image is binary in that its pixels correspond to a binary value, mark or no mark signal. For printing with inks, mark or no mark refers to ink or no ink at the pixel location for a particular color separation (e.g., process color CMY or K, or spot color). The pixels of the output image may correspond to test image elements, optical code elements or a mix of both. However, in some implementations, it is preferred to maintain a spacing of optical code elements at a minimum distance from image elements (including text) on the label, or to otherwise specify locations at which elements are not to appear.

For each output image, a set of parameters is selected by sampling each parameter value from an allowable range of values for that parameter. In one implementation, the parameters are dot density of the optical code, minimum inter-spacing of optical code elements, and priority of optical code components. In one implementation, the priority value is applied as a relative priority of optical code elements, namely a relative weighting of reference and encoded digital payload components.

After generating an output image, the method measures the robustness of the optical code in the output image (22). The robustness is measured by a robustness prediction program that computes detection metrics from the output image, simulating degradation due to rendering, use and scanning. These detection metrics are computed using the techniques detailed in U.S. Pat. Nos. 9,690,967, 10,217,182, and International publication WO2018165667, which are incorporated by reference. See also U.S. application Ser. No. 15/918,924, filed Mar. 12, 2018 (Now U.S. Pat. No. 10,382, 645), which is also incorporated herein by reference.

The detection metrics include a metric that measures the reference signal of the optical code, and a metric from the digital payload (e.g., correspondence with an expected payload). One detection metric for the reference signal is a correlation metric that measures the correlation between the known reference signal and the reference signal in an image under test. Another metric, for a reference signal defined in a frequency domain is an average of frequency magnitude values relative to neighboring values for frequency domain locations corresponding to the sinusoids of the reference signal. This measure reflects how strong the reference signal is relative to noise, including other image elements in the test image. One detection metric for the digital payload is a measure of the number of payload bits or encoded bits that match expected values based on comparing extracted bits with expected bits for a particular payload. The optical code is repeated in contiguous tiles of the output image. Additionally, there is spatial redundancy within a tile. Thus, the detection metrics may be computed per unit area, where the unit of area ranges from the smallest area from which the code may be detected to the area of a few contiguous tiles in horizontal and vertical dimensions.

The process of measuring robustness preferably takes into account the expected degradation of the optical code in its rendering, use and scanning. To do so, the degradation is simulated on the output image prior to measuring robustness. The scanning mode is also simulated, as the optical code may be read by a swiping motion, or by a presentment mode. In the presentment mode, the object is expected to be presented to an imager, such that the imager and object are substantially static. The mode of scanning has implications on the robustness of the optical code. One implication of swiping is that the scanning may introduce blur. Another is that the optical code may be read from plural tiles in the path of the swipe. An implication of presentment mode is that the imager may only capture a portion of the object, e.g., part of one side. Thus, the reliability at several different potential object views needs to be considered in the overall robustness score. In the case of a swipe mode, the robustness measure may be summed from detection metrics along one or more paths of a swipe scan.

The processes of generating optical codes and measuring robustness is executed for each test image and for each parameter being optimized (e.g., minimal optical code element spacing at an optical code density for a tile, optical code element size, and optical code component priority). The method then generates an array of robustness measurements, with a robustness measure per parameter space sampling (24). The parameter space refers to a multidimensional space in which the parameter space coordinates are parameter candidates, e.g., priority value, dot spacing, dot size, dot density, or some sub-combinations of these candidates.

Next, the method determines the optimal parameters from the robustness measurements. To do so, the method analyzes the array of robustness measurements in the parameter space to find the region in the parameter space where the robustness measurements exceed a desired robustness constraint (26). This region defines the set of parameters for the optical code element spacing and priority that are expected to provide the desired robustness. In one approach, the method finds the location in the parameter space that minimizes the distance to a maxima in robustness score for each test image.

Having described the process of optimizing parameters for an optical code, we now describe embodiments of optical codes with variable density that are useful for integrating the codes on labels or packaging with text and graphics.

Figure 3:
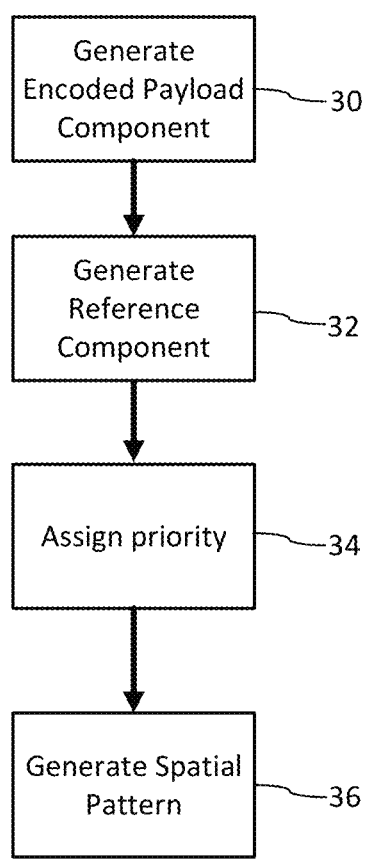
FIG. 3 is a diagram illustrating a process for constructing an optical code.

FIG. 3 illustrates a process for constructing an optical code. This is an embodiment of an optical code generator. In this embodiment, separate variable payload and reference signal components are generated and then combined. The payload is a sequence of data symbols, which each represent two or more (binary or M-ary) message symbol values. The integer value, M, in the term, M-ary, is the number of possible symbol values per symbol element. For example, in the case of M=3, the symbol values have one of three states, such as 1, 0 and −1, or correspond to signal feature values of three different quantization bins. The latter refers to a modulation scheme where a feature value of the host image is quantized to one of the quantization bins corresponding to the symbol value. To make the payload more robust, it is encoded redundantly using a combination of error correction, error detection, repetition and carrier signals.

The processing in block 30 transforms the payload into a robust encoded payload component in which symbols of the payload are conveyed in plural elements of the encoded payload component. These elements form a payload signal waveform with a spatial arrangement and amplitude. The processing includes: computing error detection symbols (binary or M-ary) from a variable user data string of payload symbols, appending the error detection symbols to symbols representing the variable user data string, and error correction of the resulting sequence of symbols to form an error correction encoded payload. The sequence of payload symbols is error correction-encoded, as described in connection with FIG. 6.

The symbols of this payload may be modulated onto a carrier signal for additional robustness. The encoded payload is then mapped to spatial locations to form a robust encoded payload component of the optical code.

The reference signal component is a signal used to detect the optical code within the output image and perform geometric synchronization. The processing in block 32 generates the reference signal component by specifying its signal waveform properties, such its spatial arrangement and amplitude. One type of reference signal component is a constellation of sinusoids (peaks in the frequency domain) with pseudorandom phase. In the spatial domain, the image form of this reference signal looks like a noise pattern. An example of this type of optical code, with encoded payload and reference signal, is described in U.S. Pat. No. 6,590,996, which is incorporated by reference.

An exemplary reference signal is composed of several dozen spatial sinusoids that each spans a 2D spatial block with between 3 and 50 cycles in horizontal and vertical directions, typically with different phases. The integer frequencies assure that the composite signal is continuous at edges of the block. The continuous signal is sampled at uniformly-spaced 2D points to obtain, e.g., a 64×64 or 128×128 reference signal.

In block 34, the embodiment assigns a priority to elements of the encoded payload and reference signal components. This is implemented by applying a weighting to the elements according to the assigned priority. For example, the method multiplies amplitude values of signal elements by a weighting factor proportional to the priority of the optical code component of those elements.

The embodiment of FIG. 3 then constructs the optical code into a two-dimensional spatial image representation in block 36.

Figure 4:
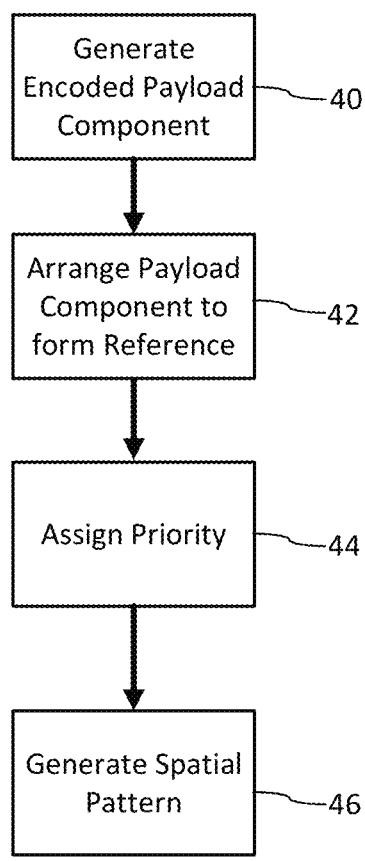
FIG. 4 is a diagram illustrating another process for constructing an optical code.

FIG. 4 illustrates another process for constructing an optical code. This is a variant of FIG. 3 in which the reference signal component is formed in the arrangement of encoded payload component. In block 40, this embodiment generates an encoded payload component. This approach may use similar error correction coding and modulating onto a carrier signal as the embodiment of FIG. 3. Then, in block 42, this embodiment arranges the encoded payload elements into a pattern that forms a reference signal component. An example of this approach is described in U.S. Pat. No. 9,747,656, which is incorporated by reference. In a variant of this approach, encoded payload elements are spatially interleaved with fixed reference signal elements. The fixed elements form a pattern of the reference signal component.

To assign priority to the components in block 44, the embodiment weights signal elements of the encoded payload and fixed elements. This approach produces a spatial pattern of weighted elements, arranged so as to form a reference signal (46).

Figure 5:
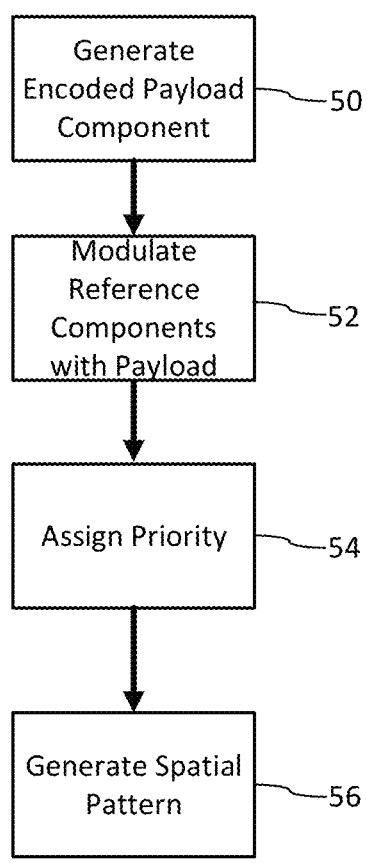
FIG. 5 is a diagram illustrating another process for constructing an optical code.

FIG. 5 is a diagram illustrating another process for constructing an optical code. This is another variant of FIG. 3 in which the reference signal component serves as a carrier for encoded payload signal elements. In block 50, this embodiment generates an encoded payload component in a similar way as described above for block 30 of FIG. 3 and detailed further in FIG. 6.

In block 52, the embodiment modulates components of a reference signal with elements of the encoded payload signal. In one implementation, the reference signal comprises a collection of spatial sine waves, each with a phase value. The payload is encoded by shifting the phase of a sine wave according to the value of an encoded payload signal element. In one protocol, the encoded payload elements are binary, meaning that they have one of two different values per element. One binary value is represented with zero phase shift and the other by a phase shift of π (180 degrees) of the corresponding sine wave. In other protocol variants, the encoded payload signal is M-ary, with M>2. The value of M is limited by robustness constraints, as the higher it is, the more difficult it is to distinguish among different symbol values encoded in an image feature. The encoded payload is modulated onto the reference signal carrier component by shifting the phase into one of M corresponding phase shift states (e.g., 0, π/2, π, or 3π/2 radians). This may be implemented as form of quantization-based modulation, where the phase of the reference signal component is quantized to fall within the phase shift bin corresponding to the encoded payload symbol.

Not all components of the reference signal need to be modulated with payload signal. Instead, some subset of the reference signal may remain un-modulated, and this un-modulated component serves as a reliable signal for a first stage of detection. For example, the reference signal may be comprised of 200 sine waves, with a subset (e.g., 40-60) remaining fixed, and the others available for modulation by a corresponding payload signal element.

Another approach to modulating a reference signal is on-off keying of reference signal components. In this approach, a subset of reference signal sine waves is fixed, and the remainder are modulated to convey data using on-off keying. In this on-off keying, encoded payload symbols are encoded by including, or not, a sine wave at predetermined frequency location. Each encoded payload element is mapped to a frequency location within an image tile. Where the payload element is a first binary value (e.g., 0 or −1), the sine wave for that element is not included. Conversely, where the payload element has a second binary value (e.g., 1), the sine wave for that element is included.

In block 54, the embodiment assigns priority to the optical code signal components. This is implemented for example, by applying a scale factor to selected sine wave components according to priority. Higher priority signal components are given greater weight by multiplying by a larger scale factor. Additionally, different scale factors may be applied to the fixed vs. modulated reference signal components to provide a greater relative priority to parts of the reference signal that are modulated or fixed.

In block 56, the embodiment generates a spatial pattern of the optical code with its modulated reference signal components. In the case of the sine wave embodiment, there are alternative methods to generate the spatial pattern. One alternative is to apply an inverse frequency domain transform on the complex components in the frequency domain, such as an inverse Fast Fourier Transform (FFT). Another alternative starts with spatial domain waveforms of each sine wave component and adds them together to form the spatial pattern. As an alternative to sine waves, other carrier signals, such as orthogonal arrays, which have good auto-correlation but low cross correlation, may be used. These orthogonal arrays map to locations in a two-dimensional image tile.

The output of each of the optical code generators in FIGS. 3-5 is a spatial domain image block. The pixel values of the block are multi-valued, e.g., eight bits per pixel. This image block may be used as signal tile, which is repeated and merged with host image content of a host image to form an output image. The output image is a label or package design, which is rendered onto a substrate by a printer or other marking equipment (embosser, engraver, etcher, or the like). The signal components are prioritized according to the assigned priority. This priority enables the optical code to be filled into spatial areas of the host image design according to a signal priority and dot density and spacing that optimizes robustness and visual quality constraints.

For the avoidance of doubt, "multi-valued" as used in this document refers to elements/pixels that have more than two possible states. For example, they may be grayscale elements (e.g., an 8 bit representation), or they may have floating point values.

We now detail sub-components of the optical code generators of FIGS. 3-5.

Figure 6:
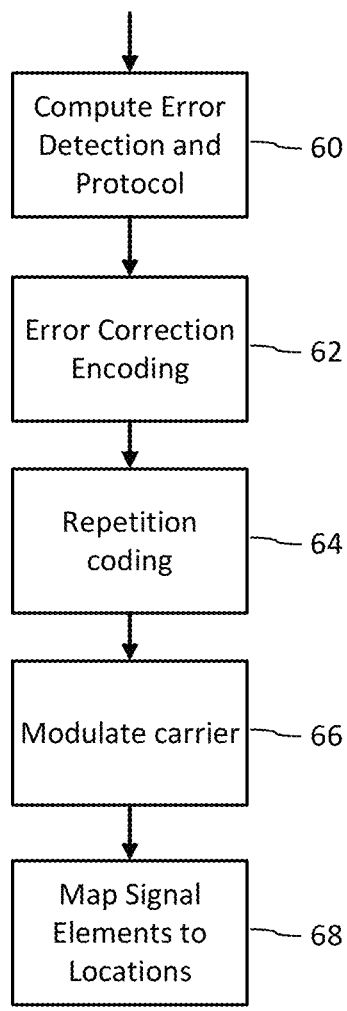
FIG. 6 is a diagram illustrating a method of encoding a variable digital payload to be conveyed in an optical code.

FIG. 6 is a diagram illustrating a method of encoding a variable digital payload to be conveyed in an optical code. This section explains additional examples of how to generate encoded payload components in the embodiments discussed previously.

In processing module 60, the data payload is processed to compute error detection bits, e.g., such as a Cyclic Redundancy Check, Parity, check sum or like error detection message symbols. Additional fixed and variable messages used in identifying the payload format and facilitating detection, such as synchronization signals may be added at this stage or subsequent stages.

Error correction encoding module 62 transforms the message symbols into an array of encoded message elements (e.g., binary or M-ary elements) using an error correction method. Examples include block codes (e.g., BCH, Reed Solomon, or the like), convolutional codes, turbo codes, etc.

Repetition encoding module 64 repeats the string of symbols from the prior stage to improve robustness. Repetition encoding may be removed and replaced entirely with error correction coding. For example, rather than applying convolutional encoding (e.g., at ⅓ rate) followed by repetition (e.g., repeat three times), these two can be replaced by convolution encoding to produce a coded payload with approximately the same length.

Next, carrier modulation module 66 takes message elements of the previous stage and modulates them onto corresponding carrier signals. For example, a carrier might be an array of pseudorandom signal elements, with equal number of positive and negative elements (e.g., 16, 32, 64 elements), or waveform, such as sine wave or orthogonal array. In the case of positive and negative elements, the payload signal is a form of binary antipodal signal. It also may be formed into a ternary (of 3 levels, −1, 0, 1) or M-ary signal (of M levels). These carrier signals may be mapped to spatial domain locations or spatial frequency domain locations. Another example of a carrier signal is the above-described sinusoids (sine waves), which are modulated using a modulation scheme like phase shifting, phase quantization, and/or on/off keying.

The carrier signal provides additional robustness, as it spreads the encoded message symbol over the carrier. As such, the use of larger carrier arrays reduces the redundancy employed in error correction and/or the need for repetition code. Thus, the error correction codes, repetition and carrier signals may be used in various combinations to produce an encoded payload signal for a tile that achieves the desired robustness and signal carrying capacity per tile.

Mapping module 68 maps signal elements of the encoded payload signal to locations within an image block. These may be spatial locations within an image tile. They may also be spatial frequency locations. In this case, the signal elements are used to modulate frequency domain values (such as magnitude or phase). The resulting frequency domain values are inverse transformed into the spatial domain to create a spatial domain signal tile.

Mapping module 68 also maps a reference signal to locations in the image block. These locations may overlap, or not, the locations of the payload. The encoded payload and reference signal are signal components. These components are weighted and together form an optical code signal.

To accurately recover the payload, an optical code reader must be able to extract estimates of the encoded data payload signal elements at their locations within an image. This requires the reader to synchronize the image under analysis to determine the tile locations, and data element locations within the tiles. The locations are arranged in two dimensional blocks forming each tile. The synchronizer determines rotation, scale and translation (origin) of each tile.

The optical code signal comprises an explicit and/or implicit reference (registration) signal. An explicit reference signal is a signal component separate from the encoded payload that is included with the encoded payload, e.g., within the same tile. An implicit reference signal is a signal formed with the encoded payload, giving it structure that facilitates geometric synchronization. Because of its role in geometric synchronization, we sometimes refer to the reference signal as a synchronization, calibration, grid, or registration signal. These are synonyms. Examples of explicit and implicit synchronization signals are provided in our U.S. Pat. Nos. 6,614,914, and 5,862,260, which are incorporated herein by reference.

In particular, one example of an explicit synchronization signal is a signal comprised of a set of sine waves, with pseudo-random phase, which appear as peaks in the Fourier domain of the suspect signal. See, e.g., U.S. Pat. Nos. 6,590,996 and 6,614,914, and 5,862,260, which describe use of a synchronization signal in conjunction with a robust data signal. Also see U.S. Pat. No. 7,986,807, which is incorporated by reference.

Our US Publications 20120078989 and 20170193628, which are also incorporated by reference, provide additional methods for detecting a reference signal with this type of structure, and determining rotation, scale and translation. US 20170193628 provides additional teaching of synchronizing an optical code reader and extracting a digital payload with detection filters, even where there is perspective distortion.

Examples of implicit synchronization signals, and their use, are provided in U.S. Pat. Nos. 6,614,914, 5,862,260, 6,625,297, 7,072,490, and 9,747,656, which are incorporated by reference.

Figure 7:
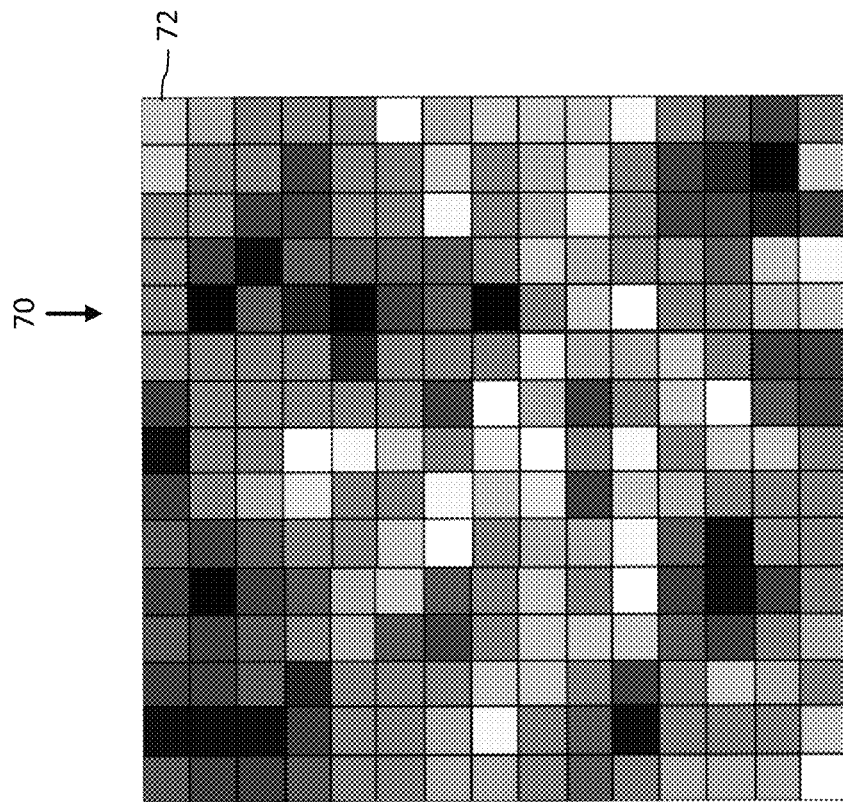
FIG. 7 is a diagram illustrating a tile of an optical code component. This may be used as a reference signal component, an encoded payload component, or a reference signal encoded with a payload. It may also be used as an encoded payload signal that is arranged into a reference signal structure.

FIG. 7 is a diagram illustrating part 70 of an image tile of an optical code component. This part is comprised of an array of pixels (e.g., 72), each having a value, depicted here as a grayscale value. This part of a tile has 15 by 15 pixels. We provide additional examples of tile size and dimensions used for optical codes below.

This component may be used as a reference signal component, an encoded payload component, or a reference signal encoded with a payload. It may also be used as an encoded payload signal that is arranged into a reference signal structure.

For the sake of illustration, we provide an example in which this part 70 is a reference signal component. Through this example, illustrated in the ensuing diagrams, we explain how reference and payload components are formed, prioritized, and combined to form a dense optical code signal tile. We refer to this state of the optical code as "dense," as the intent is to use it to produce a transformed version at a variable spatial density, which is more sparse (a sparse code signal at a desired dot density). To achieve the desired dot density, this dense optical code signal tile is then mapped into a spatial pattern based on priority of the code signal elements. In this example, the reference signal comprises sine waves which are converted to a spatial domain image, as depicted in FIG. 7. These sine waves form peaks in the spatial frequency domain. A similar effect may be achieved by using a spatial pattern of fixed or encoded payload elements with redundancy that also forms peaks in the spatial frequency domain.

Figure 8:
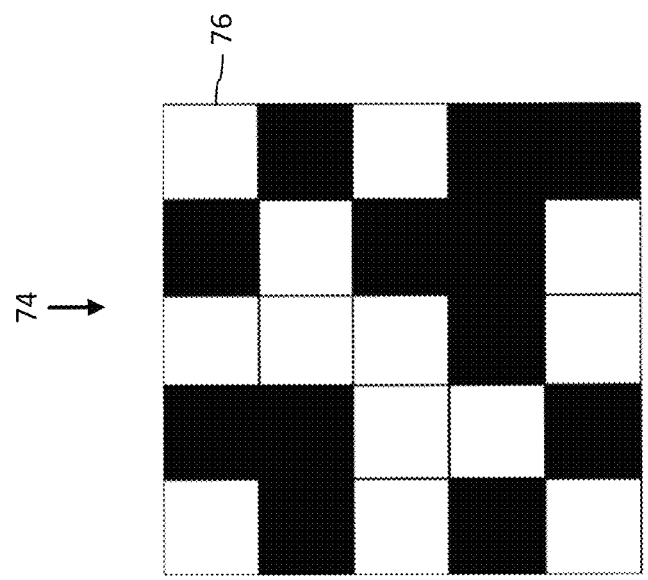
FIG. 8 is a diagram of a tile of an encoded payload signal.

FIG. 8 is a diagram illustrating part 74 of a tile of an encoded payload signal. This part 74 is an array of pixels (76) in which the pixel values are binary, either black or white. These values correspond to the encoded payload signal conveyed by modulating each of the binary values of an error correction coded payload onto a carrier (e.g., a PN sequence), and mapping the resulting modulated carrier signal elements to pixel locations. The result is an encoded payload signal, a part of which is depicted in FIG. 8.

Figure 9:
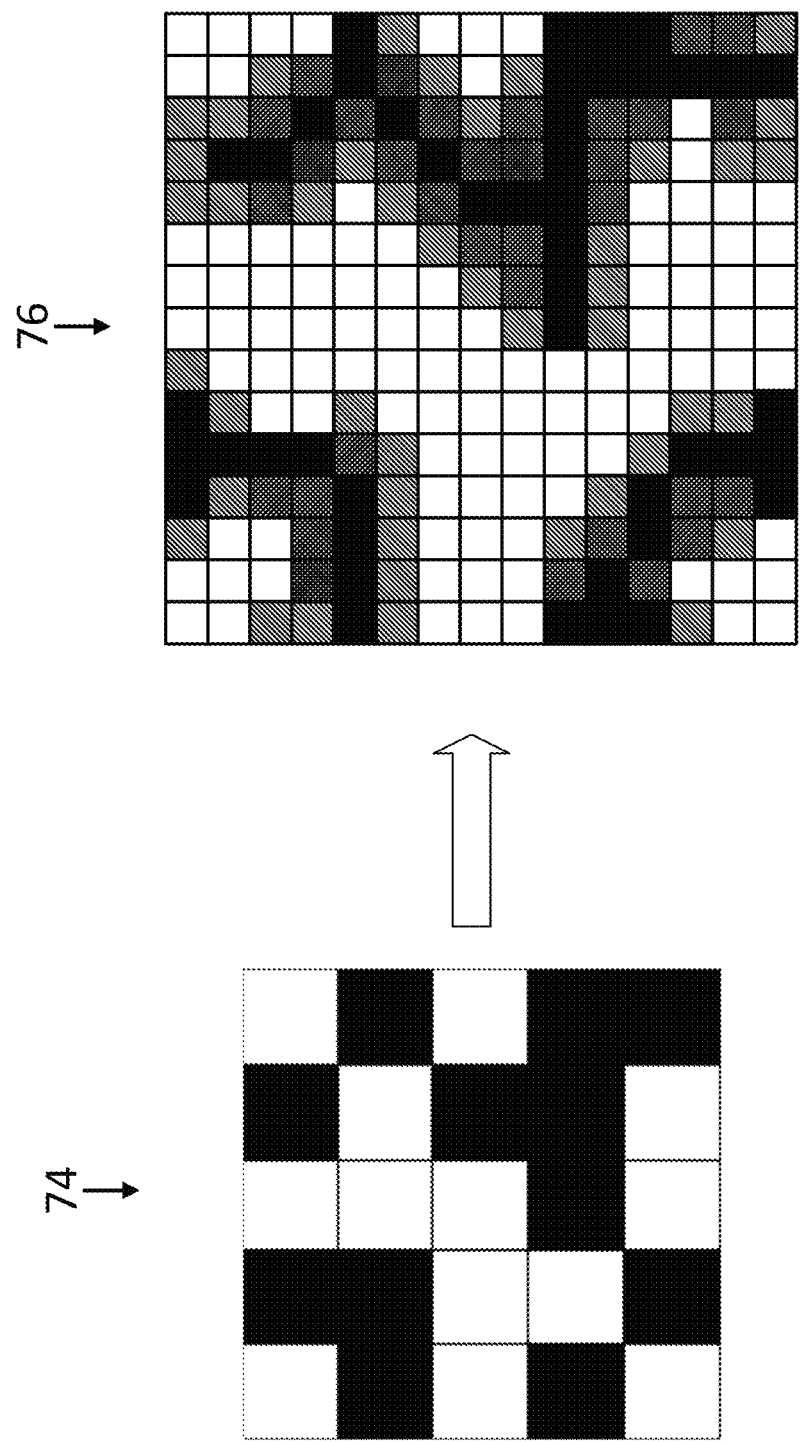
FIG. 9 is a diagram of the encoded payload signal of FIG. 8, transformed to the spatial resolution of the optical code component of FIG. 7.

FIG. 9 is a diagram of the encoded payload signal 74 of FIG. 8, transformed to the spatial resolution of the optical code component of FIG. 7. Prior to combining with the reference signal, the encoded payload component 74 is spatially scaled to a target resolution at which the optical code is inserted into a host image. This target resolution may also be the resolution at which the host image is rendered onto an object. In this example, the reference signal is generated at the target resolution for insertion into a host image, and the encoded payload signal is scaled to the same target resolution. This resolution is, for example, 203 dots per inch for many thermal label printers, or 300 dots per inch or higher for other commercial printing machines. These are just examples and the target resolution varies with application and printing technology employed. There are a variety of techniques that may be used for the resizing, such as bi-linear or cubic interpolation, Lanczos resampling, or the like. This spatial scaling of the encoded payload signal produces an image 76 such as the one shown on the right of FIG. 9 with pixels at the target elements per inch resolution. The grayscale depiction of the pixels in the 15 by 15 pixel array of image 76 reflects that the pixels are no longer binary valued.

Figure 10:
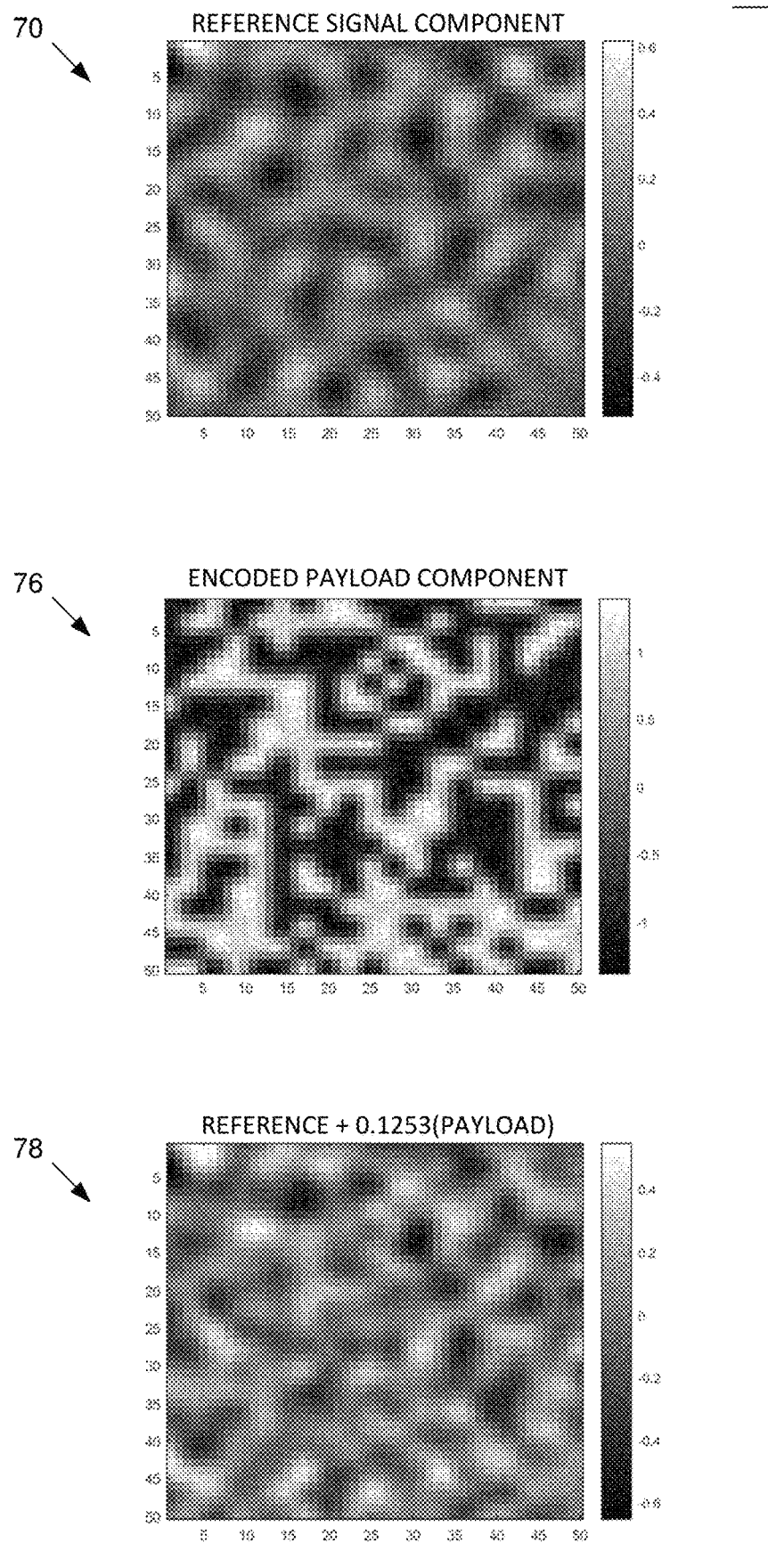
FIG. 10 is a diagram illustrating a combination of optical code elements, including an encoded payload and a reference component, to form a dense composite optical code.

FIG. 10 is a diagram illustrating a combination of a reference signal component 70 and an encoded payload (message) component 76 to yield a dense composite code signal 78.

In this example, the reference signal elements 70 are added to corresponding encoded payload signal elements 76 at the target resolution of the rendering system. This requires up-sampling the payload component, which produces some pixel elements of intermediate values, i.e., grey, rather than black or white. (Similarly, the up-sampling, here done by a bicubic interpolation algorithm, yields some overshoot of signal values, resulting in some values above +1 and below −1.) To prioritize the elements, one of the reference or payload components is multiplied by a weighting factor representing a relative weighting of the reference signal to the encoded payload signal. In this example, the payload component 76 is weighted by a factor of 0.1253, and summed with the reference component 70 to form the dense, composite optical code signal 78. The magnitude of the resulting values establishes the priority of the individual elements of the optical code signal 78.

FIG. 10 shows the component and composite signal values in floating point format. To the right of each of blocks 70, 76 and 78 is a graphical scale indicating the corresponding element values.

Figure 11:
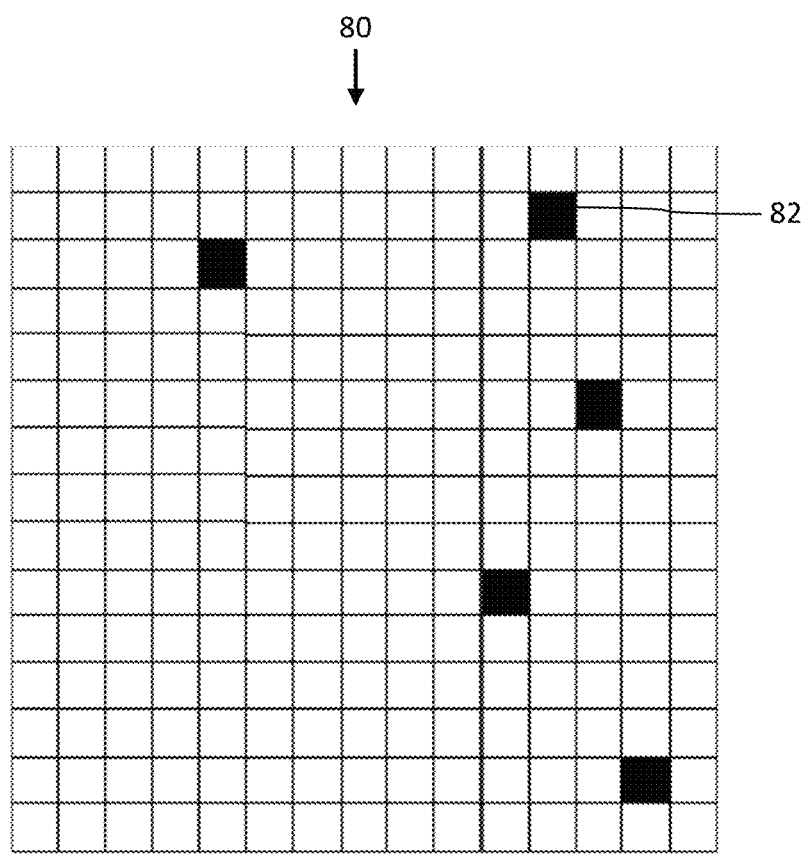
FIG. 11 is a diagram of a mapping of a dense composite optical code (like FIG. 10) to an output image according to priority of its optical code elements and spatial constraints (e.g., element spacing and signal density).

FIG. 11 is a diagram of a mapping of a dense composite optical code signal to an output image 80 according to priority of its optical code elements and spatial constraints (e.g., element spacing and signal density). In this mapping, the mapping method fills the pixel locations of the output image 80 according to the priority of the elements, with highest priority elements being filled first, followed by filling elements of next highest priority. Additionally, the filling process adheres to a spacing (placement) constraint, such as a minimum distance between dots. Both the priority of the components and the placements are optimized for a particular dot density using the method described above with reference to FIG. 2. The output of the mapping is a spatial pattern of the optical code, comprised of binary valued pixels at the target resolution. The binary valued pixels correspond to dots, which are marked on a substrate to apply the optical code to the substrate. Within the redundantly encoded signal of the dense optical code, we have found that the peaks of the dense signal are the most important to retain in a sparse signal to achieve robustness and reliability. There are positive and negative peaks. When these are conveyed in the luminance of an image, these positive and negative peaks correspond to high and low luminance values. The same is true for cases where the optical code is conveyed in color channels, such as color or chroma components (e.g., CMY) of a color image or spot colors. In one approach, the mapping retains the peaks corresponding to dark pixel (low luminance) on a relatively higher luminance substrate. This approach is reflected in FIG. 11, where dark pixels (e.g., 82) correspond to negative peaks.

This approach may be enhanced further by encoding positive peaks as a "hole" formed by an arrangement of dark pixels around a relatively higher luminance area. On a higher luminance substrate, the hole is formed by marking dark pixels around a blank pixel located at the positive peak. This blank pixel allows a lighter substrate or ink layer to be exposed, so that when imaged, it reflects a peak relative to its neighboring pixel values.

Figure 12:
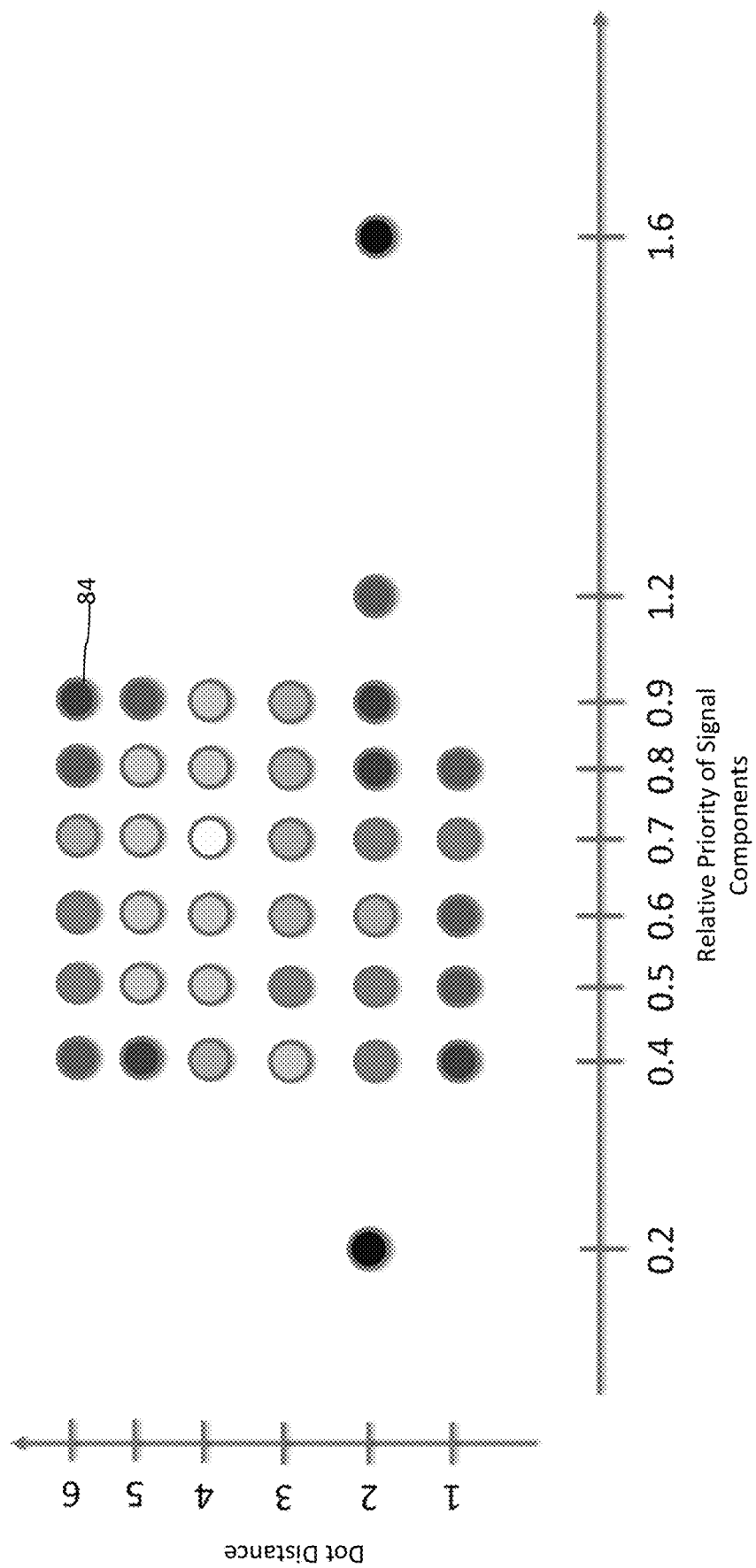
FIG. 12 is a diagram illustrating an example of a process for optimizing dot spacing and signal component strength ratios. These parameters are derived in a training process that generates and inserts optical codes at each of several combinations of these parameters into each test image in a set of test images.

We now elaborate further on the process of FIG. 2 for optimizing the optical code parameters. FIG. 12 is a diagram illustrating an example of a process for optimizing dot spacing and signal component priority for an optical code at a particular dot density. An additional parameter that may be optimized for a desired dot density is dot size. In this example, the dot spacing is represented as dot distance. The priority is represented as a relative priority of signal components. An example of this priority is the relative weighting of components explained in connection with FIG. 10. These priority and spacing parameters are derived in a training process that generates and inserts optical codes at each of several parameter space coordinates of priority and spacing parameters into each test image in a set of test images.

FIG. 12 illustrates a plot of robustness measurements for these test images. The vertical axis is the dot distance, which is a minimum distance between dots of the optical code. The horizontal axis is the relative priority of signal components, namely the reference and encoded payload signal components. The robustness measurements for the test images are shown as circles (e.g., 84), where the robustness measurements range from low (black) to high (white) values depicted in grayscale values.

As noted in connection with FIG. 2 and referenced patent documents, a robustness prediction program is used to predict the robustness of the test image for a given rendering and scan process. These referenced documents provide additional details on predicted code detection per unit area, robustness measurements for packaging and labels, referred to as scores, and metrics to predict robustness in response to simulated degradation and scanning modes.

The robustness prediction program produces a robustness measure for the test image, which is a composite of detection measurements it makes within the test image. The insertion process replicates tiles of the optical code in the test image. This replication of signal and the signal redundancy within a tile enables the robustness program to compute detection metrics within image block regions that are smaller than a signal tile. These detection metrics, including reference signal correlation and payload recovery metrics, are computed per spatial region and aggregated into a robustness score according to a function that takes into account the image capture (e.g., a swipe motion or static presentment of a marked object to a camera). Here the optical code is compatible with the digital watermark signal technology referenced in U.S. Pat. No. 9,690,967. It is compatible in the sense that the signal detection for watermark signals described in these documents also applies to the optical codes described in this specification. The optical code conveys a compatible signal in the form of sparse dots on lighter areas and/or holes in blank or solid areas of a package or label design. The process for applying this optical code to a package or label design fills areas in the design with optical code elements at the desired dot density.

Figure 13:
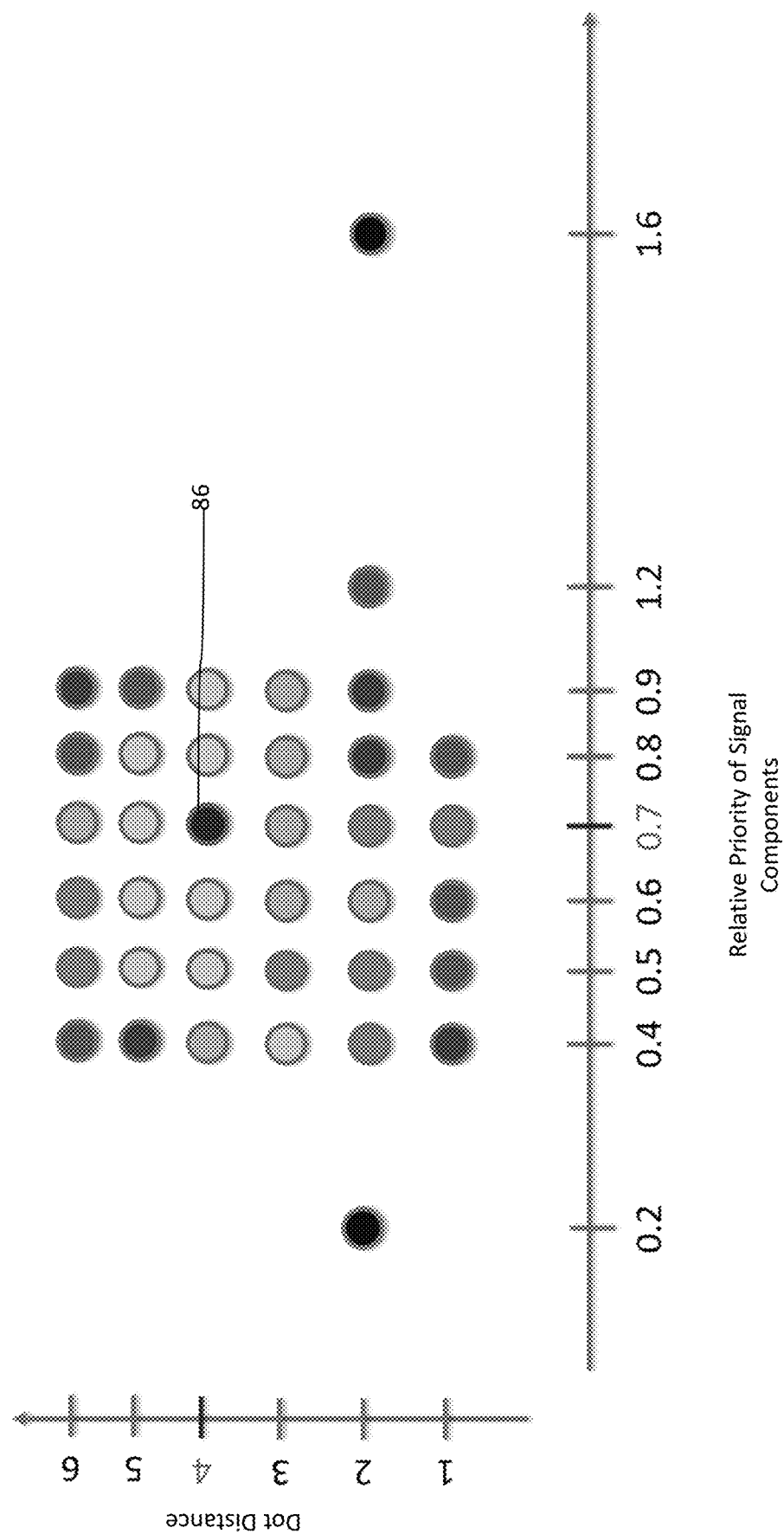
FIG. 13 is a diagram illustrating selection of optimal parameters in the example of FIG. 12 based on robustness metrics measured from the test images.

FIG. 13 is a diagram illustrating selection of optimal parameters in the example of FIG. 12 based on robustness metrics measured from the test images. In this example, the optimization method selects the location (86) in parameter space, at coordinates of dot distance=4, relative priority of 0.7, as this location has a robustness measure that exceeds a threshold value of reliability. In particular, in this example, this location provides a maxima in the measured robustness scores for the parameter ranges used in the training process.

One implementation searches for a location in parameter space that provides optimal robustness. It does so by computing the location in parameter space that provides a maximum robustness for each image in the training set of test images. The parameter space is defined as a space where the coordinates are values of the parameters being varied for the image, such as dot distance, dot size, dot density, and relative priority of signal component. Then, the optimization method finds the location in parameter space that minimizes the distance to the location of maximum robustness for each of the test images.

Figure 14:
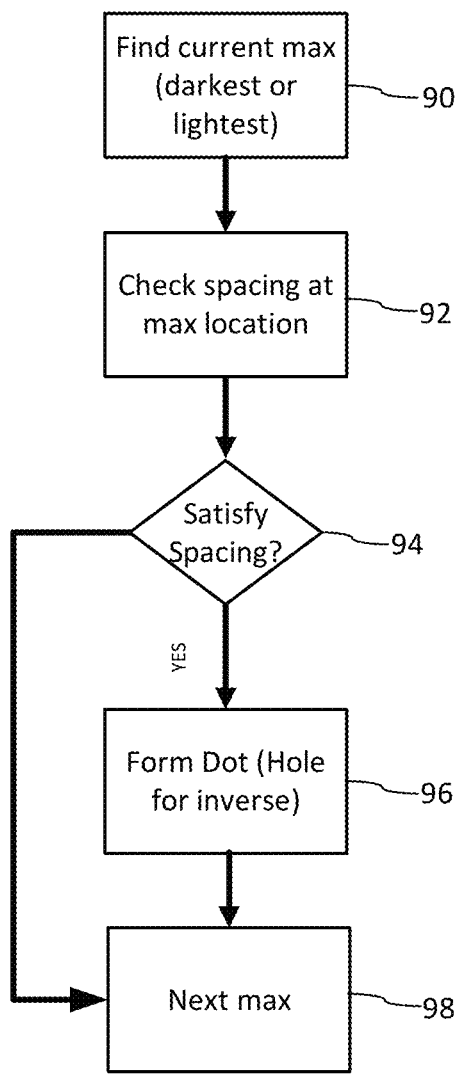
FIG. 14 is a flow diagram illustrating a method of forming elements of an optical code in a spatial area to achieve a desired dot density.

FIG. 14 is a flow diagram illustrating a method of forming elements of an optical code in a spatial area to achieve a desired dot density. This method begins with a dense, composite optical code, such as the one depicted in FIG. 10 (e.g., 78), having prioritized components. In this example, the priority is specified by amplitude of the element values in the optical code. It proceeds to map elements of the optical code to spatial locations of an output image to achieve a target spatial density. The mapping process prioritizes forming of the elements of the optical code in the output image based on amplitude. In the case of placing dark dots in a lighter area, the process proceeds in order of darkest to lightest element values in the optical code. Conversely, in the case of forming holes in a darker neighboring area, the process proceeds in order of lightest to darkest elements. Thus, to generalize, we use the term max in this description to cover both cases, with the perspective that the maxima (abbreviated as max) may refer to the darkest or lightest remaining element value as the process steps through element values in priority order determined based on amplitude.

In block 90, the mapping method begins by finding the max value among the multi-level pixel values in the dense optical code. An efficient way to implement the finding of the priority order is to sort the pixel values of the optical code by amplitude, and then step through in the order of the amplitude. The value being visited within an iteration of the process is referred to in FIG. 14 as the current max. For the current max, the process checks spacing of the location of the current max with the nearest element that has been formed previously in the output image (92).

If the location satisfies the minimum inter-spacing distance (94), it forms a dot at the location in the output image (96). The dot is placed according to the dot size and shape parameters set for the optical code at the target spatial resolution of the output image. When the location of the current max does not satisfy the minimum spacing requirement (94), the method proceeds to the next max among the remaining elements in the dense optical code (98), and a dot is not formed at the location of the current max. The placement process continues placing dots in this manner until the target spatial density is met.

The process of forming lighter "holes" amidst darker surrounding elements proceeds in a similar way, except that the max corresponds to the lightest element values of the optical code. Holes are formed by setting the pixel value at the output image location so that no ink, or a lighter ink relative to darker ink at neighboring locations, is applied at the location. In some variants, both dots and the inverse (holes) are formed at spaced apart locations satisfying the minimum spacing requirement. This has the advantage of increasing signal carrying capacity and signal robustness, as more signal of the optical code is retained in the output image.

FIGS. 15-22 illustrate this process graphically with a waveform 100 that represents the dense optical code in one dimension. In a discrete, digital form, the dense optical code signal is quantized into levels (e.g., 0-255 for 8 bit values) for a two dimensional array of pixel locations, sampled at a target spatial resolution. The waveform 100 has minima 102, 104 and maxima 106, 108, 110. Depending on the signaling scheme, the minima to maxima values range from darkest to lightest, or vice versa. For the sake of illustration, we describe an example where the minimum to maximum values range from darkest to lightest.

Figure 16:
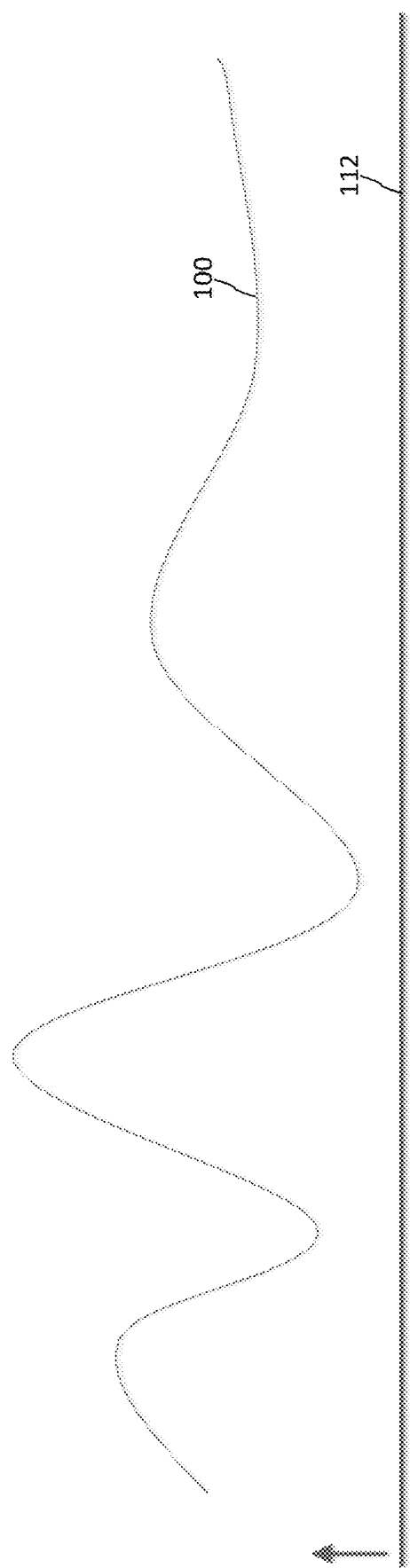

FIG. 16 depicts the start of the process forming optical code elements in an output image. As noted, the method of FIG. 14 forms elements in order of priority, and the priority is conveyed in the amplitude. The line 112 moving toward the waveform 100 depicts the approach of visiting elements of the optical code in order of amplitude, starting from the minima and progressing upward. Though FIG. 16 shows the waveform of the optical code in its original spatial arrangement, its discrete amplitude values are preferably sorted by amplitude so that the method advances efficiently by stepping through a sorted list.

Figure 17:
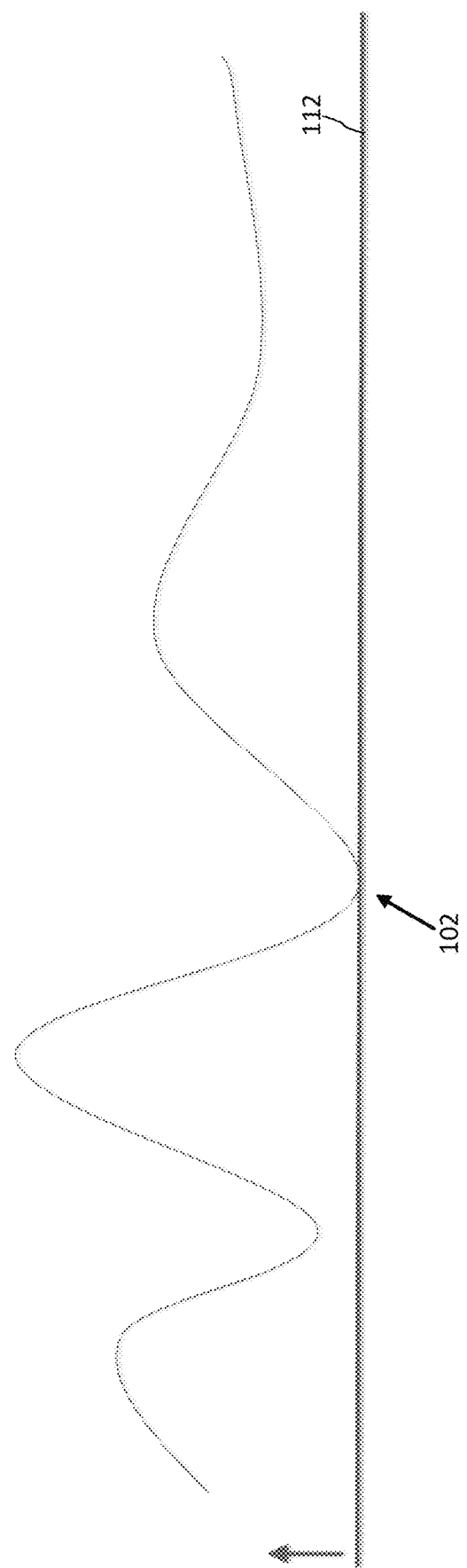
Figure 18:
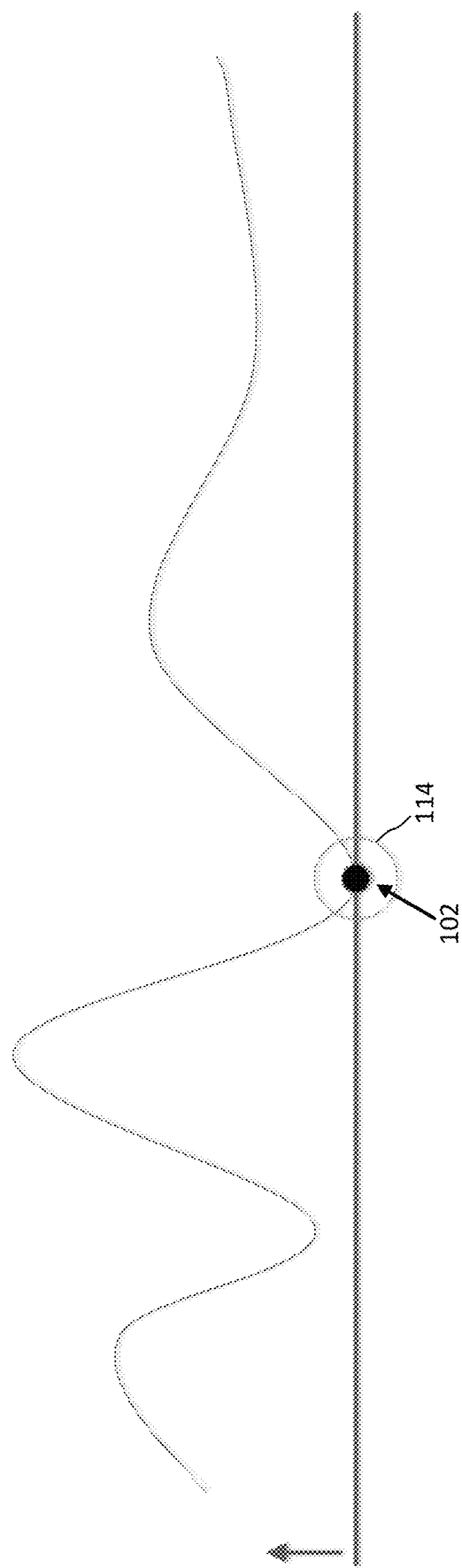

In FIG. 17, the process finds the darkest element (102). As shown in FIG. 18, an optical code element is formed at this location (102) and a minimum spacing depicted in ring 114 is enforced when the method forms additional elements of the optical code in the output image. The minimum distance refers to the minimum distance between outer edge of dot element 102 and nearest neighboring dot elements formed from the optical code signal.

Figure 15:
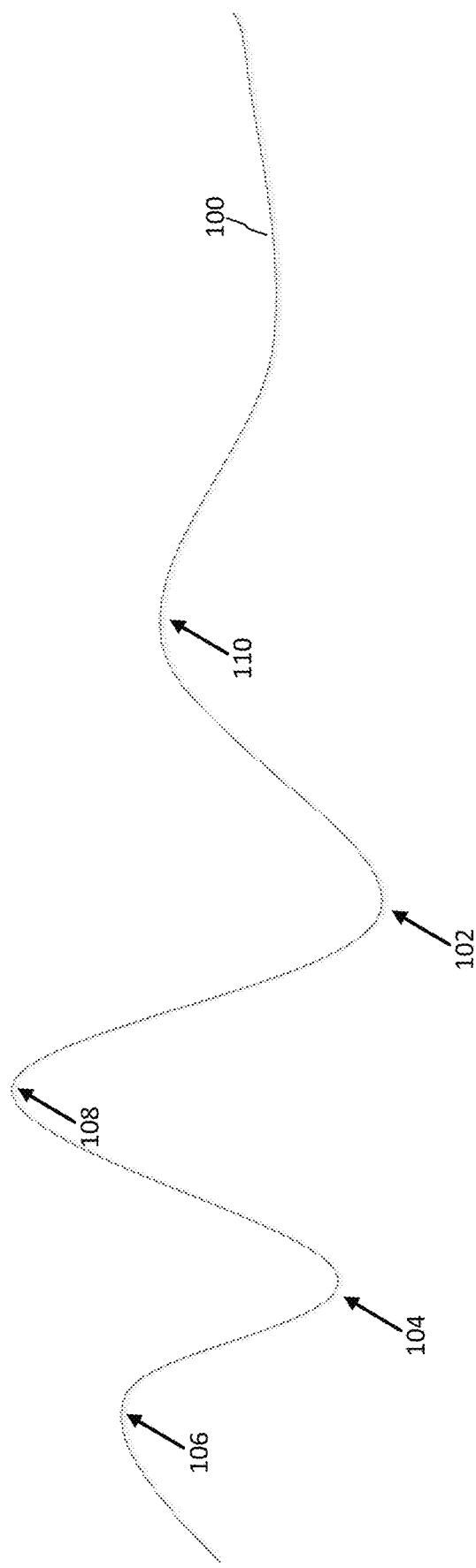
FIGS. 15-22 illustrate the process of FIG. 14 graphically with a waveform that represents a dense optical code.
Figure 19:
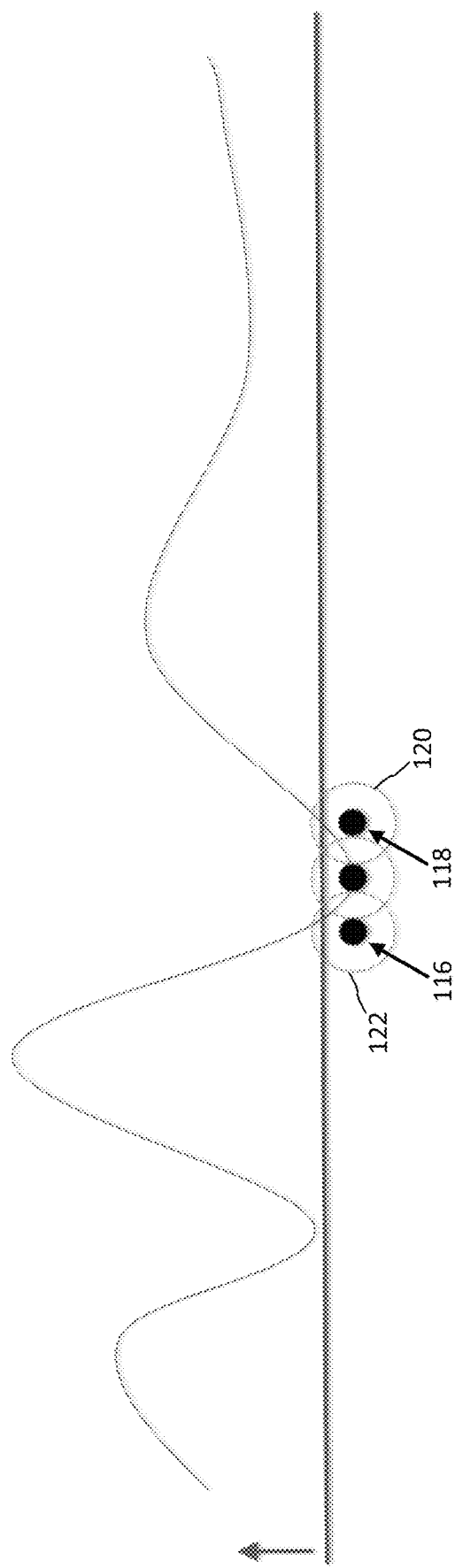
Figure 20:
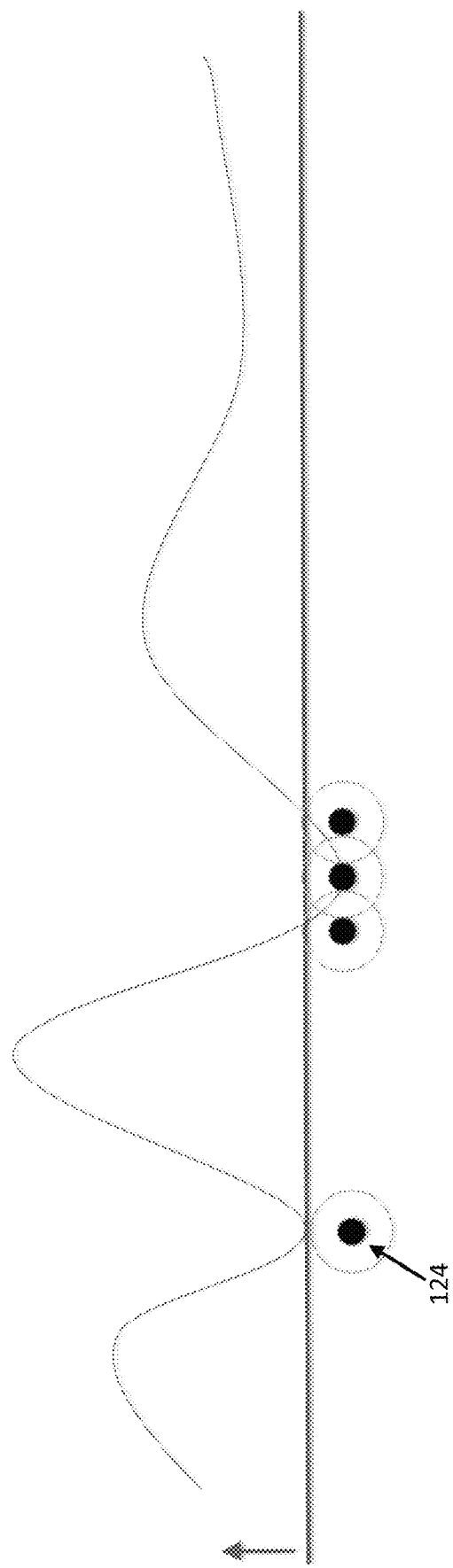
Figure 21:
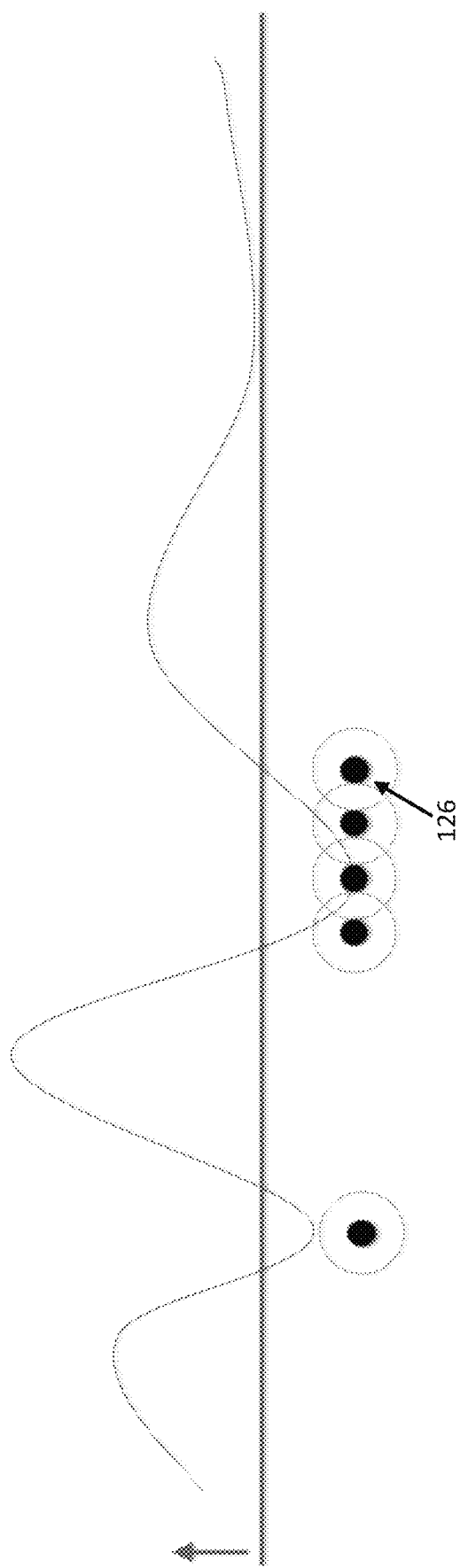
Figure 22:

FIG. 19 depicts placement of two additional elements (116, 118) at locations in the optical code that have the next highest priority and also satisfy the minimum spacing constraint (illustrated by rings 120, 122). As the method progresses, it visits and forms a dot in the output image at the location of another local minima at location 124 as shown in FIG. 20. This example illustrates how the method prioritizes placement of elements of the optical code signal elements in the output image around signal peaks, as these peaks convey signal components that are most important in the robustness and reliability of the optical code. Further depicting this point, FIG. 21 shows the forming of another dot 126 at the next highest priority, which is another dot around the minima 102 (FIG. 15). The process culminates when the dot density from forming the optical code elements in the output image reaches the desired dot density. FIG. 22 shows the placement of dots in one dimension, though the process applies to placing of dots in a two-dimensional output image tile.

Figure 24:
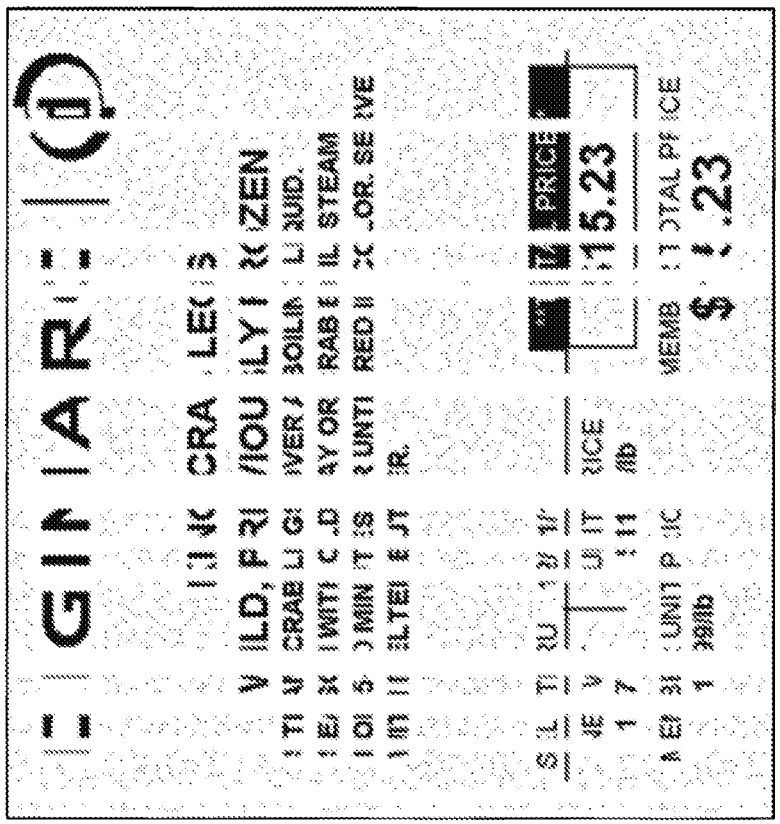
FIG. 24 illustrates another example of the label design merged with the optical code, with additional degradation to illustrate robustness of the optical code.
Figure 23:
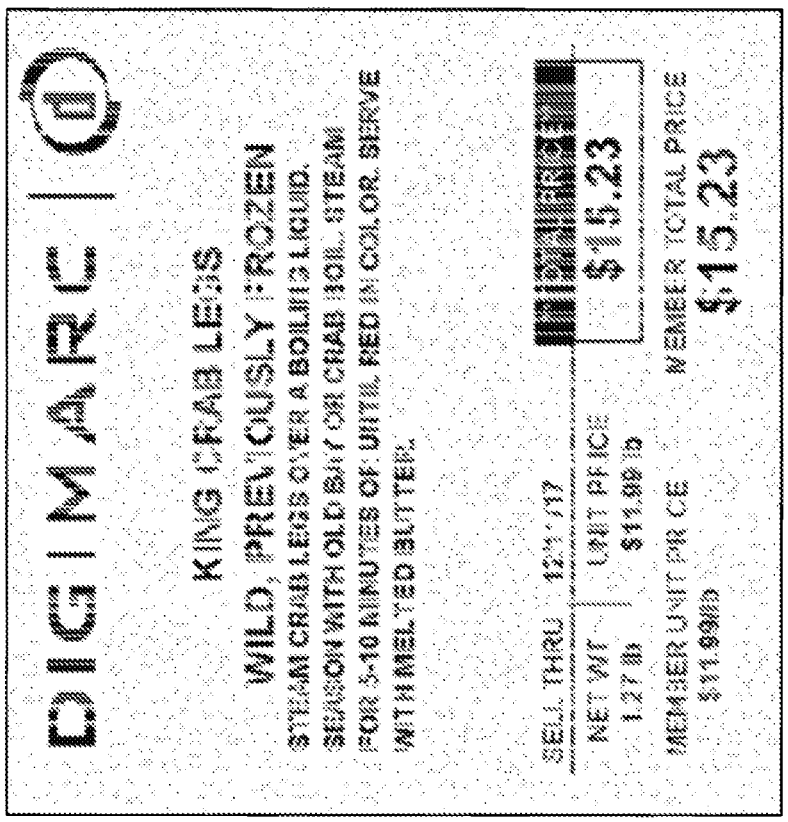
FIG. 23 illustrates an example of a label in which the output image of an optical code has been tiled and then merged.

For many applications, the output image comprising the mapped optical code elements is merged with a host image, which is then printed or otherwise marked on a substrate. FIGS. 23-24 illustrated examples where this output image is merged with a label design generated from a label template. The label design includes programmable elements such as a brand identifier and logo at the top and text providing product information. It also includes dynamically generated information within a scale, such as weight and price.

There are several strategies for merging the output image of the optical code (e.g., its "sparse" form at the target spatial density) with a host image, such as a label or package design image. In each, a tile of the optical code at the target spatial resolution is replicated in contiguous blocks over the entire host image and then merged with the host image. One method for merging is to overlay the optical code image with the host image. For example, the dot elements are placed within the host image. Both the host and optical code tile are binary, so where either the host or optical code has a dot, the printer prints a dot. Another method is to do an intelligent overlay, in which elements of the optical code are formed in the host image, while adhering to keep out distances from the boundary of characters of critical text content (such as price and weight). More specifically, dot elements are placed at all locations of the optical code, except where it is within a predefined keep out distance from the outer boundary of a critical host image character or graphic (such as conventional barcode line). (Such a keep out guard band around critical text and other graphics is detailed in publication 20170024840, referenced earlier.)

Yet another approach is to modulate the host image at the locations of the optical code elements so that the optical code is prioritized over non-critical host image information. The optical code, for example, is formed by modulating the host image with a dot or hole corresponding to the output image of the optical code signal. Dots are placed to encode dark elements of the optical code and holes are formed to encode light elements of the optical code.

FIG. 23 illustrates an example of a label in which the output image of an optical code has been tiled and then merged. This is a depiction of a thermally printed label in which some of the columns have been set to zero, corresponding to failure of a print element of the thermal printer that produced the printed label. When a thermal print element fails, it no longer marks a label along the column of the label stock that passes that print element. Our tests reveal that our methods for optimizing the optical code for a desired spatial density achieve improved robustness to the loss of information due to failure of print elements.

FIG. 24 illustrates an example of the label design merged with the optical code where even thicker columns of elements have been set to zero (meaning no dot elements printed). Again, in this case, our methods provide improved robustness, enabling the payload to be successfully decoded despite the image degradation.

FIG. 25 is yet another example in which tiles of the optical code have been merged with text. We tested the optical code merged with text as shown with varying font size and found increased robustness across a range of font sizes. The font size and text density are yet additional features that may be included in the test images used to optimize the parameters of the optical code at different spatial densities of the optical code.

Prioritizing Optical Code Signal Components

The transformation of a pristine, dense optical code into artwork of a host image results in loss of data signal of the optical code. This occurs because the transformations remove or distort portions of a dense data signal tile when it is converted to a more sparse spatial density (lower dot density per tile). Additionally, text, graphics and other image content of a host image into which the output image is inserted may interfere with the optical code. As sparsity of graphical elements increases, data signal elements are removed or altered, which reduces robustness. This reduces the capacity of the data channel in a given tile region of the output.

Incorporating the data signal into artwork also impacts the prioritization of signal components in the data channel of the artwork. This occurs because the artwork can interfere differently with the signal components. In addition, the amount of signal capacity dedicated to reference signal (e.g., synchronization signal) and payload signal to achieve reliable detection varies with the artwork design. Thus, the ratio of the signal components should be adapted for the artwork.

Figure 26:
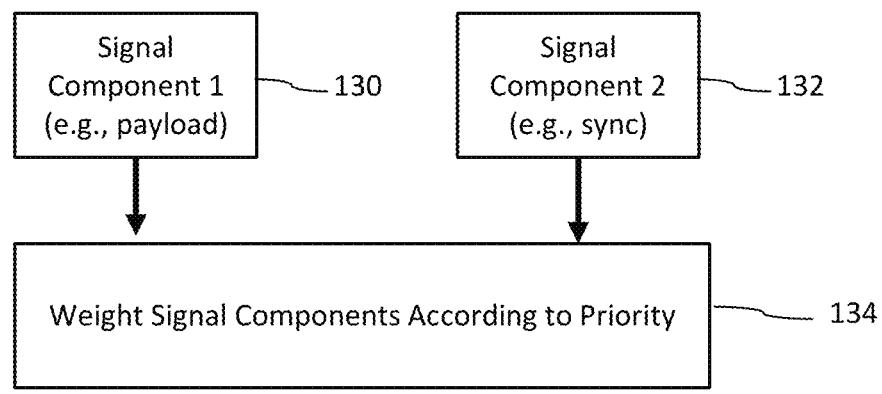
FIG. 26 is a diagram illustrating a method of weighting elements of a data signal prior to use in generating artwork that optimally carries the data signal.

Here we discuss strategies for prioritizing signal components to counteract loss of robustness. FIG. 26 is a diagram illustrating a method of weighting elements of a data signal prior to use in generating artwork that optimally carries the data signal. The optical code signal generator produces signal components. These include components that carry a subset of the payload bits (130) and components that provide a reference signal (e.g., synchronization signal) (132). In block 134, the optical code signal generator weights the components according to their priority. This priority is then used in the artwork generation to control which of the data signal elements are retained.

In one approach for adapting host images to carry tiles of the optical code signal, the process for inserting the optical code signal in a host image is executed with different weightings for the payload and reference components for a candidate artwork design and insertion strategy. This yields several variants of the artwork carrying the data signal. Additional permutations of each variant are then generated by distorting the artwork according to image shifts, rotation angles, reducing and enlarging spatial scale, noise addition, blur, and simulations of print element failure. Robustness measures based on both correlation with a reference signal for synchronization and correlation with the message signal are computed and stored for each artwork variant. Additionally the optical code reader is executed on each variant to determine whether it successfully decodes the payload. The component weighting and robustness metric thresholds are then derived by analyzing the distribution ratio of components that lead to successful payload decoding. The distribution illustrates which ratios and robustness metric values are required to lead to reliable detection. These ratios and robustness metrics are then used for the candidate artwork design and signal encoding method in an automated data encoding program.

Another approach optimizes the data signal in sparse artwork. To be compatible with sparse artwork, the data signal is also sparse, and is structured to be consistent with the sparse artwork. Sparse data signals can be binary (0,1), trinary (−1,0,1), or other coarse quantization. Sparse signals are typically low density, i.e., less than 50% ink or less than 50% space. Such a signal has maximum robustness at 50%, so any optimal sparse algorithm should increase in robustness as the ink/space density tends toward 50%

Sparse signals maintain robustness by using thresholds to create binary or trinary signals. These binary or trinary signals ensure that the detection filter will return a maximum value at desired signal locations. Between the sparse locations in the artwork, the detection filter will output a Gaussian distribution between maximum negative and positive outputs due to random noise introduced by the image capture (namely, scanner or camera noise). The Gaussian width depends on factors such as the amount of blur included in the image capture processing.

During optimization of sparse signals, a small amount of filtered noise is added to account for the fact that the detection filter will create non-zero values everywhere due to noise of the image capture device. The optimization parameters for sparse signals include weighting of reference signal to payload signal, element placement rules (e.g., minimum element spacing), and thresholds. There is a single threshold for binary signals. It is a negative threshold for low ink density, <50%, and a positive threshold for high ink density, >50%. There is a dual positive and negative threshold for trinary signals. The robustness objective is the same for dense and sparse signals. Namely, it is a detection robustness over the targeted workflow environment, which is modeled with distortions to the encoded artwork.

Data Signal Mapping

Figure 27:
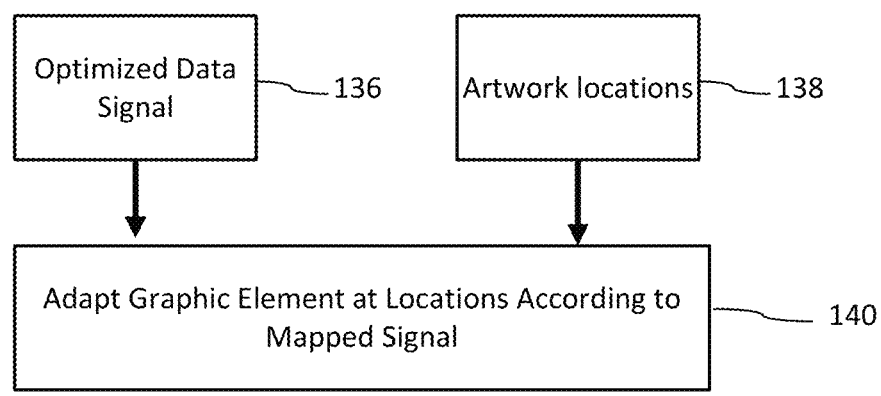
FIG. 27 is a diagram illustrating a method of mapping data signal elements to locations within host image artwork.

FIG. 27 is a diagram illustrating a method of mapping data signal elements to locations within host image artwork. In this embodiment, the optimized data signal components 136 from the earlier-discussed signal generation are mapped to host image artwork locations 138. In processing module 140, graphic elements are generated and/or adapted at the artwork locations. Graphic elements are formed by removing or adding a marking, such as ink, to a location. Similarly, pre-existing artwork is adapted by modifying adding or removing marking according to the optical code signal in a tile mapped to the location to effect luminance or chrominance changes bearing the code.

Applying the method of FIG. 6, the payload is formatted into a binary sequence, which is encoded and mapped to the locations of a tile. For illustration, we describe an implementation of an N by M array of bit cells. The parameters, N and M are integers, and the tile is comprised of an N by M array of bit cells. The size of the tile is configurable and depends on application requirements, such as payload capacity per unit area, robustness, and visibility. Payload capacity increases per unit area with the increase in bit cells per unit area. This additional capacity may be used to improve robustness by redundantly encoding the payload in plural bit cells. Visibility tends to decrease with higher spatial resolution (higher spatial density of bit cells), as the HVS is less sensitive to changes at higher spatial frequencies. Examples of bit cell array sizes include 64 by 64, 128 by 128, 256 by 256 and 512 by 512 cells. While each of these is square and has a dimension that is power of 2, the tile need not be so limited. The bit cells correspond to spatial locations within a tile. In particular, the spatial locations correspond to pixel samples at a configurable spatial resolution, such as 75-600 DPI. The payload is repeated in contiguous tiles of host image artwork. An instance of the payload is encoded in each tile, occupying a block of artwork having a size that depends on the number of bit cells per tile and the spatial resolution. The tile is redundantly encoded in several contiguous tiles, providing added robustness, as the detector accumulates signal estimates for a payload across tiles. Additionally, the entire payload may be extracted from a portion of a tile in configurations where it is redundantly encoded in sub-tile regions.

A few examples will help illustrate these parameters of a tile. The spatial resolution of the bit cells in a tile may be expressed in terms of cells per inch (CPI). This notation provides a convenient way to relate the bit cells spatially to pixels in an image, which are typically expressed in terms of dots per inch (DPI). Take for example a bit cell resolution of 75 CPI. When a tile is encoded into an image with a pixel resolution of 300 DPI, each bit cell corresponds to a 4 by 4 array of pixels in the 300 DPI image. As another example, each bit cell at 150 CPI corresponds to a region of 2 by 2 pixels within a 300 DPI image and a region of 4 by 4 pixels within a 600 DPI image. Now, considering tile size in terms of N by M bit cells and setting the size of a bit cell, we can express the tile size by multiplying the bit cell dimension by the number of bit cells per horizontal and vertical dimension of the tile. Below is a table of examples of tile sizes in inches for different CPI and number of bit cells, N in one dimension. In this case, the tiles are square arrays of N by N bit cells.

TABLE 1

| | Examples of Tile Size (inches) for Different Cells Per Inch (CPI) | | | | | |
|---|---|---|---|---|---|---|
| Tile Size (N) | 75 | 100 | 120 | 150 | 300 | 600 |
| 32 | 0.43 | 0.32 | 0.27 | 0.21 | 0.11 | 0.05 |
| 64 | 0.85 | 0.64 | 0.53 | 0.43 | 0.21 | 0.11 |
| 128 | 1.71 | 1.28 | 1.07 | 0.85 | 0.43 | 0.21 |
| 256 | 3.41 | 2.56 | 2.13 | 1.71 | 0.85 | 0.43 |
| 512 | 6.83 | 5.12 | 4.27 | 3.41 | 1.71 | 0.85 |

These examples illustrate that the tile size varies with bit cells per tile and the spatial resolution of the bit cells. These are not intended to be limiting, as the developer may select the parameters for the tile based on the needs of the application, in terms of data capacity, robustness and visibility.

There are several alternatives for mapping functions to map the encoded payload to bit cell locations in the tile. In one approach, prioritized signal components from the above optimization process are mapped to locations within a tile. In another, they are mapped to bit cell patterns of differentially encoded bit cells as described in U.S. Pat. No. 9,747,656, incorporated above. In the latter, the tile size may be increased to accommodate the differential encoding of each encoded bit in a pattern of differential encoded bit cells, where the bit cells corresponding to embedding locations at a target resolution (e.g., 300 DPI).

For explicit synchronization signal components, the mapping function maps a discrete digital image of the synchronization signal to the host image block. For example, where the synchronization signal comprises a set of Fourier magnitude peaks or sinusoids with pseudorandom phase, the synchronization signal is generated in the spatial domain in a block size coextensive with the tile. This signal component is weighted according to the priority relative to the payload component in the above-described optimization process.

Use of Optical Code Signal Tiles in Approximating Grayscale Imagery

As is familiar, grayscale newspaper photographs can be represented in bitonal fashion using black dots on a white background, or vice versa. This is often termed half-toning. So, too, can grayscale photographs be rendered with sparse marks.

This section builds on work earlier detailed in our U.S. Pat. No. 6,760,464. That patent teaches that an optical code signal in the form of a digital watermark may be embedded into a halftone image by using the digital watermark signal as a halftone screen. In one particular embodiment, watermark blocks are created at different darkness levels by applying different thresholds to a dense watermark block having a mid-grey average value (i.e., 128 in an 8-bit system). At each pixel in the host image, the gray level corresponds to a threshold, which in turn, is applied to the dense watermark signal at that location to determine whether to place a dot, or not, at that location.

In one embodiment of the present technology, various optical code blocks of different dot densities (ink coverages) are pre-computed and stored in look up tables. At each pixel in the host image, a corresponding block is accessed from the lookup tables, and a pixel—indexed by pixel location within the block—is copied to an output image. In this manner, selected pixels from an optical code signal at desired grayscale level are used to represent the host image grayscale values.

Figure 28A:
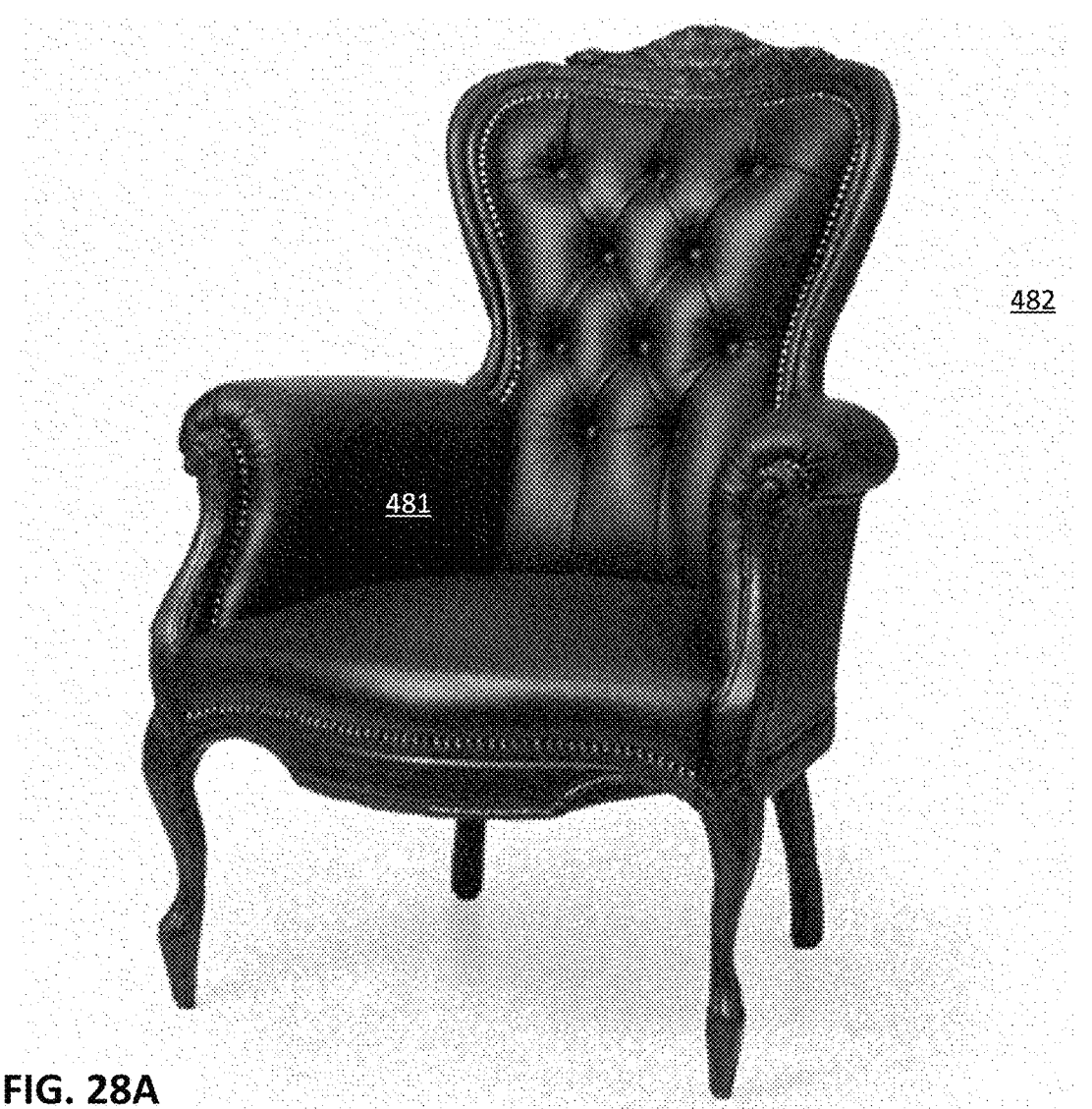
FIG. 28A shows a grayscale image of a chair.
Figure 28B:
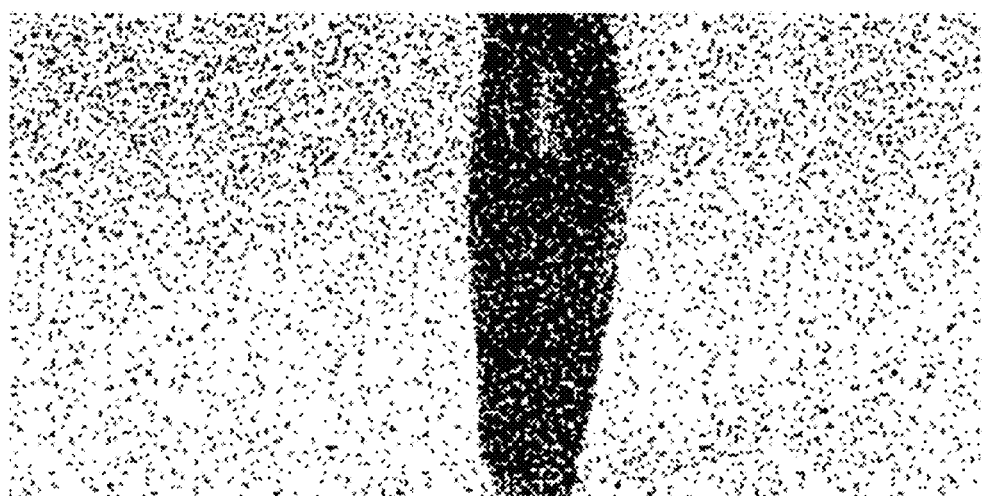
FIG. 28B shows an excerpt of this image as rendered with sparse code signals.

FIG. 28A shows an exemplary greyscale image of a chair. (Due to limitations of patent drawing reproduction, this is actually not a grayscale image, but the effect is similar.) FIG. 28B shows an enlarged excerpt showing the chair's leg, rendered by the present method from sparse blocks. Each grayscale pixel in the original image is associated with a position within a tiled array of optical code blocks. A dot, or not, is written to an output frame by examining that position within an optical code mark in the lookup table having a dot density corresponding to that pixel (grayscale) level.

Figure 29:
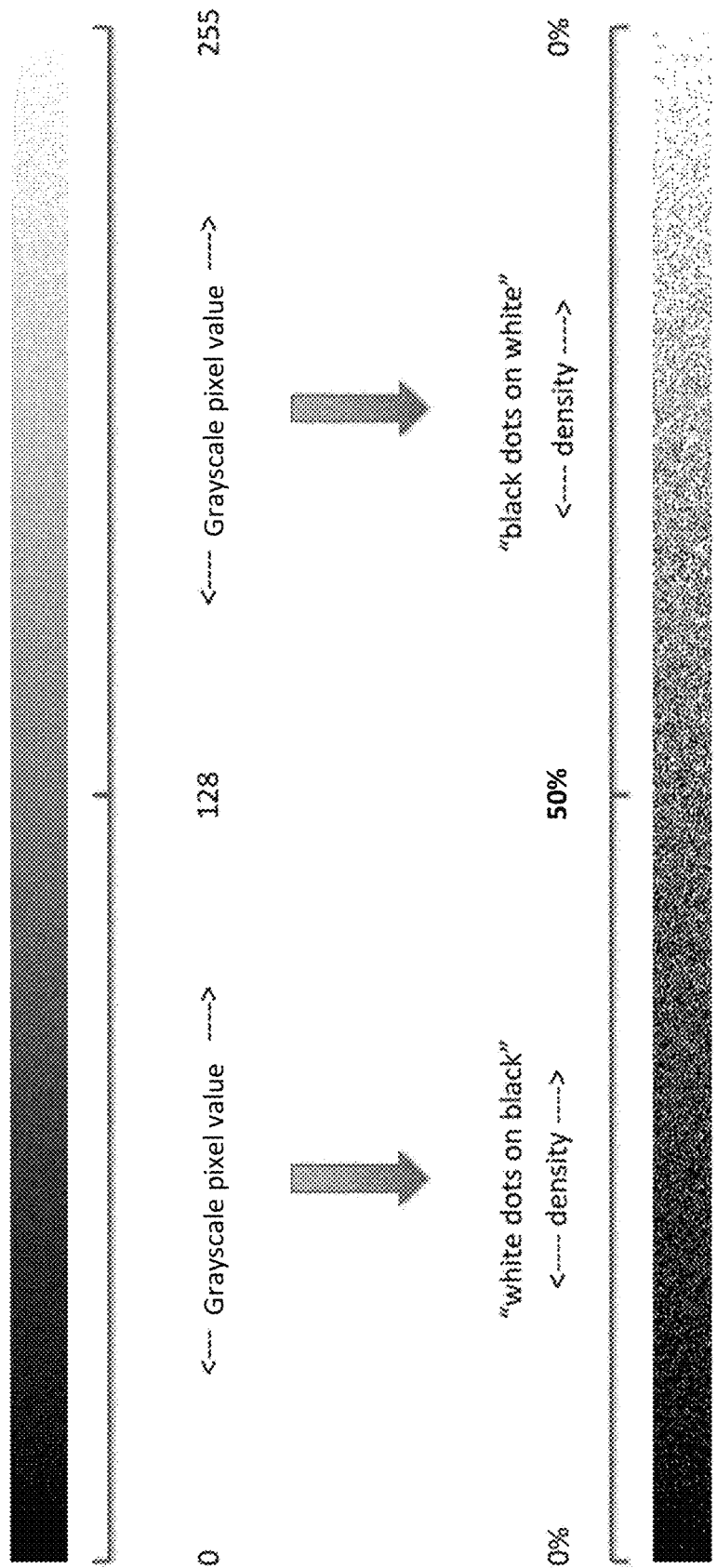
FIG. 29 shows how grayscale values relate to different sparse patterns.

FIG. 29 shows the correspondence between greyscale levels and binary pattern markings (mark or no mark). Grayscale levels between 0 and 127 are formed by white dots on a black background (ranging from 0% to 50% dot coverage). Grayscale levels between 128 and 255 are formed by black dots on a white background (ranging from 50% to 0% dot coverage). There may be different binary patterns for each of the 254 grayscale values between 1 and 254. Or plural grayscale values may map to a single sparse pattern. For example, grayscale values of 0-15 may map to the darkest binary pattern (e.g., with an average ink coverage of 97%); values 16-31 may map to the next-darkest binary pattern (e.g., with an average ink coverage of 91%), and so forth, up until values of 240-255, which map to the lightest binary pattern (e.g., with an average ink coverage of 3%).

Returning to FIG. 28A, it will be recognized that at very dark tones, and at very light tones, there is not much optical code signal. Thus, if a camera is zoomed-in to capture an image comprising just the dark area around reference numeral 481, decoding of the optical code may be difficult or impossible. Likewise, the light area around reference numeral 482. However, if the camera captures an area that includes other regions, then the payload can be readily recovered.

The fidelity of reproduction by this method depends, in part, on the elemental size of the optical code dot. FIG. 30A shows an excerpt of a grayscale lion photograph, converted to binary form, with each dot being a single pixel. FIG. 30B shows the same excerpt, but with each dot being a 4×4 cell of pixels. (The former is sometimes termed "bump size 1" and the latter is sometimes termed "bump size 4.") Although, aesthetically, the smallest bump size may be desired, it packs the block into the physically-smallest spatial extent. As such, it requires that the camera be placed relatively close to the printed subject for signal detection/decoding. Often human factors of, e.g., smartphone, interaction with printed objects, indicate a greater reading distance should be used, leading to common use of bump sizes 2 and 3.

More on Use of Optical Codes in Approximating Grayscale Imagery

In a further embodiment, a reference signal and a message signal are combined in a desired weighting, as discussed above in connection with FIGS. 10-22, to yield a dense grayscale signal. N different levels of print density can be defined. For example, N can be 19, corresponding to ink coverages of 5%, 10%, 15%, . . . 95%. The 5% print density is achieved by selecting the lowest value pixels, subject to a keep-out distance constraint, until 5% of the pixels have marks. Similarly for 10%, 15%, etc.

The 95% coverage is achieved by selecting the highest value pixels (the whitest) for marking on a black background, subject to the keep-out distance constraint, until 5% of the pixels are white-marked. Similarly for 90%, 85%, etc.

In a particular embodiment, different print densities are achieved by setting different keep-out distances. At a 5% print density, a keep-out distance D1 is maintained. At a 10% density, a keep-out distance D2 is maintained, where $D2 \leq D1$. At a 15% density, a keep-out distance D3 is maintained, where $D3 \leq D2$. Etc.

Things are reciprocal at the other end of the print density spectrum, where white marks are formed on a dark background. At a 95% print density, a keep-out distance D19 is maintained. At a 90% print density, a keep-out distance D18 is maintained, where $D18 \leq D19$. And so forth.

In some but not all embodiments, D1=D19; D2=D18; etc.

To implement such arrangement, the pixel values in the dense grayscale optical code signal are sorted by value, and are associated with their respective locations. A 5% print density region may be achieved by setting the keep-out distance to the value D1. The lowest-valued grayscale pixel in the dense signal is copied, as a dark mark, to a corresponding position in the output frame. The next-lowest valued pixel in the dense signal is examined to determine whether it is at least D1 pixels away from the previous pixel. If so, it is copied, as a dark mark, to a corresponding position in the output frame; else it is skipped. The next-lowest valued pixel in the dense signal is next examined to determine whether it is at least D1 pixels away from the previously-copied pixel(s). If so, it is copied, as a dark mark, to a corresponding position in the output frame; else it is skipped. This process continues until 5% of the pixel locations in the output frame have been marked.

A 10% print density region is achieved by setting the keep-out distance to D2 pixels. A similar process follows, to generate a print density region marked with 10% ink coverage. A 15% print density region may be similarly achieved by setting the keep-out distance to D3 pixels, and repeating the process.

The keep-out distance constraint becomes difficult for 50% print density, and nearby values. A 50% density requires equal numbers of dark and white marks; some must adjoin—if only diagonally. The most-sparse 50% pattern is a checkerboard, or its inverse.

In converting mid-grey values to sparse, the designer can go different routes. One is to simply adopt a conventional dither pattern (e.g., a uniform 50% checkerboard), and encode no information in such regions. Another is to put dark marks at the darkest 50% of the locations in the dense signal block, without regard to adjacencies. This can result in a splotchy effect, but provides a strong encoded signal. In other arrangements, the two methods can be used in combinations—with some areas using a dither pattern selected for its regular-looking appearance, and other areas marked based on the darkest 50% of the dense signal—without regard for spatial uniformity.

In the former case, the signal strength, as a function of print density, has an M-shaped curve, with little signal strength at print densities of 1-3% and 97-99%; none at 50%; and peaks between these two values. In the latter case the signal strength is single-lobed, with a maximum at 50%, and tapering to 0 at 0% and 100%.

While keep-out regions are commonly conceived as circular in extent, they need not be so.

If an elliptical keep-out region is employed, then finer control granularity can be achieved. Such elliptical shape provide a control granularity that is twice that of a circular keep-out region. (In some embodiments, the ratio of major to minor axes is fixed; in others it is varied as the area of the ellipse is changed.)

To achieve still further control granularity, patterns tailored to exclude specific numbers of nearby pixels from marking can be employed. While marking densities are referred to as print densities in this section, they should be understood to encompass densities of marking elements applied with other marking technologies, like embossing, etching and engraving. These marking technologies apply a "darker" or "lighter" marking by modulating surface topology, adding or removing surface material, or engraving a substrate surface.

Reading a Payload from Captured Images

Figure 31:
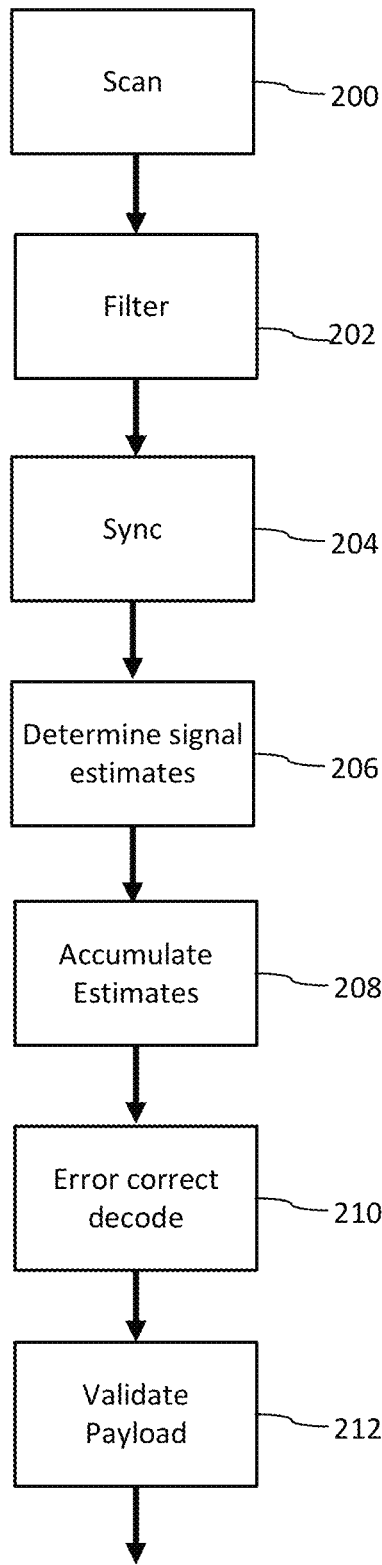
FIG. 31 is a flow diagram illustrating a method for decoding an optical code from an image signal captured from an object.

FIG. 31 is a flow diagram illustrating a method for decoding an optical code from an image signal captured from an object.

In an image capture process (e.g., scan 200 of FIG. 31), the image is captured at a resolution preferably near the bit cell resolution at which the encoded payload signal has been encoded within the original image (e.g., 300 DPI, 100 DPI, etc.). An image up-sampling or down-sampling operation may be performed to convert the image supplied by the digital camera or scanner to a target resolution for further decoding. At least part of one or more blocks of encoded data signal are captured within the scan.

In the initial processing of the decoding method, it is advantageous to select frames and blocks within frames that have image content that are most likely to contain the encoded payload. The block size is desirably selected to be large enough to span substantially all of a complete tile of encoded payload, and preferably a cluster of neighboring tiles. However, because the distance from the camera or scanner may vary, the spatial scale of the encoded payload signal is likely to vary from its scale at the time of encoding. This spatial scale distortion is further addressed in the synchronization process.

The first stage of the decoding process filters the incoming image signal to prepare it for detection and synchronization of the encoded payload signal (202). The decoding process sub-divides the image into blocks and selects blocks for further decoding operations. A first filtering stage converts the input color image signal (e.g., RGB values) to a color channel or channels where the auxiliary signal has been encoded by applying appropriate color weights. See, e.g., patent publication 20100150434 for more on color channel encoding and decoding. The input image may also be a single channel image (one pixel value per pixel) corresponding to capture by a monochrome sensor in the presence of ambient or artificial illumination, such as a typical red LED with a wavelength around the center of its spectral band around 660 nm.

A second filtering operation isolates the data signal from the host image. Pre-filtering is adapted for the data payload signal encoding format, including the type of synchronization employed. For example, where an explicit synchronization signal is used, pre-filtering is adapted to isolate the explicit synchronization signal for the synchronization process.

As noted, in some embodiments, the synchronization signal is a collection of peaks in the Fourier domain. Prior to conversion to the Fourier domain, the image blocks are pre-filtered. See, e.g., the LaPlacian pre-filter detailed in U.S. Pat. No. 6,614,914, incorporated above. A window function is applied to the blocks, followed by a transform to the Fourier domain—employing an FFT. Another filtering operation is performed in the Fourier domain. See, e.g., pre-filtering options detailed in U.S. Pat. Nos. 6,988,202 and 6,614,914, and US Publication 20120078989, which are incorporated by reference.

The input imagery is typically filtered with a predictive "oct-axis" filter, as noted previously. This filter acts to suppress the underlying host image (which typically shows relatively high local correlation), and thereby accentuate the noise signal that conveys the code signal components.

Next, synchronization process (204) is executed on a filtered block to recover the rotation, spatial scale, and translation of the encoded signal tiles. This process may employ a log polar method as detailed in U.S. Pat. No. 6,614,914, or a least squares approach, as detailed earlier, to recover rotation and scale of a synchronization signal comprised of peaks in the Fourier domain. To recover translation, the phase correlation method of U.S. Pat. No. 6,614, 914 is used, or phase estimation and phase deviation methods of 20120078989 are used. Alternative methods perform synchronization on an implicit synchronization signal, e.g., as detailed in U.S. Pat. No. 9,747,656.

Next, the decoder steps through the bit cell locations in a tile, extracting bit estimates from each location (206). This process applies, for each location, the rotation, scale and translation parameters, to extract a bit estimate from each bit cell location (206). In particle, as it visits each bit cell location in a tile, it transforms it to a location in the received image based on the affine transform parameters derived in the synchronization, and then samples around each location. It does this process for the bit cell location and its neighbors to feed inputs to a detection filter (e.g., oct axis or cross shaped), to compare a sample at embedding locations with neighbors. The output (e.g., 1, −1) of each compare operation is summed to provide an estimate for a bit cell location. Each bit estimate at a bit cell location corresponds to an element of a modulated carrier signal.

The signal decoder estimates a value of each error correction encoded bit by accumulating the bit estimates from the bit cell locations of the carrier signal for that bit (208). For instance, in the encoder embodiment above, error correction encoded bits are modulated over a corresponding carrier signal with 16 or 32 elements (e.g., multiplied by, or XOR'd with, a binary antipodal signal). A bit value is demodulated from the estimates extracted from the corresponding bit cell locations of these elements. This demodulation operation multiplies the estimate by the carrier signal sign and adds the result. This demodulation provides a soft estimate for each error correction encoded bit.

These soft estimates are input to an error correction decoder to produce the payload signal (210). For a convolutional encoded payload, a Viterbi decoder is used to produce the payload signal, including the checksum or CRC. For other forms of error correction, a compatible decoder is applied to reconstruct the payload. Examples include block codes, BCH, Reed Solomon, Turbo codes.

Next, the payload is validated by computing the check sum and comparing with the decoded checksum bits (212). The check sum matches the one in the encoder, of course. For the example above, the reader computes a CRC for a portion of the payload and compares it with the CRC portion in the payload.

At this stage, the payload is now passed to other requesting processes, e.g., application programs or software routines that use its contents in subsequent processing.

In an embodiment where the encoded payload is conveyed in the phase of sine waves, the decoder executes a similar first stage synchronization on reference signal components, such as a subset of the sine waves. This sub-set of sine waves form peaks in the spatial frequency domain. After synchronization, the decoder extracts an estimate of an encoded payload element at each reference signal that carries the payload. The phase shift is directly measured relative to an un-modulated state using phase estimation and deviation methods of US Publication 20120078989. The decoder applies the geometric transform coordinates of a sine wave component in the spatial frequency domain. It then estimates phase of this component in the image by weighting the neighboring complex components at neighboring integer coordinates base on weights derived from a point spread function. This estimate of phase is then compared to the expected phase (e.g., phase that would represent a 1, 0 or −1, or 1 or 0, in ternary or binary encoding schemes). The bit value extracted at this component is the one that corresponds to the estimated phase. This process repeats for each sine wave component that carries payload signal. The resulting sequence of symbols are then error correction decoded and processing proceeds error detection as described above.

Message Signaling by Reference Signal Dot Selection

The signaling arrangement described below is advantageous in that it more closely approaches the Shannon limit for information transfer (at a given reliability), than prior art arrangements. In a particular embodiment, only 1028 dark marks are employed in a 128×128 signal block. The marks all represent the reference signal, but their selection represents the message signal.

The method starts with a reference signal block—such as the one from which signal 74 in FIG. 7 is excerpted. At each location in the reference signal block (e.g., in a 128×128 element block), the reference signal has a corresponding signal value, e.g., ranging from 0 (black) to 255 (white). The elements (e.g., 16,384 of them) are sorted by value to generate a ranked list, including the 2048 darkest elements. Each entry in the list is associated with an ordinal position (0, 1, 2 . . . ), and {X,Y} data specifying the element's position within the block, by column and row. Table 2 shows an excerpt of such a list:

TABLE 2

| Rank | Value | {X, Y} |
|---|---|---|
| 0 | 6 | {18, 22} |
| 1 | 7 | {72, 32} |
| 2 | 7 | {1, 33} |
| 3 | 9 | {26, 82} |
| 4 | 10 | {14, 7} |
| 5 | 10 | {33, 73} |
| 6 | 12 | {19, 83} |
| 7 | 13 | {1, 123} |
| 8 | 13 | {78, 23} |
| 9 | 14 | {26, 121} |
| 10 | 14 | {100, 15} |
| 11 | 16 | {119, 99} |
| 12 | 16 | {70, 34} |
| 13 | 17 | {87, 65} |
| 14 | 19 | {34, 108} |
| 15 | 19 | {98, 73} |
| ... | ... | ... |
| 2047 | 101 | {79, 89} |

The payload, e.g., of 64 bits, is processed by convolutional encoding and, optionally, repetition, to yield a message that is 1024 bits in length. Each bit in the message is associated with a successive pair of reference signal elements in the ranked list. If the bit is even-valued (i.e., 0), then the even-numbered element from the pair determines a location in the output signal block that is darkened. If the bit is odd-valued (i.e., 1), then the odd-numbered element of the pair determines the location in the output block that is darkened. Thus, 1024 of the elements from the list of 2048 elements are selected, based on the bit values of the 1024 message bits, and define 1024 locations in the output signal block that are darkened.

To illustrate, consider a message that starts 10110001 . . . . In such case, the elements in the output signal block identified in Table 3 are darkened:

TABLE 3

{72, 32}
{1, 33}
{33, 73}
{1, 123}
{78, 23}
{100, 15}
{119, 99}
{87, 65}
{34, 108}
. . .

Each of the 1024 dots in the output signal block corresponds to one of the darkest values in the original reference signal block. Each such dot also represents a corresponding bit of the 1024 message bits.

In decoding a captured image depicting such a sparse pattern, the affine transformation of the image is first determined by reference to the reference signal, as described elsewhere. The image is then typically counter-distorted to restore the pattern to its original presentment. (More precisely, the received image is re-sampled in accordance with a coordinate system that is defined from the determined affine transformation, as detailed in publication 20170193628.)

To interpret the message, the detector uses its own copy of data from Table 2. (This table is consistent for all marks employing the particular reference signal, and occupies negligible memory in the detector code.) The detector examines the counter-distorted imagery to determine the pixel values at the two locations specified by the first two entries in the table (i.e., ranks 0 and 1). Ideally, one is dark and one is light. The dark one indicates the value of the first message bit. The detector then examines the imagery to determine the pixel values at the third and fourth entries in the table (i.e., ranks 2 and 3). Again, ideally one is dark and the other is light. The dark one indicates the value of the second message bit. And so on.

In actual practice, the two locations examined by the detector—in considering each possible bit of the message—may be far apart in value (indicating confidence in the bit determination) or may be closer together in value (indicating less confidence). To quantify the confidence associated with each message bit determination, a score is computed based on the values of the pixels at the locations indicated by the odd- and even-numbered entries of the pair in the table. One suitable score is:

$$\text{Score} = \text{Log}_2(\text{value of pixel at odd location/value of pixel at even location})$$

In the above example, if the value of the pixel at the odd location {72,32} is 30 and the value of the pixel at the even location {18,22} is 240, the score is a negative 3, indicating that the first bit of the message has value 1. (Any negative value indicates the bit value is 1.)

Considering the next bit, the detector may find the value of the pixel at the odd location {26,82} to be 130, and the value of the pixel at the even location {1,33} to be 101. In this case the score is 0.364. The positive score indicates the corresponding bit value is 0. The absolute magnitude of the score, however, is low (e.g., relative to the absolute value of the first bit score: 3). This indicates less confidence in this determination.

The string of message bits obtained by this procedure (after considering all 2048 candidate locations in the counter-distorted imagery), together with the confidence score for each, is applied to a soft decoder, such as a Viterbi, Reed-Solomon, or Turbo decoder. From these raw bit determinations and confidence scores, the decoder returns the original 64-bit payload.

The just-described arrangement pairs extrema points in the reference signal based on adjacency in a sort order. The detailed arrangement is preferred because the alternate locations for each payload bit representation are of similar reference signal strength. But this is not essential. Pairing can be done in any fashion, e.g., randomly within a subset of elements having values below a threshold value.

It will be recognized that the just-detailed decoding procedure is different than that used with the other sparse encodings of the message signal detailed in this specification (because the message encoding procedure is different). In some embodiments, the decoder makes an initial determination of how the message signal is represented, and it applies a corresponding decoding method.

In one such embodiment, the different encoding is signaled by the presence or absence of certain spatial frequency peaks in the reference signal. As noted, this signal typically comprises several dozen peaks. A few more (e.g., 1-10) can be added (or omitted) to serve as a flag, to a compliant detector, indicating that the encoding procedure detailed in this section is being used, and that a corresponding decoding method should likewise be used. That is, such a detector examines the reference signal to determine whether these flag spatial frequencies are present (or absent) in the reference signal, and applies a decoding method corresponding to the output of such determination. The presence or absence of such frequencies does not interfere with the reference signal's purpose of enabling synchronization of the decoder to the message signal, since that synchronization process is robust to various distortions of the reference signal.

(The just-described arrangement can be used to signal between use of many different encoding techniques, by corresponding sets of extra (or omitted) spatial frequency components. The detector can sense which encoding technique is being used from the spatial frequency components that are detected in the reference signal, and apply a corresponding decoding algorithm.)

In another embodiment, the decoder begins by applying the above-detailed decoding method (after compensation for affine distortion in the captured imagery, as determined by use of the reference signal). If the decoder concludes that dark marks (or no marks) are found at both locations of some threshold number K of the first few pairs in the ranked list of Table 2, then it abandons the decoding approach described in this section, and instead applies the decoding approach detailed elsewhere herein, including the documents incorporated by reference.

To review, in this particular embodiment, the message consists of plural bits, each having a first or a second value (e.g., 0 or 1) at a respective position in the string. A list of M (e.g., 2048) 2D reference signal elements is ranked by value, so that each has an ordinal position in the list, and each is associated with a location in the 2D reference signal. The list thus defines plural pairs of elements, having ordinal positions of 2N and 2N+1, for N=0, 1, 2, ... (M/2)−1. Each pair of elements includes an element with an even ordinal position and an element with an odd ordinal position. Each position in the message signal is associated with a pair of elements in the ranked list. A mark is provided in the output signal block at a location corresponding to the location of the even element in a pair, when the associated position in the message signal has the first value (e.g., 0). Similarly, a mark is provided in the output signal block at a location corresponding to the location of the odd element in a pair, when the associated position in the message signal has the second value (e.g., 1).

In an alternate embodiment, data from the ranked list of reference signal values and locations is not stored. Rather, it is computed on the fly as needed. In such case, real-valued samples of the continuous reference signal may be computed at each point in the 2D signal block to determine the rank ordering, to avoid ambiguities that can be caused by integer values (as used in Table 2).

In some embodiments, the extrema of the reference signal are filtered to enforce a distance constraint (keep-out region), so that no two extrema are closer than a threshold distance from each other.

A related embodiment of this method takes a spatial domain reference signal and sorts its component pixels by value, to identify the darkest N elements (e.g., 1600 elements) in a ranked list—each with a location (e.g., within a 128×128 element array). Some of these locations (e.g., 400 locations) are always-marked with a dot in an output block, to ensure the reference signal is strongly expressed. The remaining locations are marked with dots in the output block, or not, in accordance with values of payload signature bits (chips) assigned to such locations. By setting the number N larger or smaller, sparse marks with more or fewer dots are produced. For marking of light dots (holes) in relatively darker background, the implementer uses a similar approach, but with a sorting of brightest N elements.

Operating Environment

The methods in this document are implemented in software instructions or digital circuitry organized into modules. These modules include an optical code optimizer, generator, inserter and decoder. Notwithstanding any specific discussion of the embodiments set forth herein, the term "module" refers to software instructions, firmware or circuitry configured to perform any of the methods, processes, functions or operations described herein. Software may be embodied as a software package, code, instructions, instruction sets or data recorded on non-transitory computer readable storage mediums. Software instructions for implementing the detailed functionality can be authored by artisans without undue experimentation from the descriptions provided herein, e.g., written in MATLAB, C, C++, Visual Basic, Java, Python, Tcl, Perl, Scheme, Ruby, etc., in conjunction with associated data. Firmware may be embodied as code, instructions or instruction sets or data that are hard-coded (e.g., nonvolatile) in memory devices. As used herein, the term "circuitry" may include, for example, singly or in any combination, hardwired circuitry, programmable circuitry such as computer processors comprising one or more individual instruction processing cores, state machine circuitry, or firmware that stores instructions executed by programmable circuitry.

Implementation can additionally, or alternatively, employ special purpose electronic circuitry that has been custom-designed and manufactured to perform some or all of the component acts, as an application specific integrated circuit (ASIC). To realize such an implementation, the relevant module(s) (e.g., encoding and decoding of optical codes within host image content) are first implemented using a general purpose computer, using software such as MATLAB (from Mathworks, Inc.). A tool such as HDLCoder (also available from MathWorks) is next employed to convert the MATLAB model to VHDL (an IEEE standard) or Verilog. The VHDL output is then applied to a hardware synthesis program, such as Design Compiler by Synopsis, HDL Designer by Mentor Graphics, or Encounter RTL Compiler by Cadence Design Systems. The hardware synthesis program provides output data specifying a particular array of electronic logic gates that will realize the technology in hardware form, as a special-purpose machine dedicated to such purpose. This output data is then provided to a semiconductor fabrication contractor, which uses it to produce the customized silicon part. (Suitable contractors include TSMC, Global Foundries, and ON Semiconductors.)

HDLCoder may also be used to create a Field Programmable Gate Array implementation. The FPGA may be used to prototype the ASIC or as an implementation in a FPGA chip integrated into an electronic device.

Figure 32:
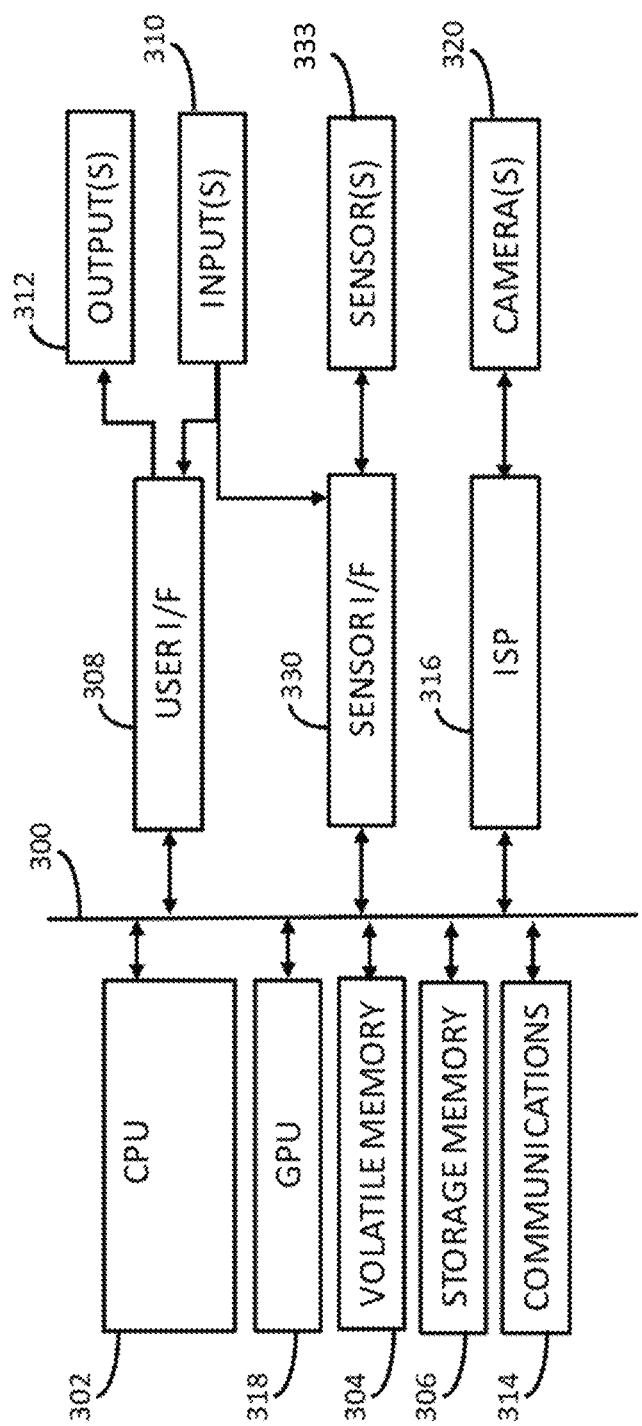
FIG. 32 is a diagram of an electronic device in which the components of an optical code generator, inserter, optimizer and/or decoder, as detailed herein, may be implemented.

For the sake of illustration, FIG. 32 is a diagram of an electronic device in which the components of the above optical code generator, inserter, optimizer and decoder embodiments may be implemented. It is not intended to be limiting, as the embodiments may be implemented in other device architectures or electronic circuitry. For example, it represents a computer in which program instructions for generating, optimizing, inserting and decoding optical codes are stored and executed to carry out methods described in this document. It also represents special purpose computer systems like scales with thermal label printers, label printers, and barcode scanners. It also represents headworn apparatus, such as virtual- and augmented-reality eyewear and headsets. Like more general purpose computers and mobile devices (e.g., smartphones and tablets), these devices also include memory for storing firmware implementations of these methods and processors for executing them. They may also include above-referenced FPGA or ASIC implementations of the optical code optimizer, generator, inserter and/or decoder.

Referring to FIG. 32, a system for an electronic device includes bus 300, to which many devices, modules, etc., (each of which may be generically referred as a "component") are communicatively coupled. The bus 300 may combine the functionality of a direct memory access (DMA) bus and a programmed input/output (PIO) bus. In other words, the bus 300 may facilitate both DMA transfers and direct CPU read and write instructions. In one embodiment, the bus 300 is one of the Advanced Microcontroller Bus Architecture (AMBA) compliant data buses. Although FIG. 32 illustrates an embodiment in which all components are communicatively coupled to the bus 300, it will be appreciated that one or more sub-sets of the components may be communicatively coupled to a separate bus in any suitable or beneficial manner, and that any component may be communicatively coupled to two or more buses in any suitable or beneficial manner. Although not illustrated, the electronic device can optionally include one or more bus controllers (e.g., a DMA controller, an I2C bus controller, or the like or any combination thereof), through which data can be routed between certain of the components.

The electronic device also includes a CPU 302. The CPU 302 may be a microprocessor, mobile application processor, etc., known in the art (e.g., a Reduced Instruction Set Computer (RISC) from ARM Limited, the Krait CPU product-family, a X86-based microprocessor available from the Intel Corporation including those in the Pentium, Xeon, Itanium, Celeron, Atom, Core i-series product families, etc.). The CPU 302 runs an operating system of the electronic device, runs application programs and, optionally, manages the various functions of the electronic device. The CPU 302 may include or be coupled to a read-only memory (ROM) (not shown), which may hold an operating system (e.g., a "high-level" operating system, a "real-time" operating system, a mobile operating system, or the like or any combination thereof) or other device firmware that runs on the electronic device.

The electronic device may also include a volatile memory 304 electrically coupled to bus 300. The volatile memory 304 may include, for example, any type of random access memory (RAM). Although not shown, the electronic device may further include a memory controller that controls the flow of data to and from the volatile memory 304.

The electronic device may also include a storage memory 306 connected to the bus. The storage memory 306 typically includes one or more non-volatile semiconductor memory devices such as ROM, EPROM and EEPROM, NOR or NAND flash memory, or the like or any combination thereof, and may also include any kind of electronic storage device, such as, for example, magnetic or optical disks. In embodiments of the invention, the storage memory 306 is used to store one or more items of software. Software can include system software, application software, middleware (e.g., Data Distribution Service (DDS) for Real Time Systems, MER, etc.), one or more computer files (e.g., one or more data files, configuration files, library files, archive files, etc.), one or more software components, or the like or any stack or other combination thereof.

Examples of system software include operating systems (e.g., including one or more high-level operating systems, real-time operating systems, mobile operating systems, or the like or any combination thereof), one or more kernels, one or more device drivers, firmware, one or more utility programs (e.g., that help to analyze, configure, optimize, maintain, etc., one or more components of the electronic device), and the like.

Also connected to the bus 300 is a user interface module 308. The user interface module 308 is configured to facilitate user control of the electronic device. Thus the user interface module 308 may be communicatively coupled to one or more user input devices 310. A user input device 310 can, for example, include a button, knob, touch screen, trackball, mouse, microphone (e.g., an electret microphone, a MEMS microphone, or the like or any combination thereof), an IR or ultrasound-emitting stylus, an ultrasound emitter (e.g., to detect user gestures, etc.), one or more structured light emitters (e.g., to project structured IR light to detect user gestures, etc.), one or more ultrasonic transducers, or the like or any combination thereof.

The user interface module 308 may also be configured to indicate, to the user, the effect of the user's control of the electronic device, or any other information related to an operation being performed by the electronic device or function otherwise supported by the electronic device. Thus the user interface module 308 may also be communicatively coupled to one or more user output devices 312. A user output device 312 can, for example, include a display (e.g., a liquid crystal display (LCD), a light emitting diode (LED) display, an active-matrix organic light-emitting diode (AMOLED) display, an e-ink display, etc.), a printer, a loud speaker, or the like or any combination thereof.

Generally, the user input devices 310 and user output devices 312 are an integral part of the electronic device; however, in alternate embodiments, any user input device 310 (e.g., a microphone, etc.) or user output device 312 (e.g., a speaker, display, or printer) may be a physically separate device that is communicatively coupled to the electronic device (e.g., via a communications module 314). A printer encompasses different devices for applying images carrying digital data to objects, such as 2D and 3D printers (thermal, intaglio, ink jet, offset, flexographic, laser, gravure, etc.), and equipment for etching, engraving, embossing, or laser marking.

Although the user interface module 308 is illustrated as an individual component, it will be appreciated that the user interface module 308 (or portions thereof) may be functionally integrated into one or more other components of the electronic device (e.g., the CPU 302, the sensor interface module 330, etc.).

Also connected to the bus 300 is an image signal processor 316 and a graphics processing unit (GPU) 318. The image signal processor (ISP) 316 is configured to process imagery (including still-frame imagery, video imagery, or the like or any combination thereof) captured by one or more cameras 320, or by any other image sensors, thereby generating image data. General functions typically performed by the ISP 316 can include Bayer transformation, demosaicing, noise reduction, image sharpening, or the like or combinations thereof. The GPU 318 can be configured to process the image data generated by the ISP 316, thereby generating processed image data. General functions performed by the GPU 318 include compressing image data (e.g., into a JPEG format, an MPEG format, or the like or combinations thereof), creating lighting effects, rendering 3D graphics, texture mapping, calculating geometric transformations (e.g., rotation, translation, etc.) into different coordinate systems, etc. and sending the compressed video data to other components of the electronic device (e.g., the volatile memory 304) via bus 300. Image data generated by the ISP 316 or processed image data generated by the GPU 318 may be accessed by the user interface module 308, where it is converted into one or more suitable signals that may be sent to a user output device 312 such as a display, printer or speaker.

The communications module 314 includes circuitry, antennas, sensors, and any other suitable or desired technology that facilitates transmitting or receiving data (e.g., within a network) through one or more wired links (e.g., via Ethernet, USB, FireWire, etc.), or one or more wireless links (e.g., configured according to any standard or otherwise desired or suitable wireless protocols or techniques such as Bluetooth, Bluetooth Low Energy, WiFi, WiMAX, GSM, CDMA, EDGE, cellular 3G or LTE, Li-Fi (e.g., for IR- or visible-light communication), sonic or ultrasonic communication, etc.), or the like or any combination thereof. In one embodiment, the communications module 314 may include one or more microprocessors, digital signal processors or other microcontrollers, programmable logic devices, or the like or combination thereof. Optionally, the communications module 314 includes cache or other local memory device (e.g., volatile memory, non-volatile memory or a combination thereof), DMA channels, one or more input buffers, one or more output buffers, or the like or combination thereof. In some embodiments, the communications module 314 includes a baseband processor (e.g., that performs signal processing and implements real-time radio transmission operations for the electronic device).

Also connected to the bus 300 is a sensor interface module 330 communicatively coupled to one or more sensors 333. A sensor 333 can, for example, include a scale for weighing items (such as in a scale used to weigh items and print labels in retail or food manufacturing environment). Although separately illustrated in FIG. 32, any camera 320 can also be considered a sensor 333. Generally, a sensor 333 generates one or more signals (typically, electrical signals) in the presence of some sort of stimulus (e.g., light, sound, moisture, gravitational field, magnetic field, electric field, etc.), in response to a change in applied stimulus, or the like or any combination thereof. In one embodiment, all sensors 333 coupled to the sensor interface module 330 are an integral part of the electronic device; however, in alternate embodiments, one or more of the sensors may be physically separate devices communicatively coupled to the electronic device (e.g., via the communications module 314). To the extent that any sensor 333 can function to sense user input, then such sensor 333 can also be considered a user input device 310.

The sensor interface module 330 is configured to activate, deactivate or otherwise control an operation (e.g., sampling rate, sampling range, etc.) of one or more sensors 333 (e.g., in accordance with instructions stored internally, or externally in volatile memory 304 or storage memory 306, ROM, etc., in accordance with commands issued by one or more components such as the CPU 302, the user interface module 308). In one embodiment, sensor interface module 330 can encode, decode, sample, filter or otherwise process signals generated by one or more of the sensors 333. In one example, the sensor interface module 330 can integrate signals generated by multiple sensors 333 and optionally process the integrated signal(s). Signals can be routed from the sensor interface module 330 to one or more of the aforementioned components of the electronic device (e.g., via the bus 300). In another embodiment, however, any signal generated by a sensor 333 can be routed (e.g., to the CPU 302), before being processed.

Generally, the sensor interface module 330 may include one or more microprocessors, digital signal processors or other microcontrollers, programmable logic devices, or the like or any combination thereof. The sensor interface module 330 may also optionally include cache or other local memory device (e.g., volatile memory, non-volatile memory or a combination thereof), DMA channels, one or more input buffers, one or more output buffers, and any other component facilitating the functions it supports (e.g., as described above).

Other suitable operating environments are detailed in the incorporated-by-reference documents.

Signal Rich Art Variants

The technology described in this document may be used to construct optical code signals with a desired design aesthetic. We refer to the output as "signal rich art" as it carries an optical code signal while providing a desired aesthetic effect. These approaches generally fall into one of the following methods:

Method 1A: Generate a dense optical code signal, convert it to a sparse signal, and then construct signal rich art from the sparse signal.

Method 1B: Generate an optical code signal that comprises reference and payload signal components at desired spatial density and then construct signal rich art from that signal. It is not necessary to generate a sparse code signal from a dense optical code signal, as the optical code signal may be generated at a desired spatial density (dense or sparse).

Method 2: Generate a dense optical code signal and convert it to a sparse signal of desired density by placing graphical elements at sparse locations.

Method 3: Generate an optical code signal at desired density, combine it at high strength with host artwork, and then convert the combined signal into signal rich art by placing graphical elements at spatial locations to represent the marked host artwork.

To illustrate, we begin with examples of the first method. Later, we describe examples of methods 2 and 3 in connection with creating stipple patterns. The stipple patterns are illustrated as being comprised of circular dots, but they may also be constructed of other graphic primitives in shapes other than circles.

Our implementations are constructed in software programs and designed to be executed within image editing software, e.g., to create package or label designs with embedded optical codes. The flow diagrams depict example embodiments that are implemented in software instructions organized into modules. The arrangement and inclusion of these modules may be adapted to create other embodiments for a particular application or computing environment, such as cloud computing, desktop computer, distributed computing on plural processors, and/or embedded firmware executing within a printer, for example.

Figure 33:
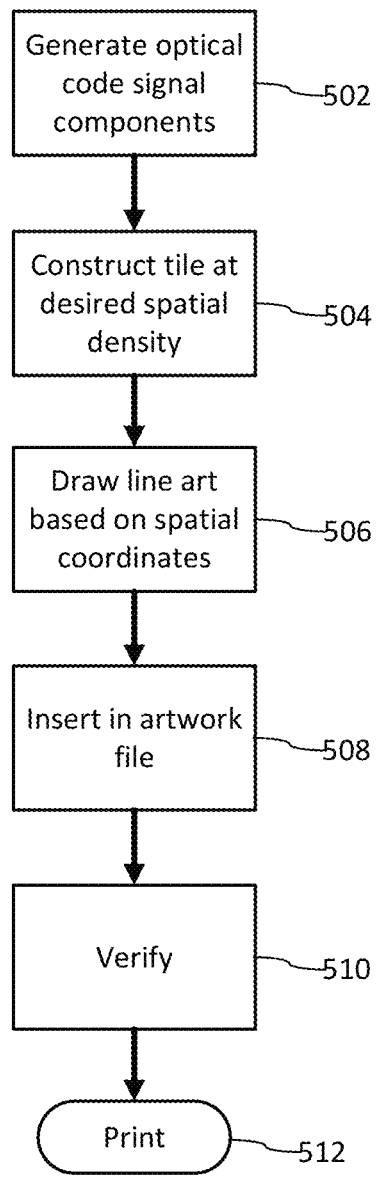
FIG. 33 is a flow diagram of a method of constructing signal rich art from a sparse optical code signal.

FIG. 33 is a flow diagram of a method of constructing signal rich art from an optical code signal. The method begins by generating optical code signal components (502). To do so, it employs, for example, one of the methods of FIGS. 3-5 (e.g., 30, 32 FIG. 3, 40, 42 FIG. 4, and 50, 52 FIG. 5).

Next, the method constructs a tile of the optical code signal at a desired spatial density (504). One approach for implementing this module 504 is to apply the predictive filter of the detector to the signal values in a dense optical code tile, and then generate sparse signal coordinates of the locations of the minima in the filter output, selecting coordinates with desired spacing and density. The implementer may also choose from among the other approaches for generating variable density optical code signals detailed in this document. These methods provide the spatial coordinates where the marking elements of the optical code signal have been prioritized. For example, some embodiments select spatial coordinates of marking elements (dots or holes) where there are maxima (e.g., darkest or brightest pixels) in the optical code signal. Some embodiments selectively place marking elements of reference and payload components as described in the examples in the section entitled, "Message Signaling by Reference Signal Dot Selection."

Next, the method employs one of several alternative methods to construct line art based on the spatial coordinates (506) of the optical code signal tile. We have experimented with a variety of techniques and have found that several provide sufficient robustness to be appropriate for packaging and label applications. Because of the flexibility of this method to accommodate various forms of art, it provides a general framework for providing signal rich art. Demonstrating this point, we illustrate several examples in the drawings and describe them below.

After creating a signal rich tile, the method proceeds to insert the tile in an artwork file (508). In one embodiment, the insertion method is integrated into an image editing program, such as a plug-in for Adobe Photoshop or Illustrator. The insertion method replicates the tile in X and Y dimensions and masks the signal to fit the shape of an artwork element, such as an image or graphic. The replicating of the tile is carried out by repeating it edge to edge in X and Y directions to produce mapped tiles coextensive with the artwork region in the artwork file where it is to be applied. The masking of the mapped tile is carried out by setting pixels of the mapped tiles to 0 outside the boundary of the artwork element. To save computation, it is preferred to employ boundary wrapping conditions. In the replicating process (also referred to as tiling), the boundary wrapping conditions are used to compute the signal rich art at the boundaries assuming a wrap-around from left to right edge and from top to bottom edge of a tile. Examples of boundary wrapping conditions are toroidal boundary wrapping conditions or periodic boundary conditions. The approach of replicating a signal rich art tile with boundary wrapping conditions saves computation because it allows the creation of one signal rich art tile that is seamlessly repeated by tiling to fill a larger area in the artwork file.

An alternative is to create the signal rich art at the target image size and shape. This is achieved by replicating the dense optical codes signal tile by tiling to fill the larger area of the artwork, converting this tiled output into a sparse signal, and then converting the sparse signal into signal rich art. Another alternative is to convert a single dense tile to a sparse signal, replicate the sparse signal by tiling to fill a larger area, and then convert the sparse signal to signal rich art. These insertion methods enhance arbitrary shaped artwork elements with redundant encoding of the optical code signal, coextensive with the boundary of the artwork element.

Next, the method verifies that the optical code signal satisfies desired robustness constraints (510). For more on this module, please see the discussion and referenced documents described in connection with FIGS. 2 and 12 describing robustness prediction programs. The robustness prediction program verifies that the optical code signal is reliable by ensuring that the detection metrics for the signal at an array of verification coordinates in the artwork are above thresholds over a spatial area exceeding a minimum coverage area for a particular optical scanning application.

Finally, the completed artwork, bearing the replicated tiles of optical code signal, is applied to an object, e.g., by printing, embossing or alternative object marking technology (512).

Figure 34:
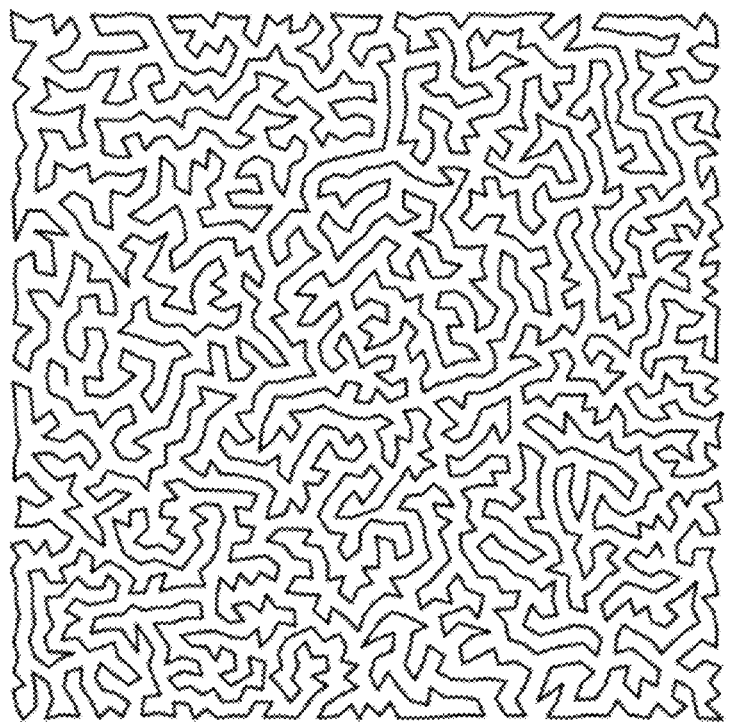
FIG. 34 illustrates an optical code signal tile created by connecting sparse coordinates of the signal tile with a traveling sales person (TSP) method.

FIG. 34 illustrates an optical code signal tile 514 created by connecting spatial coordinate of an optical code signal with a traveling sales person (TSP) method. The traveling salesperson problem has been studied in computing and adapted to practical applications. The problem is commonly framed as: Given a list of cities and the distances between each pair of cities, what is the shortest possible route that visits each city and returns to the origin city? In our case, the cities are sparse coordinates derived from the optical code signal (or optical code signal combined with artwork) and the path generated by the solution is rendered to embed the optical code signal in rendered output. This approach, when used in conjunction with the method of FIG. 33, is effective in retaining a robust optical code signal as it traverses points, namely minima, of high priority components of the optical code signal. Further, due to the fact that the path of line segments does not cross (other than at the "cities'), it does not create line crossings that would otherwise represent spurious minima. For testing, we used the TSP software, called LKH, which is an implementation of the Lin-Kernighan heuristic for solving the TSP. For more information, LKH is described in K. Helsgaun, An Effective Implementation of the Lin-Kernighan Traveling Salesman Heuristic. DATALOGISKE SKRIFTER (Writings on Computer Science), No. 81, 1998, Roskilde University, and can be found at http://www.akira.ruc.dk/~keld/research/LKH/.

We have observed that the TSP method can be improved by using Fast Fourier Transform (FFT) Interpolation in conjunction with adding additional points within an optical code signal tile. To recap, this signal rich art method should be implemented so that it makes markings at the coordinates of extrema (dark marking at luminance minima) within the optical code signal. The coordinates of extrema are identified and prioritized, for example, by sorting the pixel values of the optical code signal and filling a tile with points at these coordinates in the order of the sorted values of the optical code signal until desired line density is achieved while maintaining minimum spacing between lines. This emphasizes the code signal contrast relative to the neighboring unmarked area at the coordinates of extrema. However, merely drawing a line through a point of a local extrema may not strongly represent the optical code signal at the point. To remedy this problem, an embodiment inserts duplicate points at a coordinate of a sparse optical code signal. FFT interpolation is used to draw a line through the points. The duplicate points cause the FFT interpolation operation to add loops in the 2D area around a point, and thereby emphasize the marking at that point.

Figure 52:
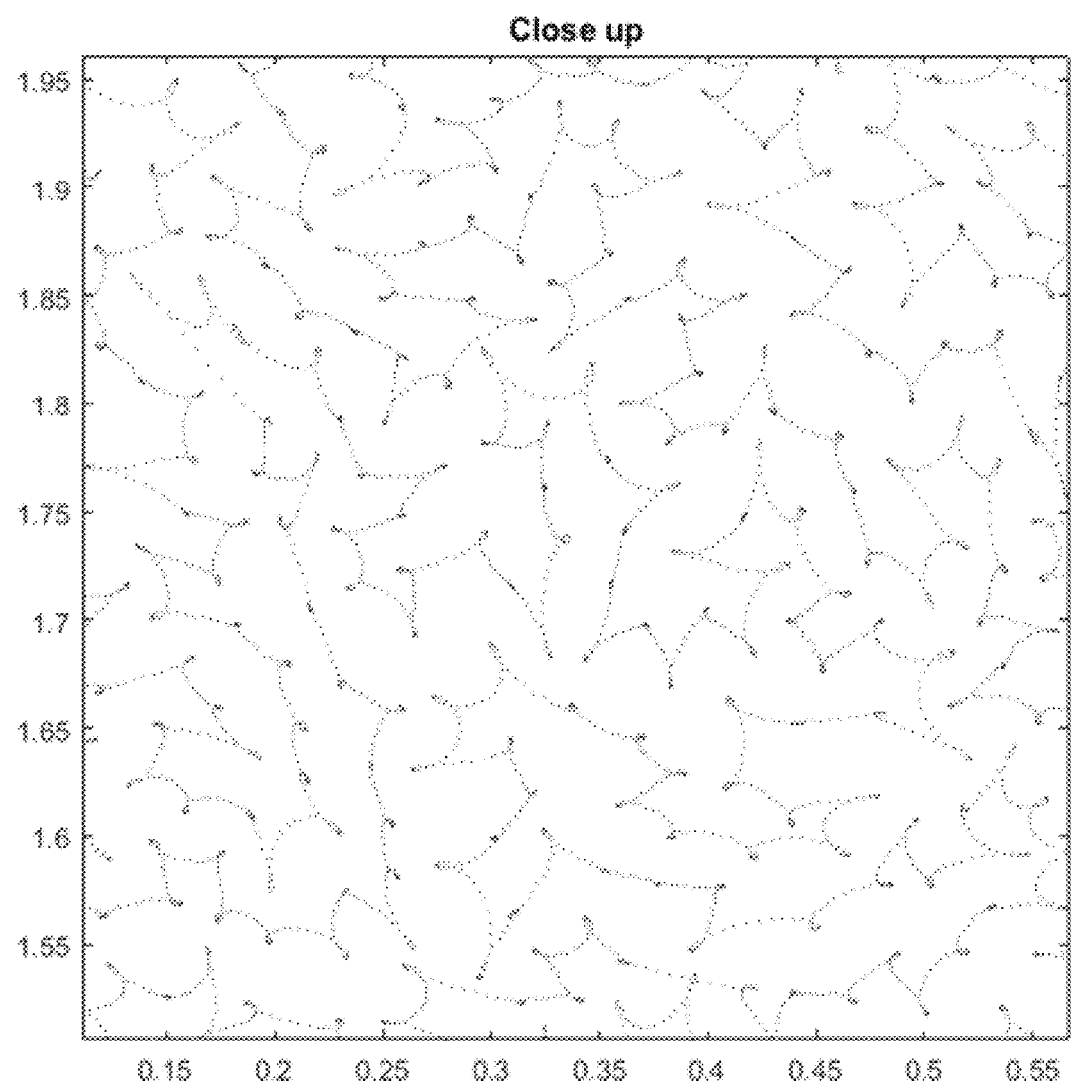
FIG. 52 is a diagram illustrating the output of an embodiment for converting an optical code signal into artistic elements using FFT interpolation.

FIG. 52 shows an example of this TSP embodiment. In our application, the FFT interpolation converts a spatial image of sparse points into the Fourier domain, adds additional padding points, and then inverse transforms the result back into the spatial domain. The duplicate instances of a sparse point at a location creates the effect of the loops shown in FIG. 52.

Another embodiment of TSP for generating signal rich art is as follows. Given a sparse arrangement of points, two TSPs are computed—one for the points stretched 2× (or some other design choice) along the X axis and another for the points stretched 2× along the Y axis. Then the TSP paths are un-stretched so the points end up where they were originally, and the TSP paths intersect at those points thereby enhancing the local minima. This may be combined with FFT interpolation and its variants. The sparse arrangement of points refers to spaced apart coordinates of optical code signal elements at desired spatial density. The various methods for creating sparse arrangements in this document may be used to create variants of this embodiment.

Figure 35:
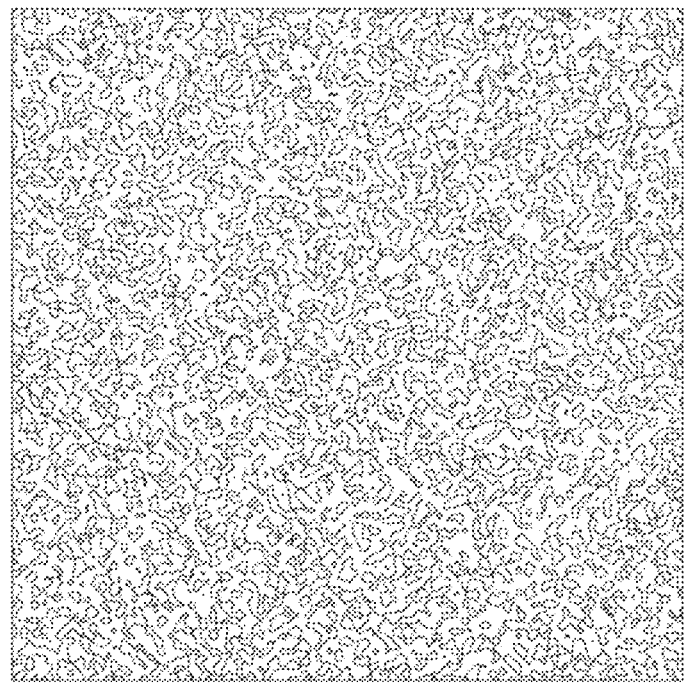
FIG. 35 illustrates an optical code signal tile created using a contour plot.

FIG. 35 illustrates an optical code signal tile 516 created using a contour plot. A contour plot is a programmatic method takes a grayscale image as input, determines for a specified number of levels the contour lines through coordinates in the image at the same gray level. One example of this type of image processing routine is imcontour in MatLab from MathWorks. This routine takes an image and number of contour levels as input and outputs contour lines for each level, specifying contours as line segments between X and Y coordinates in the image. This approach retains optical code signal from the dense tile because it creates lines through the signal valleys formed by the luminance minima.

The contour is drawn at a level lower than the global mean value of the pixel values of the dense tile. With this constraint, the loop defined by the contour will circle tightly around the local minima, and this loop creates a local grayscale depression in the output image. When the level of the contour is too low, this method produces a sparse optical code signal with contours only around the lowest minima in the tile and may not provide sufficient information to recover the signal. When the contour level is too close to the global mean of the dense optical code signal, the local minima may not be sufficiently emphasized. Therefore, it is desirable to choose a level that is about one standard deviation below the mean to balance the signal robustness and sparseness of the artwork carrying the optical code signal.

Figure 36:
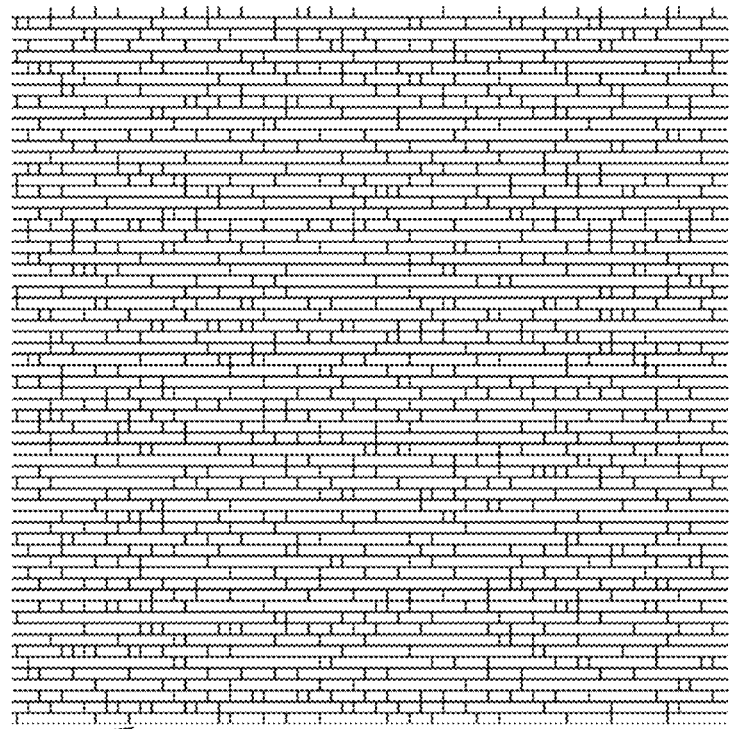
FIG. 36 illustrates an optical code signal tile created by placing vertical lines at spatial coordinates of the tile.

Providing yet another example, FIG. 36 illustrates an optical code signal tile 518 created by placing vertical lines at sparse points. This approach retains optical code signal because it places the dark vertical lines through coordinates at its luminance minima.

Figure 37:
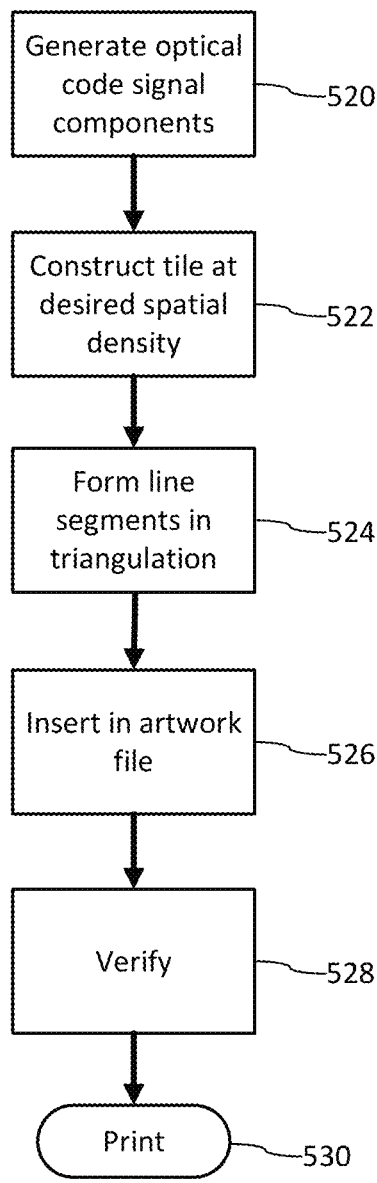
FIG. 37 is a flow diagram illustrating a method of constructing an optical code from a Delaunay triangulation of spatial coordinates of the optical code.

Continuing with this theme, FIG. 37 is a flow diagram illustrating a method of constructing an optical code signal from a Delaunay triangulation of sparse coordinates in the code signal. The software modules 520, 522, 526, and 528 are implemented as described for modules as 502, 504, 508 and 510. Module 524 forms line segments connecting the spatial coordinates of the optical code signal by generating a Delaunay triangulation of vertices at those coordinates. Suitable routines for implementing Delaunay triangulation are Qhull and the Delaunay function in MatLab from MathWorks. As explained above for module 508, the tiling of a signal rich tile in the artwork in module 526 is preferably executed using boundary wrapping conditions. For triangulation, this means the triangulation is computed with wrap around. One way to accomplish this is to compute Voronoi regions at the boundaries assuming a wraparound from left to right edge and top to bottom edge of the tile, and then obtain the Delaunay triangulation from the dual of the Voronoi graph.

In constructing a tile of the optical code, module 522 chooses coordinates of the vertices that are located at luminance minima of optical code signal components, taking into account desired spacing and dot density. Module 524 is a particular implementation of the module 506 of FIG. 33. While other types of triangulations will achieve the objective of connecting the minima, the Delaunay triangulation has certain benefits, elaborated on below in connection with Voronoi diagrams. The Delaunay triangulation is a triangulation of a set of points in a plane, such that no point is inside the circumcircle of any triangle. It maximizes the minimum angle of the triangles, which tends to avoid sliver triangles.

After verifying the optical code signal in a design file (528), the artwork of that file is printed or embossed 530 on an object (e.g., package substrate, label, etc.).

Figure 38:
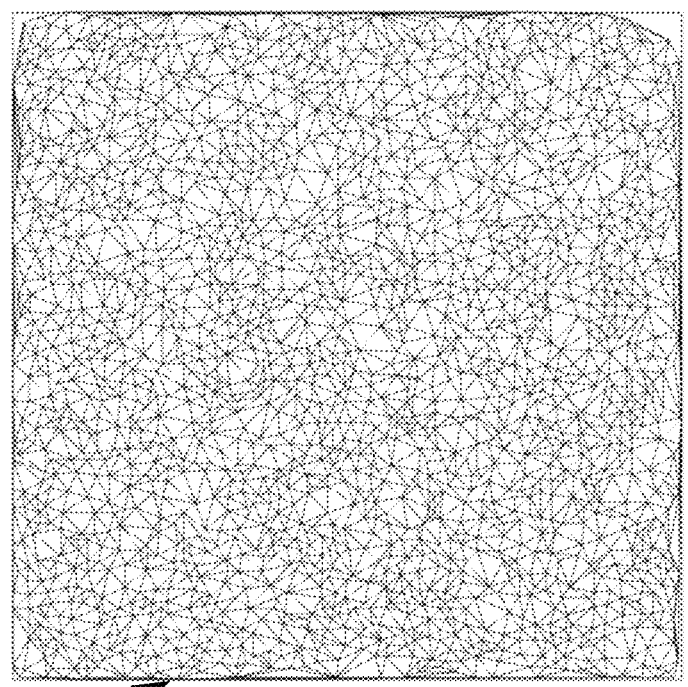
FIG. 38 illustrates an optical code signal tile created by the method of FIG. 37.

FIG. 38 illustrates an optical code signal tile 532 created by the method of FIG. 37. As depicted in FIG. 38, the vertices are the darkest points of the output image, as they are at the convergence of plural line segments.

The four examples shown in FIGS. 34-35 and 38 illustrate techniques that place dark markings at coordinates in the signal tile corresponding to luminance minima. A complementary approach that retains a robust optical code signal is to place dark markings in valleys around the luminance maxima. We illustrate this by showing examples of it, starting with an approach based on a Voronoi diagram. Additionally, each of these approaches may be inverted for dark artwork, in which the prioritized optical code carrying elements are luminance maxima (bright pixels) relative to a darker background.

A Voronoi diagram is a partitioning of a plane into regions based on distance to points in a specific subset of the plane. That set of points (called seeds, sites, or generators) is specified beforehand, and for each seed there is a corresponding region consisting of all points closer to that seed than to any other. These regions are called Voronoi region. Each such Voronoi region is obtained from the intersection of half-spaces, and hence it is a convex polygon. The line segments of the Voronoi diagram are all the points in the plane that are equidistant to the two nearest sites. The Voronoi vertices (nodes) are the points equidistant to three (or more) sites.

Voronoi diagrams find application in a signal processing technique called vector quantization. Vector quantization is a quantization technique in which probability density functions are modeled by the distribution of prototype vectors. It divides a large set of data points (vectors, like pixel values) into groups having approximately the same number of points closest to them. Each group is represented by its centroid point. The applications of vector quantization for data compression seeks to represent a signal with the fewest points, yet at highest signal fidelity or quality.

The Voronoi diagram provides a way to group points of the signal into quantization bins, where each bin is represented by the centroid of the bin, or in the case of a Voronoi region, the centroid of the region. In our application, the objective is to create an optical code signal at a desired optical density with fewest optical code signal points, while achieving a desired level of visual quality and signal robustness. Our adaptation of the Voronoi diagram achieves this objective by minimizing the points needed to represent the optical code signal while providing desired spacing between the marking elements and producing a pattern that has artistic effects.

The Voronoi diagram is the dual graph of the Delaunay triangulation. Connecting the centers of the circumcircles of the triangles in the Delaunay triangulation produces the Voronoi diagram. The Voronoi diagram may be implemented using the Voronoi function in MatLab from MathWorks, or via the Delaunay triangulation computed by the Qhull program. Qhull outputs the Voronoi vertices for each Voronoi region.

Figure 39:
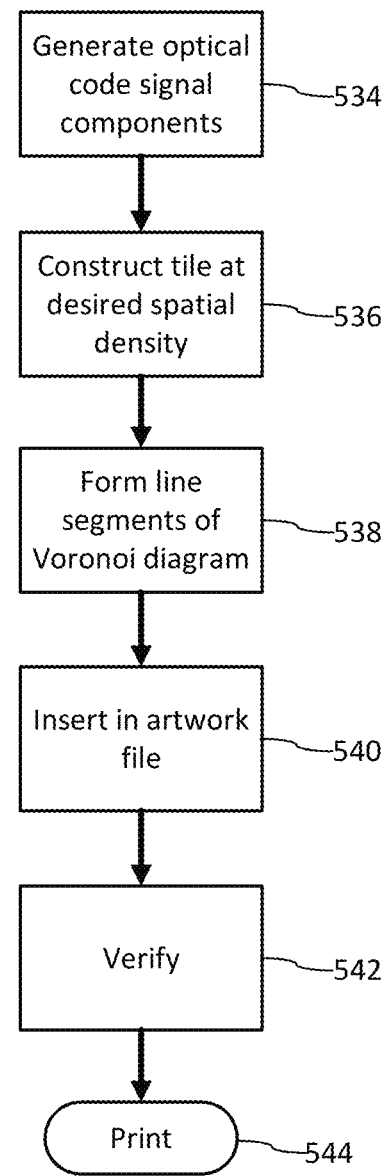
FIG. 39 is a flow diagram illustrating a method of constructing an optical code signal from a Voronoi diagram derived from maxima of an optical code signal.

FIG. 39 is a flow diagram illustrating a method of constructing an optical code signal from a Voronoi diagram derived from the maxima of an optical code signal. Here, modules 534, 540, 542, and output marking 544 are similar to their counterparts in FIGS. 37 (520, 526, 528 and 530). The methods of FIGS. 37 and 39 differ in that module 536 finds maxima (vs. minima in 522), and module 538 forms a Voronoi diagram from the coordinates of the maxima. Additionally, in module 540, the tiling method preferably employs boundary wrapping conditions, such as Toroidal or periodic boundary conditions based on Voronoi regions computed at the boundaries.

Figure 40:
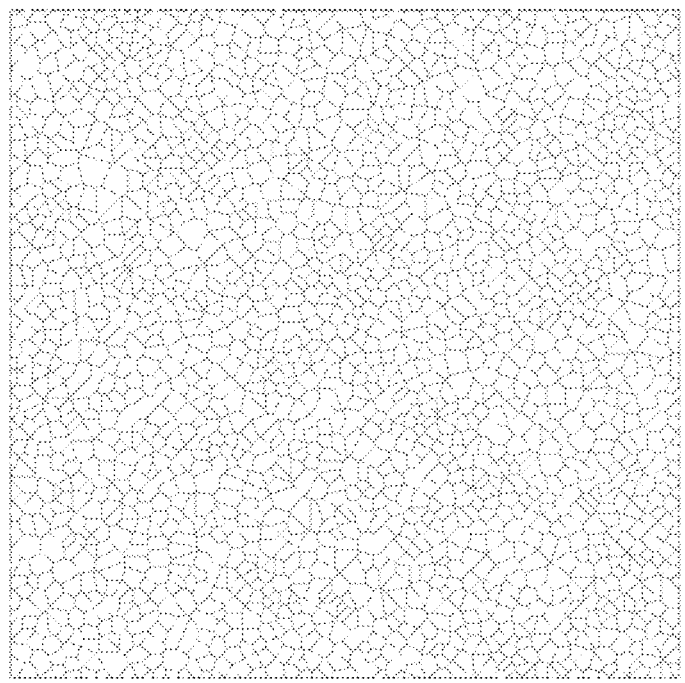
FIG. 40 illustrates an optical code signal tile created by the method of FIG. 39.
Figure 41:
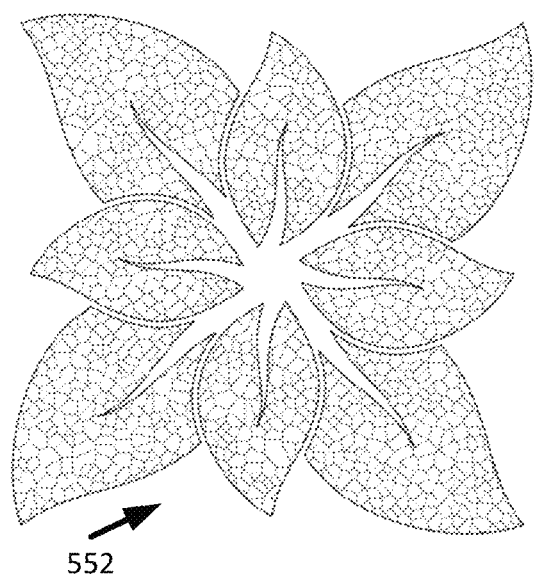
FIGS. 41-42 illustrate examples of optical code signals, masked to fit the shape of artwork elements.
Figure 42:
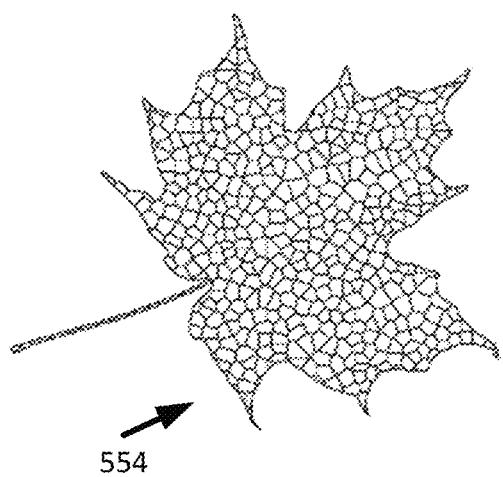

FIG. 40 illustrates an optical code signal tile 550 created by the method of FIG. 39. As depicted in FIG. 40, the lines of the Voronoi diagram are the darkest points of the tile 550. FIGS. 41-42 illustrate additional examples of optical code signal, masked to fit the shape of artwork elements, specifically, leaves 552 and 554. Here the line segments in the Voronoi diagram form a natural pattern of veins within the leavers 552, 554.

FIGS. 43-44 illustrate additional examples of optical code signal tiles generated from coordinates of maxima in a dense optical code signal tile. The optical code signal tile 556 is generated by programmatically forming squares around coordinates of maxima. Similarly tile 558 in FIG. 44 is generated by forming rectangles around coordinates of maxima.

The optical code signal tiles of FIGS. 43-44 are generated according to the following acts:

Generate an optical code signal tile, e.g., using methods of FIGS. 3-5, or the like;

Identify the maxima in the tile by based on pixel value;

Place a graphical element in a shape, such as a square, circle, rectangle, triangles, etc.;

The process of identifying maxima may be implemented in alternative ways. In one approach, a programmatic method sorts the pixel values in a tile by amplitude and selects the pixels in order of amplitude, starting the pixel of largest amplitude, and rejecting subsequent pixels within a minimum spacing distance. The minimum spacing distance is evaluated by rejecting maxima that are within a keep out region of a previously selected maxima. This approach is similar to the one described in this document for sparse signal generation in connection with FIG. 14. As explained in this document, this selection process can be sped up by grouping pixel values into bins by value and/or removing pixels by threshold-compare operation as a pre-processing step prior to the sort.

The placing of graphical elements may be achieved in a variety of ways as well. In one approach, an image editing program is invoked to select image elements in an image and replace them with a different graphical element, centered at the location of the selected element. An alternative implementation is to execute a MatLab routine that replaces image elements with a graphical shape (e.g., square, circle, rectangle, triangles, etc.) proceeding in a random manner, sequentially, so that each new element is placed in the top layer, masking all the elements underneath it. The order of placement of the elements changes the results but does not impact the signal robustness.

To improve robustness, a programmatic implementation should filter the result to remove small objects from the final image. In particular, the image filter removes irregular image blobs smaller than 8 pixels that are formed in the gaps in multiple overlapping masks in the same area. These small blobs decrease robustness and degrade visual quality. Thus, removing them both improves the reliability of the optical code signal and improves visual quality.

Stipple, Voronoi and Delaunay Methods

Continuing with the theme of optimizing signal robustness and visual quality of an optical code signal, we now transition to stipple methods for generating artwork that carries optical code signals. Our stipple-based methods leverage properties of vector quantization, and in some embodiments, Voronoi diagrams. Stippling is the creation of a pattern simulating grayscale or shading by using small dots. These dots may be made in any desired color, and as such, may be used to represent artwork elements of any color. Further, the dots may be used to convey optical code signals in luminance modifications or chrominance modifications, in one or more color separations or inks of an image design file. Variation in spatial density of the dots allows the representation of a desired grayscale value or intensity at a region corresponding to a grayscale level in the artwork. These variations, in turn, facilitate the modulation of the artwork to convey optical code signal tiles.

Figure 45:
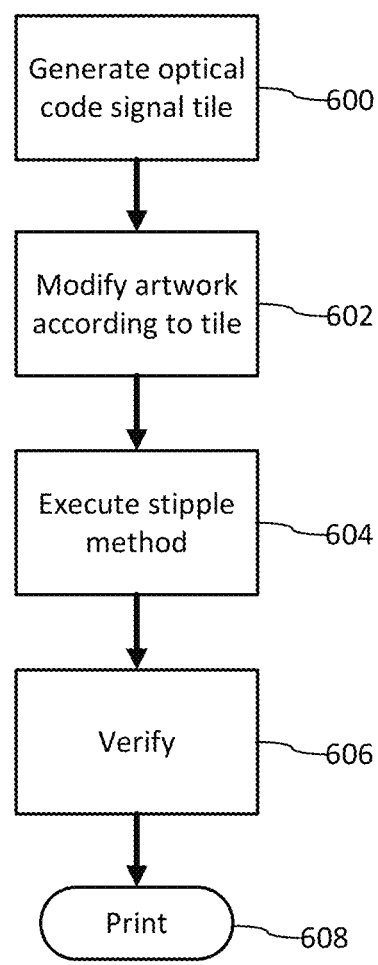
FIG. 45 is a flow diagram illustrating a stipple method for converting data carrying artwork to stipple art at desired density.

FIG. 45 is a flow diagram illustrating a stipple method for converting data carrying artwork to stipple art at desired density. In module 600, this method begins by generating an optical code signal tile, e.g., using any of the techniques illustrated in FIGS. 3-5 and embodiments described above.

Next, module 602 applies the modifications of the optical code signal tile to corresponding artwork elements in host artwork. The module first maps the tile redundantly in X and Y directions to areas of the artwork corresponding to the area of a tile. It then modifies pixel values (luminance or chrominance) at locations of the artwork corresponding to the values of the optical code at bit cells in the tile mapped to those pixels. The modifications can be applied at high strength, meaning that the maximum positive and negative adjustments to the luminance or chrominance, can be quite high, yet the method still produces output imagery of sufficient visual quality. The reason for this is that the stipple method reduces the visual impact of the modifications.

Module 604 executes a stipple method to convert the modified imagery output from 602. Preferably, module 604 employs a weighted centroidal Voronoi diagram method to generate locations for stipples in a stipple pattern representing the modified imagery.

Next, module 606 verifies that the robustness of the optical code signal is sufficient. This approach is implemented using one or more of the robustness and associated signal detection metrics described previously and referenced above in connection with robustness prediction.

Finally, the verified image file is printed or otherwise marked onto an object to create a physical object, e.g., package, label or other substrate bearing the optical code signal (608).

Figure 46:
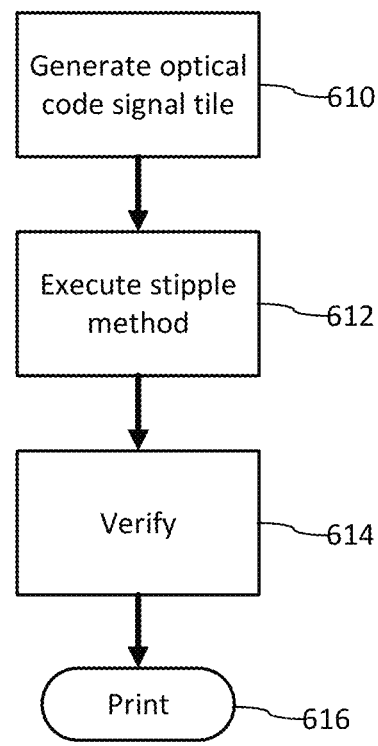
FIG. 46 is a flow diagram illustrating a stipple method for converting data carrying image to a stipple pattern at desired density.

FIG. 46 is a flow diagram illustrating a stipple method for converting data carrying image to stipple pattern at desired density. This method differs from FIG. 45 in that the stipple method is applied directly to the optical code signal tile. Modules 610, 612, and 614 are implemented similarly to 600, 604 and 606 of FIG. 45, and the result is printed or otherwise marked onto an object (616). To save processing resources, a single tile of optical code signal from module 610 is converted to a stipple pattern, and boundary wrapping conditions, as described above (in particular for the Voronoi based method) are used to create stipple patterns at the edges of the tile. This approach enables the single tile to be tiled efficiently to fit a larger artwork area without the need to repeat the generating of a stipple pattern for the larger artwork.

Figure 47:
FIG. 47 illustrates an example of signal bearing artwork, converted to a stipple pattern.

FIG. 47 illustrates an example of signal bearing artwork, converted to a stipple pattern based on the technique of FIG. 45. In this example, module 602 modulates luminance of the artwork in image 620 to embed tiles of optical code signal across the image. In a related approach, module 602 is adapted to modulate a color separation or one or more chrominance channels of an image. This process executed in module 602 produces a signal bearing image 620 shown on the left of FIG. 47. Then, the stipple method of module 604 converts image 620 to stipple pattern 622. Stipple pattern 622 is enlarged to show detail. The normal scale of the image is illustrated on the far right, as image 624 to illustrate the visual quality of the final image, even with a strongly embedded optical code signal.

Figure 48:
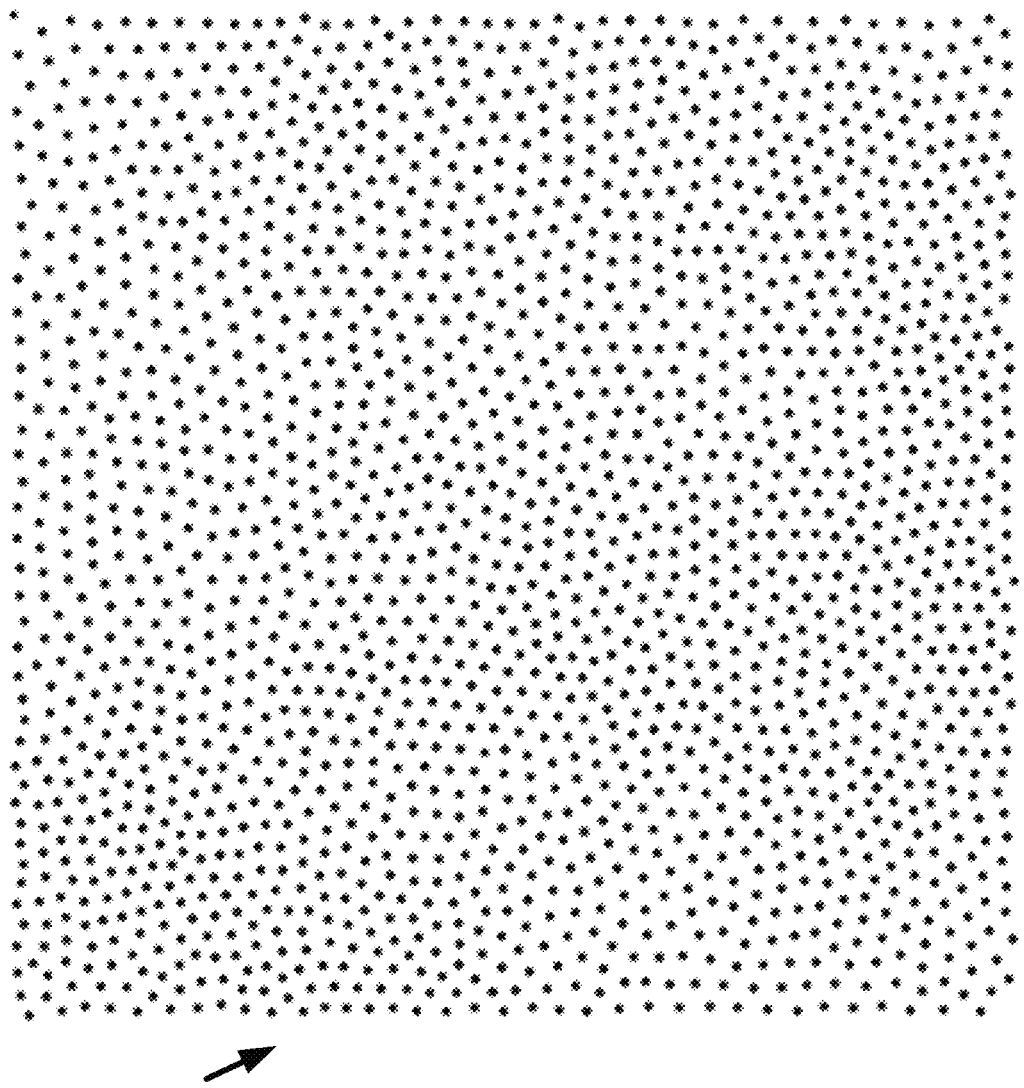
FIG. 48 illustrates an example of a stipple pattern of an optical code signal.

FIG. 48 illustrates an example of a stipple pattern of an optical code signal tile 630. This is generated using the approach of FIG. 46 to provide a sparse optical code signal with a desired dot density.

Figure 49:
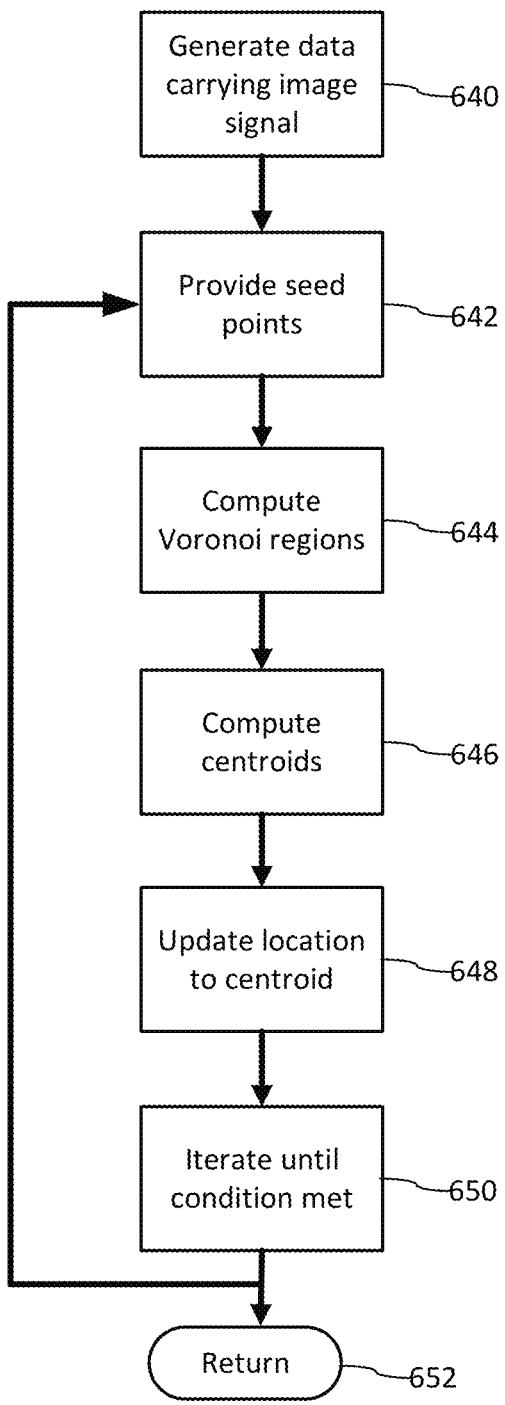
FIG. 49 is a flow diagram illustrating a method of employing weighted centroidal Voronoi diagrams to generate a stipple pattern of artwork carrying an optical signal.

FIG. 49 is a flow diagram illustrating a method of employing weighted Voronoi diagrams to generate a stipple pattern of artwork carrying an optical signal. This process begins by generating a data carrying image signal. For example, module 640 is implemented by generating a tile and modulating artwork with the tile as in 600, 602 of FIG. 45 and 620 of FIG. 47, or by generating an optical code signal tile as in 610 of FIG. 46.

Next, the method initiates a vector quantization process to determine locations of stipples to represent the image bearing signal output from module 640. This particular process does so by generating centroidal Voronoi diagrams starting with a set of seed points. These seed points may be randomly positioned at pixels locations within the input image. However, for better performance, it is preferred to select points that are more likely closer to the desired output. The sparse signal generation methods described in this document provide one approach for selecting seed points, as they are intended to pick locations of high priority code signal components in each tile that will provide desired robustness of the optical code for a desired dot density. Thus, a preferred implementation of module 642 executes a sparse signal generation process on the optical code signal of the input image from module 640. Other approaches include starting with evenly spaced array of points, or pseudo-randomly selected set of points, constrained by a minimum spacing distance between the seed point locations. For example, the spacing may be constrained by a minimum distance parameter, such as described previously as a keep out distance between dots.

Module 644 computes a Voronoi diagram from the current set of seed points provided by 642. The Voronoi diagram software noted above may be used to implement module 644.

Next, module 646 computes the centroid of each Voronoi region. This module is implemented, for example, using the method for computing centroids described by Secord in A. Secord, "Weighted Voronoi Stippling," Proc. 2nd Ann. Symp. Non-Photorealistic Animation and Rendering (NPAR 2002), ACM Press, 2002, pp. 27-43 ("Secord"), which is hereby incorporated by reference. In Secord, the centroid, $C_i$ of the region, $i$, is defined as follows;

$$C_i = \frac{\int_A x\rho(x)dA}{\int_A \rho(x)dA}$$

Where A is the region, x, is the position and $\rho(x)$ is the density function. Secord describes an optimized way of computing the centroids. The integrals in the above expression for the centroid are over arbitrary Voronoi regions. Secord's method converts these integrals to iterated integrals and integrates a region row by row. This enables the method to rely on pre-computed parts of the integral. The final computation, after excluding pre-computed parts, includes numerical integration in the y-direction and computation of expressions at the x values of the region boundaries. This converts the integral computation into look ups into look up tables of values that are pre-computed from the image's density function, a multiplication and subtraction. Secord also explains how to deal with the issue caused by discrete calculation of Voronoi regions affected by resolution (error in the centroid location increases as pixels in the Voronoi region decrease, and generating points may overlap at low resolution). Secord notes that Hoff provides a solution in Hoff III, K., Culver, T., Keyser, J., Lin, M., and Manocha, D. 1999, "Fast Computation of Generalized Voronoi Diagrams Using Graphics Hardware," In Proceedings of SIGGRAPH 99, ACM Press/ACM SIGGRAPH, New York, A. Rockwood, Ed., Computer Graphics Proceedings, Annual Conference Series, ACM, 277-286.

Next, module 648 updates the location of each point to the centroid in its Voronoi region. The routines of modules 642-648 iterate (650) until the points converge to centroids or a predetermined limit is reached. At this point, the method returns control (652) to the process that invoked the program. With each iteration, points from the last iteration are the starting seed points for the new iteration. The implementer may choose to limit the number of iterations to either a limit or convergence, whichever occurs first. The weighting of the centroid calculation by the density function tends to pack points closer in higher density areas of the input image than in lower density areas. For the optical code signal, this has the beneficial effect that points are clustered around peaks of the signal, which has higher priority with respect to robustness of the signal. Further, for cases where watermarked images are provided as input, the method provides a higher visual quality of the image as it makes a more accurate representation of the image with fewer number of stipples. In both cases, the method provides a vector quantization, representing the image within each Voronoi region with a representative stipple that optimizes the fit to the grayscale values of the input image.

Despite its benefits, the method of FIG. 49 may not be suitable in certain applications where the computational resources of the device generating the signal carrying art are limited. This may be the case for certain types of label printers or personal computer workstations, where the processing power of the CPU or processor allocated to the task in the device is limited. Additionally, it may not be suitable for serialization methods in which unique optical code signals may need to be provided to a printing or marking engine with limited latency ("real time") to mark unique instance of items with different optical codes. In such case, the real time constraint is defined in terms of the time allocated to generate the uniquely marked image within the time between the markings of each serialized instance. In a label printer, this is the time between printing each new label. In a commercial digital press, this is the time allocated to generating a new serialized instance of a package design. It is possible to buffer pre-computed unique instances and feed them to the marking engine, which would reduce latency. However, this approach requires additional memory and potentially memory bandwidth capability to move unique images into marking engine memory. For example, for a digital press, this would entail transferring unique images from the digital front end to the print engine.

Figure 50:
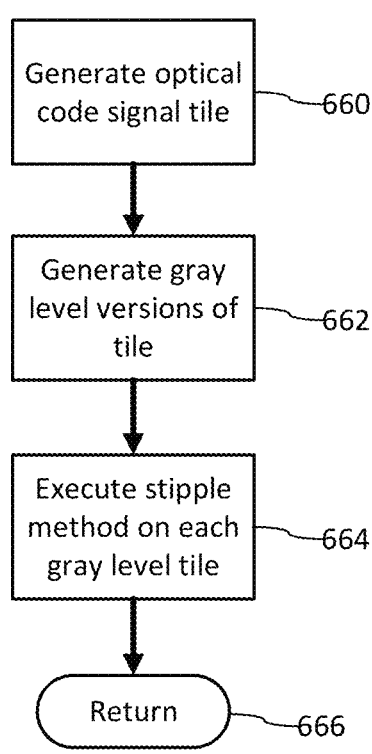
FIG. 50 is a flow diagram of method of generating stipple patterns of optical code signals at different dot densities.
Figure 51:
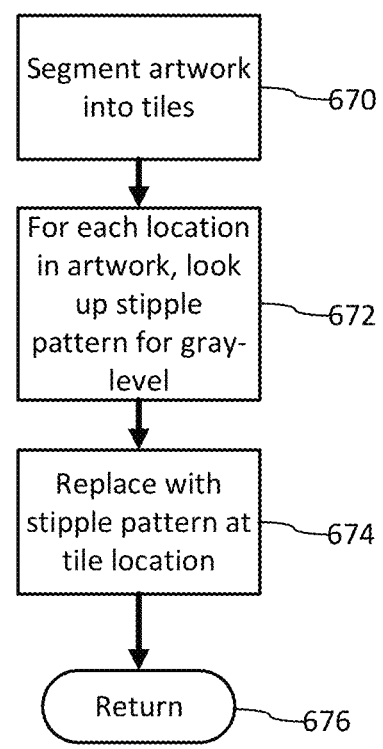
FIG. 51 is a flow diagram of applying the stipple patterns generated in the method of FIG. 50 to encode an optical code signal tile in artwork.

FIGS. 50-51 illustrate a two-part method that reduces required computation to generate artwork carrying the optical code signal. The process of FIG. 50 pre-computes stipple patterns for different gray levels, representing each level of a quantization of the dynamic range from light to dark into a pre-determined number of quantization levels. The process of FIG. 51 then converts artwork into signal bearing art using the pre-computed stipple patterns.

FIG. 50 is a flow diagram of method of generating stipple patterns of optical code signals at different dot densities. Module 660 generates a dense optical code signal tile using, for example, any of the techniques of FIGS. 3-5 described previously, including the various embodiments that elaborate on them in this document.

Module 662 generates gray level versions of the tile at each level of a predetermined number of gray levels. One approach is to apply adjustments to grayscale level images at each level using the dense optical code signal to guide the positive/negative adjustments to luminance at pixels corresponding to the bit cells of each grayscale level tile.

Next, module 664 executes a stipple pattern method to convert each grayscale level tile into a stipple pattern. One approach is to use the method of FIG. 49. The method of FIG. 49 then returns processing control to the process that invoked it (666). At this point, stipple patterns have been computed and stored for fast look up. These patterns each carry the optical code signal of a tile at their respective grayscale levels.

Another method seeks to perform a more seamless weighted Voronoi stippling over progressive grayscale layers. First, this method computes a stipple pattern at the highest grayscale level. Then, it generates the stipple pattern at the next lower grayscale level as follows: compute the Voronoi cells and the centroid of each cell, then compute the centroid of the cell corresponding to the region defined by the nearest neighbor stipples in the higher layer. This is not a Voronoi cell. The goal is to place the stipples in the gaps of the stipples in the higher layer to achieve a seamless transition. Then move each stipple in the current layer to a weighted vector resultant of the centroid of the current Voronoi cell and the centroid of the nearest neighbor cell in the higher layer, with a higher weighting for the centroid vector in the current layer. This may yield a more seamless transition of the stipple dots in a smoothly varying grayscale region. However, there is the potential for stipple artifacts at edges when the grayscale value jumps discontinuously between levels.

FIG. 51 is a flow diagram of applying the stipple patterns generated previously to encode an optical code signal tile in artwork. The artwork is represented as an image or graphic element in a color channel of a package design. Module 670 segments the artwork into areas corresponding to the areas of tiles, arranged contiguously in X and Y directions and cropped to fit the shape of the artwork. This effectively maps the signal carrying tile to locations within the artwork. Each cell of the mapped tiles corresponds to a region of pixels in the artwork.

Next, module 672 steps through the cells of each of the mapped tiles and fetches the grayscale level at the corresponding pixel region in the artwork. It then looks up the corresponding stipple pattern of the pre-computed stipple pattern for that grayscale level, at the cell location in the stipple pattern corresponding to the cell location of the tile mapped to the artwork. In module 674, the method replaces the artwork at this cell location with the stipple pattern. Modules 672-674 repeat this process until a stipple pattern is completed for all of the cells in the artwork. The method then returns processing control to the process that invoked it (676).

We have developed alternative embodiments of these Voronoi, Delaunay and stipple methods. For these Voronoi, Delaunay and stipple embodiments, the methods generate a point halftone first (by any of a variety of methods—e.g., Secord method, sparse mark generation, etc.) and then create a Voronoi, Delaunay or stipple pattern based on those points. For example, Voronoi regions are formed around these points, Delaunay polygons are drawn to intersect at these points, or stipples are placed at them. The point halftone may be generated from an optical code signal tile (e.g., a grayscale image of combined payload and reference signal) or an image that has been embedded by tiling the optical code signal and then modifying pixel values of a host image according to the tiled optical code signal to embed the optical codes signal in the host image. Computational efficiency can be improved by selecting among the more computationally efficient methods of generating an arrangement of sparse points described in this document. For example, one approach is sorting the grayscale values of an image representing an optical code or image embedded with the optical code and then selecting points with desired spacing in the sorted order until a particular density or aesthetic effect is achieved. This selection creates a sparse arrangement of points which is used to create the Voronoi, Delaunay or stipple patterns.

Figure 53:
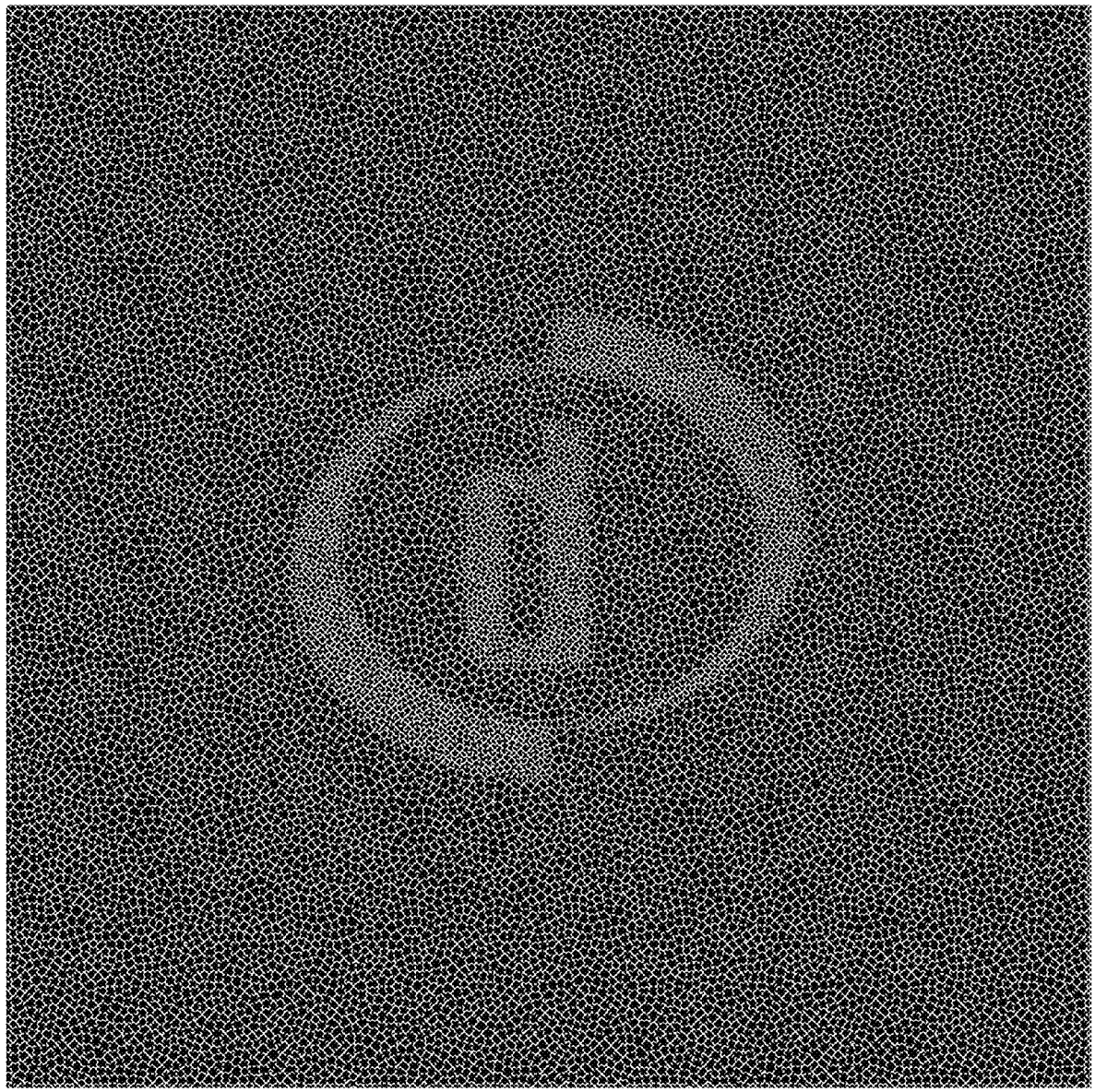
FIG. 53 is a diagram illustrating the output of generating signal rich art comprising a Voronoi pattern from a host image embedded with an optical code.
Figure 54:
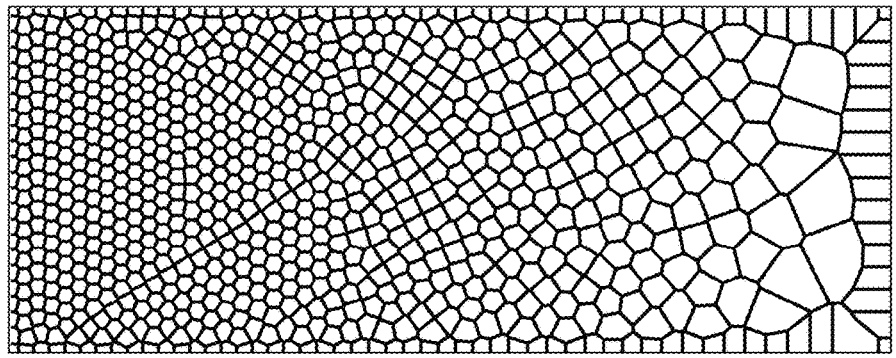
FIG. 54 is a diagram of halftone grayscale levels created by varying line density of lines in a Voronoi pattern.
Figure 55:
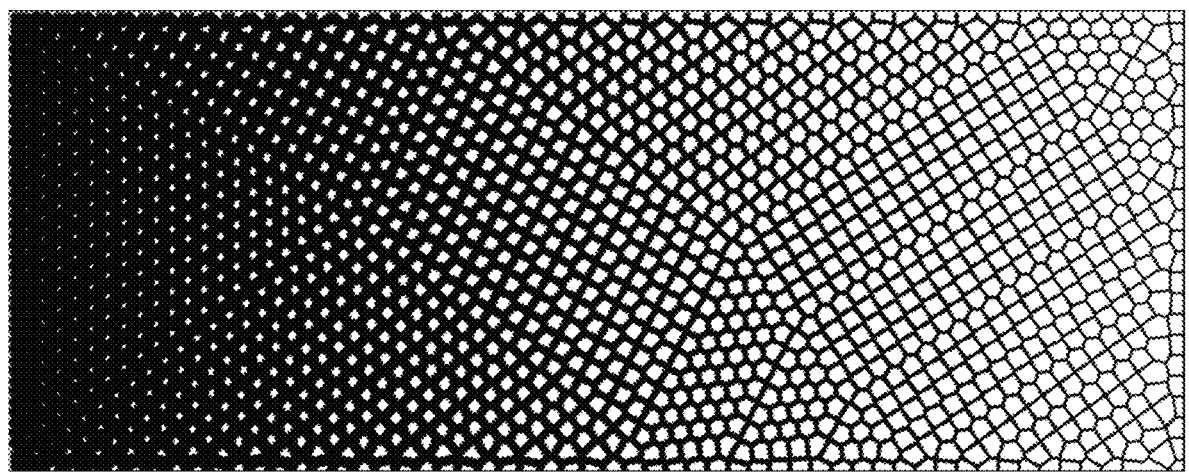
FIG. 55 is a diagram of halftone grayscale levels created by varying line width of lines in a Voronoi pattern.

FIG. 53 shows an example of an image carrying an optical code that is formed with a Voronoi pattern. Here, a grayscale image of a logo (the "d" design) is modified to include the optical code signal, then converted to a halftone of sparse points, and finally converted into a Voronoi pattern based on the sparse points. Note that the characteristics of the Voronoi patterns vary across the image (e.g., light on dark and dark on light, varying line density or width) to create the desired aesthetic effect. FIGS. 54 and 55 show halftone patterns of Voronoi regions in which grayscale levels are created by varying line density (FIG. 54) and line width (FIG. 55).

Having described and illustrated the principles of the technology with reference to specific implementations, it will be recognized that the technology can be implemented in many other, different, forms.

Unless otherwise indicated, the term "sparse" as used herein refers to a signal pattern with spaced apart elements satisfying a desired spatial density constraint. The pattern is typically binary, e.g., the image of the pattern has either "on" or "off" values corresponding to marking or not. In some embodiments where the optical code is applied to a blank area, it is configured to be bitonal code in which 50% or less of the substrate is marked to produce a contrasting mark (e.g., ink on a white substrate, or a light void surrounded with contrasting ink). More typically for such applications, the mark has less than 30% of the substrate so-marked, with a print density of 2-15% being most common in cases where the optical code is intended to be less perceptible to humans and avoid interference with text. Embodiments of the optical code signal need not be at such a low density of marking elements. Marking elements can be arranged in a tile with varying density, size and shape to provide the desired luminance or intensity variation to convey the optical code in a signal rich art design.

While the specification describes the reference signal component as being comprised of sinusoids of different spatial frequency, the reference signal can alternatively or additionally comprise orthogonal patterns. These, too, can be varied in amplitude to obtain patterns of different appearances.

Although some of the detailed technologies have been described in the context of forming codes by printing black dots on a white background (or vice-versa), it will be recognized that the codes can be formed otherwise. For example, a clear varnish or other surface treatment can be applied to locally change the reflectivity of a surface, e.g., between shiny and matte. Similarly, the code can be formed in a 3D fashion, such as by locally-raised or depressed features. The 3D signal is formed by intensity values for spatial X, Y locations in a tile or in artwork modulated by a tile, where the intensity values at cell locations in the tile or artwork correspond to depth and height of depressions and locally raised surface of the 3D signal. This 3D signal is then formed into a substrate by embossing, engraving, or etching. Embossing is carried out by pressing a plate with a surface formed from the 3D signal (or its inverse) onto a substrate. Or, embossing is carried out by applying the 3D signal via a mold that has been marked with the 3D signal (or its inverse). Laser engraving or 3D printing are some of the additional technologies that may be employed for making 3D signals on substrates, embossing plates or molds. Laser ablation is well suited for producing data markings on the skins of fruits and vegetables, e.g., to convey an identifier, a pick date, a use-by date, and/or a country of origin, etc. (Sparse marks, as detailed herein, cause less damage to fruits/vegetables than linear 1D barcodes, which are more likely to breach the skin due to their elongated elements.)

While the specification has focused on optical code elements formed by black dots or lines on white substrate, it will be recognized that colored marks can be used, on a white background, or on a background of a contrasting color (lighter or darker). Similarly, light marks can be formed on a black or colored background. In some embodiments, the colors of sparse markings can vary over a piece of host artwork, such as a label. For example, dots may be cyan in one region, black in a second region, and Pantone 9520 C in a third region.

In arrangements in which light dots are formed on a dark background, "light" pixels should be substituted for "dark" elements (and high signal values substituted for low signal values) in the algorithmic descriptions herein.

This specification has detailed many arrangements for generating sparse codes from dense codes, and for generating sparse codes without requiring a dense code. While composite codes—including payload and reference signals—are most commonly used, the arrangements can variously be applied to optical codes consisting just of payload or reference signals. Further, as noted elsewhere, payload data can be conveyed by a reference signal (e.g., by the presence or absence of certain spatial frequency components). Similarly, reference information can be conveyed by a payload signal (e.g., by use of fixed bits in the payload data, thereby forming an implicit synchronization signal having known signal characteristics, by which a detector can locate the payload signal for decoding).

One arrangement creates a sparse code by applying a thresholding operation to a dense code, to identify locations of extreme low values (i.e., dark) in the dense code. These locations are then marked in a sparse block. The threshold level establishes the print density of the resulting sparse mark.

Another arrangement identifies the darkest elements of a reference signal, and logically-ANDs these with dark elements of the payload signal, to thereby identify locations in a sparse signal block at which marks should be formed. A threshold value can establish which reference signal elements are dark enough to be considered, and this value can be varied to achieve a desired print density.

Still another arrangement employs a reference signal generated at a relatively higher resolution, and a payload signal generated at a relatively lower resolution. The latter signal has just two values (i.e., it is bitonal); the former signal has more values (i.e., it is multi-level, such as binary grayscale or comprised of floating point values). The payload signal is interpolated to the higher resolution of the reference signal, and in the process is converted from bitonal form to multi-level. The two signals are combined at the higher resolution, and a thresholding operation is applied to the result to identify locations of extreme (e.g., dark) values. Again, these locations are marked in a sparse block. The threshold level again establishes the print density of the resulting sparse mark.

Yet another arrangement again employs a reference signal generated at a relatively higher resolution, and a bitonal payload signal generated at a relatively lower resolution. A mapping is established between the two signals, so that each element of the payload signal is associated with four or more spatially-corresponding elements of the reference signal. For each element of the payload signal that is dark, the location of the darkest of the four-or-more spatially corresponding elements in the reference signal is identified. A mark is made at a corresponding location in the sparse block. A further arrangement is based on a dense multi-level reference signal block.

Elements of this signal are sorted by value, to identify the darkest elements—each with a location. These darkest elements are paired. One element is selected from each pairing in accordance with bits of the payload. Locations in the sparse block, corresponding to locations of the selected dark element, are marked to form the sparse signal.

Arrangements that operate on composite codes can further include weighting the reference and payload signals in ratios different than 1:1, to achieve particular visibility or robustness goals.

Each of these arrangements can further include the act of applying a spacing constraint to candidate marks within the optical code tile, to prevent clumping of marks. The spacing constraint may take the form of a keep-out zone that is circular, elliptical, or of other (e.g., irregular) shape. The keep-out zone may have two, or more, or less, axes of symmetry (or none). Enforcement of the spacing constraint can employ an associated data structure having one element for each location in the optical code tile. As dark marks are added to the tile, corresponding data is stored in the data structure identifying locations that—due to the spacing constraint—are no longer available for possible marking.

A hexagonal lattice provides for optimal packing of points in a two-dimensional area. We have found that using a circular keep out region between points provides effective packing while keeping nearest neighbors equidistant. This provides a visually pleasing arrangement of marking elements.

Local grayscale control of signal rich art elements may be controlled by varying the size of the graphical element as well as the spacing between graphical elements. For dots, this means that the dot size and spacing between dots may be increased or decreased to achieve the desired grayscale control. Dots can be light on dark, or dark on light. Dots can have a circular, square or other shape. FIG. 29 illustrates a range of grayscale values achieved by using a combination of white dots on black (for the dark half of the grayscale range) and black dots on white (for the light half of the grayscale range), with a flip at 50% grayscale. Alternatively, the radius of white dots can be progressively increased from zero to a maximum filling a cell in an image get a progressively lighter grayscale level in the cell. Or, the radius of black dots can be progressively decreased to a progressively lighter grayscale level in the cell.

For line-based signal rich art embodiments, the similar effects of varying marking element size and shape apply. Dark lines on light background are progressively thickened or thinned to get darker or lighter grayscale levels. Similarly, the spacing of the dark lines is progressively reduced or increased to get darker or lighter grayscale levels. For the case of Voronoi regions, for example, the regions formed from dark lines are packed more closely and/or lines thickened to get darker grayscale levels.

The computational efficiency of signal rich art methods may be improved by generating an optical code signal, or image embedded with the optical code signal (the input image), sorting the grayscale values of the input image, and then placing halftone patterns of the signal rich art elements at locations within an output image corresponding to the grayscale values of the input image. In a separate preprocessing step, halftone patterns of elements are created at each of several discrete grayscale levels akin to what is shown in FIG. 29. These halftone patterns are stored in look up tables indexed by grayscale value. To create signal rich art in the output image, this method places signal rich art elements in the order of the grayscale values of the input image to obtain an output image with the desired spatial density and minimum spacing between elements. At each location visited in the sorted order, the method selects the signal rich art elements from the pre-computed halftone patterns to correspond to the grayscale value of the input image at the location. This process transforms the input image into signal rich art in which the optical code signal is strongly represented.

Figure 56:
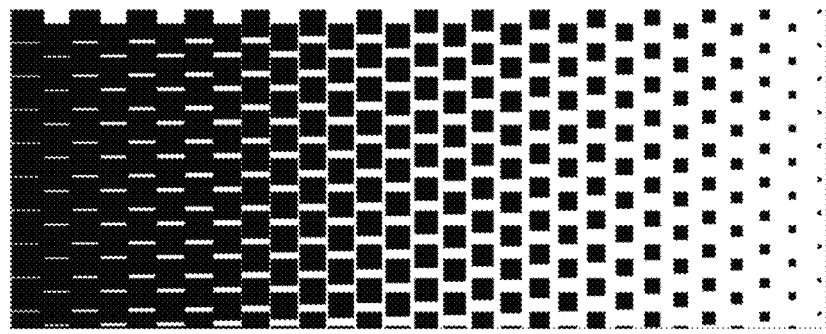
FIGS. 56 and 57 show halftone grayscale levels created by varying square dot size, both dark squares on light (FIG. 56) and light squares on dark (FIG. 57) background.
Figure 57:
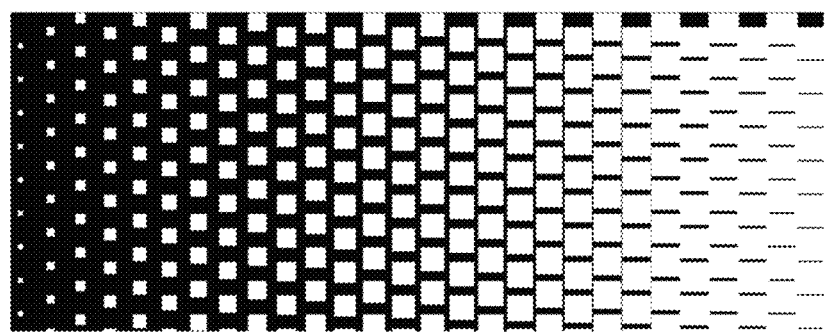
Figure 58:
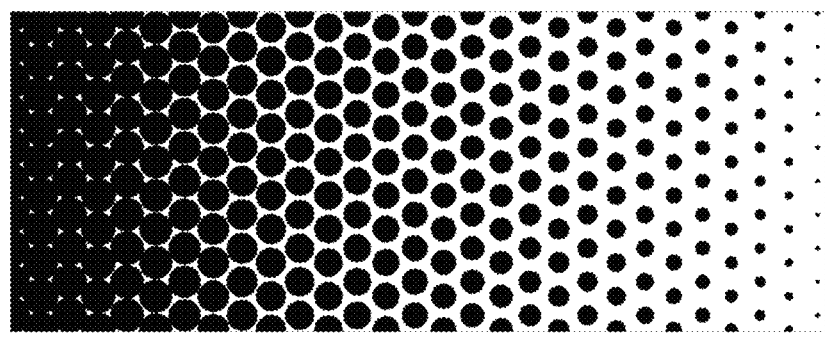
FIGS. 58 and 59 show halftone grayscale levels created by varying circular dot size, both dark circles on light (FIG. 58) and light circles on dark (FIG. 59) background.
Figure 59:
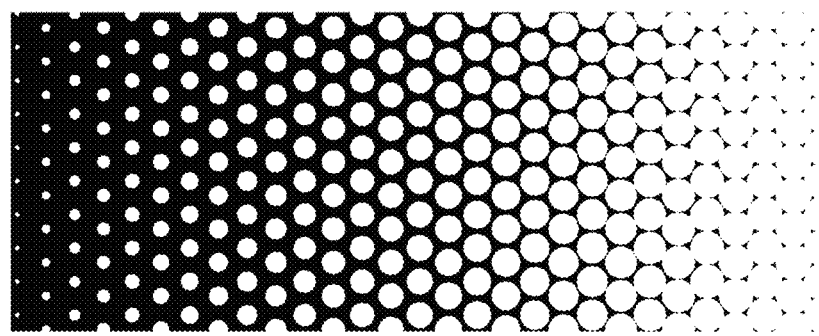
Figure 60:
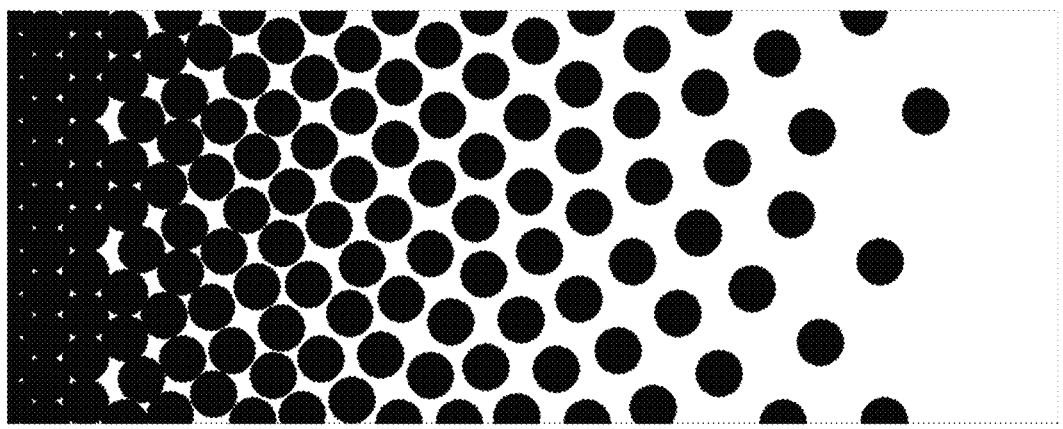
FIGS. 60-61 show halftone grayscale levels created by varying dot spacing, with both dark and light dots.
Figure 61:
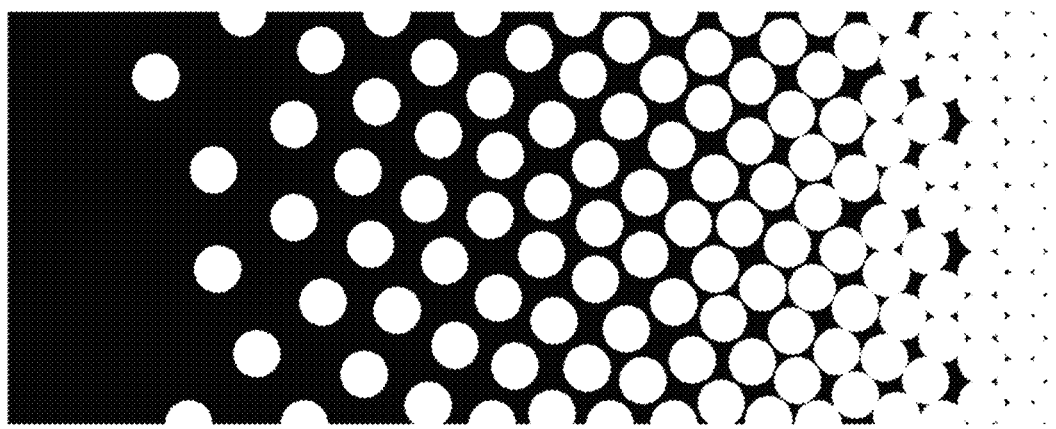

This method works for halftone patterns created from other types of graphic primitives, including dot patterns comprised of different shapes and line art. For examples of different dot shapes and sizes, see FIGS. 56-59. FIGS. 56-57 show square dots of varying sizes (and light and dark versions of the dots) that form varying grayscale levels. FIGS. 58-59 show similar effects, but with circular dots. FIGS. 60-61 show dark and light circles with varying distance between the circles forming halftone patterns at different grayscale levels.

These methods of varying grayscale level in a marking area of an optical code can be used in various combinations to create desired visual aesthetics of the artwork while maintaining robustness of the optical code.

In each of these arrangements, the reference signal can be tailored to have a non-random appearance, by varying the relative amplitudes of spatial frequency peaks, so that they are not all of equal amplitude. Such variation of the reference signal appearance has consequent effects on the sparse signal appearance.

These arrangements can also include the act of applying a non-linear filter to a multi-level code (e.g., the original dense code) to identify locations at which forming a mark in the sparse block most effectively gives expression to information represented by unprinted sparse elements. These locations are then given priority in selecting locations at which to make marks in the sparse block.

A means for forming a sparse code from a dense code can employ any of the hardware arrangements detailed herein (i.e., in the discussion entitled Operating Environment), configured to perform any of the detailed algorithms.

This specification has discussed several different embodiments. The methods, elements and concepts detailed in connection with one embodiment can be combined with the methods, elements and concepts detailed in connection with other embodiments. While some such arrangements have been particularly described, some have not—due to the number of permutations and combinations. Applicant similarly recognizes and intends that the methods, elements and concepts of this specification can be combined, substituted and interchanged—not just among and between themselves, but also with those known from the cited prior art. Moreover, it will be recognized that the detailed technology can be included with other technologies—current and upcoming—to advantageous effect. Implementation of such combinations is straightforward to the artisan from the teachings provided in this disclosure.

While this disclosure has detailed particular ordering of acts and particular combinations of elements, it will be recognized that other contemplated methods may re-order acts (possibly omitting some and adding others), and other contemplated combinations may omit some elements and add others, etc. To give but a single example, in the embodiments described as combining the payload and reference signals in a weighted arrangement other than 1:1, a weighting of 1:1 can alternatively be used.

Although disclosed as complete systems, sub-combinations of the detailed arrangements are also separately contemplated (e.g., omitting various of the features of a complete system).

To provide a comprehensive disclosure, while complying with the Patent Act's requirement of conciseness, Applicant incorporates-by-reference each of the documents referenced herein. (Such materials are incorporated in their entireties, even if cited above in connection with specific of their teachings.) These references disclose technologies and teachings that Applicant intends be incorporated into the arrangements detailed herein, and into which the technologies and teachings presently-detailed be incorporated.

In view of the wide variety of embodiments to which the principles and features discussed above can be applied, it should be apparent that the detailed embodiments are illustrative only, and should not be taken as limiting the scope of the invention. Rather, Applicant claims as the invention all such modifications as may come within the scope and spirit of the following claims and equivalents thereof.

The invention claimed is:

1. A method of generating a machine-readable optical code, the method comprising:
   generating optical code signal components, comprising a variable payload;
   sorting, by value, elements of at least one of the optical code signal components;

constructing a tile of a two-dimensional optical code, the tile comprising optical code elements located at coordinates within the tile at a spatial density;

drawing line art based on the coordinates, the line art conveying the variable payload, the drawing comprising placing line art elements according to the sorting; and inserting the line art comprising plural tiles in an image, the optical code being machine-readable from an optical scan of the image marked on a physical object.

2. The method of claim 1 wherein the optical code signal components comprise a reference signal for geometric synchronization.

3. The method of claim 1 wherein the constructing comprises:

transforming the variable payload into a first optical code signal at a first spatial density, the first optical code signal comprising a two-dimensional array of pixel values that includes a reference signal for geometric synchronization; and converting the first optical code signal to a second optical code signal at a second spatial density lower than the first spatial density, the second optical code signal comprising parts of the first optical code signal at the coordinates such that the spatial density of non-zero-pixel values of the second optical code signal is less than the first optical code signal.

4. The method of claim 1 wherein drawing line art comprises drawing line segments according to a traveling salesperson.

5. The method of claim 1 wherein drawing line art comprises drawing a contour plot.

6. The method of claim 1 wherein drawing line art comprises drawing line segments that intersect at luminance minima of the two-dimensional optical code.

7. The method of claim 6 wherein drawing line segments that intersect at luminance minima comprises generating a Delaunay triangulation of coordinates at the luminance minima.

8. The method of claim 1 wherein drawing line segments comprises drawing a Voronoi diagram around luminance maxima of the two-dimensional optical code.

9. The method of claim 1 wherein drawing line segments comprises placing graphic line art shapes around luminance maxima of the two-dimensional optical code.

10. A method of generating a machine-readable optical code, the method comprising:

sorting, by value, elements of at least one optical code signal component;

transforming a plural bit, variable payload into a pattern of spaced apart elements according to the sorting, the elements being located at coordinates in a two-dimensional area; and drawing a stipple, Voronoi, or Delaunay pattern based on the coordinates, the pattern conveying the plural bit, variable payload.

11. The method of claim 10 comprising:

a step for generating a dense optical code signal;

a step for generating a sparse optical code signal from the dense optical code signal;

a step for creating artwork carrying the sparse optical code signal; and a step for inserting the artwork in an object design file for a printed, laser marked or molded object.

12. The method of claim 11 wherein the step for generating a dense optical code signal comprises generating an encoded payload, mapping the encoded payload to cells in a two-dimensional array, and combining the encoded payload with a reference signal.

13. The method of claim 11 wherein the step for generating a sparse optical code signal comprises sorting elements of the dense optical code signal, and selecting elements based on amplitude and a minimum spacing constraint.

14. The method of claim 11 wherein the step for generating the sparse optical code signal comprises filtering the dense optical code signal with a prediction filter and selecting elements of the optical code signal based on the filtering and a minimum spacing constraint.

15. The method of claim 10 wherein transforming comprises:

transforming the plural bit, variable payload into a dense optical code signal tile at a first spatial density;

converting the dense optical code signal tile to a sparse optical code signal tile at a second spatial density that is lower than the first spatial density, the sparse optical code signal tile comprising parts of the dense optical code signal tile at the coordinates.

16. The method of claim 10 comprising:

transforming a plural bit, variable payload into an optical code signal;

combining the optical code signal with host artwork; and drawing a stipple, Voronoi or Delaunay pattern based on grayscale values of the combined optical code signal and host artwork.

17. A system comprising:

means for generating an image comprising an optical code, the optical code comprising an encoded variable digital payload and a geometric registration pattern;

means for generating an optical code from the image, the optical code having elements at a predetermined spacing and size; wherein the means for generating the optical code comprises a programmed computer configured to compute a Voronoi diagram of the image and place line art at coordinates of the optical code based on Voronoi regions in the Voronoi diagram; and means for inserting the optical code in an object design file.

18. A non-transitory computer readable medium comprising instructions stored therein that, when executed by one or more processors, cause the one or more processors to perform the following acts:

arranging, by value, elements of at least one optical code signal component;

transforming a plural-bit, variable payload into a pattern of spaced apart elements according to the arranging, the elements being located at coordinates in a two-dimensional area; and drawing a stipple, Voronoi, or Delaunay pattern based on the coordinates, the pattern conveying the plural-bit, variable payload.

19. The non-transitory computer readable medium claim 18 wherein said transforming comprises:

transforming the plural-bit, variable payload into a dense optical code signal tile at a first spatial density;

converting the dense optical code signal tile to a sparse optical code signal tile at a second spatial density that is lower than the first spatial density, the sparse optical code signal tile comprising parts of the dense optical code signal tile at the coordinates.

20. The non-transitory computer readable medium of claim 18 in which said instructions further comprise instructions that, when executed by the one or more processors, cause the one or more processors to perform the following acts:

transforming a plural-bit, variable payload into an optical code signal;

combining the optical code signal with host artwork; and drawing a stipple, Voronoi or Delaunay pattern based on grayscale values of the combined optical code signal and host artwork.

21. The non-transitory computer readable medium of claim 18 in which said instructions further comprise instructions that, when executed by the one or more processors, cause the one or more processors to perform the following acts:

generating a dense optical code signal;

generating a sparse optical code signal from the dense optical code signal;

creating artwork carrying the sparse optical code signal; and inserting the artwork in an object design file for a printed, laser marked or molded object.

22. The non-transitory computer readable medium of claim 21 wherein the generating a dense optical code signal comprises generating an encoded payload, mapping the encoded payload to cells in a two-dimensional array, and combining the encoded payload with a reference signal.

23. The non-transitory computer readable medium of claim 21 wherein the generating a sparse optical code signal comprises sorting elements of the dense optical code signal, and selecting elements based on amplitude and a minimum spacing constraint.

24. The non-transitory computer readable medium of claim 21 wherein the generating the sparse optical code signal comprises filtering the dense optical code signal with a prediction filter and selecting elements of the optical code signal based on the filtering and a minimum spacing constraint.

* * * * *